(12) United States Patent
Zampini, II

(10) Patent No.: US 9,872,153 B2
(45) Date of Patent: *Jan. 16, 2018

(54) SYSTEMS, METHODS AND APPARATUS FOR LIGHT ENABLED INDOOR POSITIONING AND REPORTING

(71) Applicant: BECO, Inc., Cambridge, MA (US)

(72) Inventor: Thomas Zampini, II, Cambridge, MA (US)

(73) Assignee: Beco, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,144

(22) Filed: Jul. 14, 2016

(65) Prior Publication Data
US 2017/0013417 A1    Jan. 12, 2017

Related U.S. Application Data

(63) Continuation of application No. 14/819,023, filed on Aug. 5, 2015, now Pat. No. 9,398,422.
(Continued)

(51) Int. Cl.
| | |
|---|---|
| *H04W 4/04* | (2009.01) |
| *H04W 4/00* | (2009.01) |
| *H04W 52/02* | (2009.01) |
| *H04W 48/10* | (2009.01) |
| *H04W 72/00* | (2009.01) |
| *H04W 64/00* | (2009.01) |

(52) U.S. Cl.
CPC ........... *H04W 4/043* (2013.01); *H04W 4/008* (2013.01); *H04W 48/10* (2013.01); *H04W 52/0296* (2013.01); *H04W 64/003* (2013.01); *H04W 72/005* (2013.01); *Y02B 60/50* (2013.01)

(58) Field of Classification Search
CPC ..... H04W 4/043; H04W 4/008; H04W 48/10; H04W 52/0296
See application file for complete search history.

(56) References Cited

U.S. PATENT DOCUMENTS

| | | | |
|---|---|---|---|
| 5,990,826 A | 11/1999 | Mitchell | |
| 9,398,422 B2 * | 7/2016 | Zampini, II | .......... H04W 4/043 |

(Continued)

FOREIGN PATENT DOCUMENTS

| | | |
|---|---|---|
| JP | 09-008734 A | 10/1997 |
| JP | 2007-179411 A | 7/2007 |
| WO | WO-2013/153671 | 10/2013 |

OTHER PUBLICATIONS

International Search Report and Written Opinion of the International Searching Authority on PCT/US2015/056970 dated Jan. 29, 2016.
(Continued)

*Primary Examiner* — Siming Liu
(74) *Attorney, Agent, or Firm* — Foley & Lardner LLP

(57) ABSTRACT

The present disclosure is directed systems, methods, and apparatus for light enabled indoor positioning and reporting. In some embodiments, a device of the present disclosure includes a housing that includes a processor and a wireless radio. The device includes a clip that secures the housing adjacent to and a predetermined distance from a portion of a light tube that produces light. The device includes a solar cell that is configured to be exposed to the light from the light tube upon the housing being securely attached via the one or more clips adjacent to the portion of the light tube. The device includes a circuit by which power is converted from the solar cell to the processor and the wireless radio via at least one switch. The wireless radio can broadcast a beacon provided by the processor.

20 Claims, 21 Drawing Sheets

Related U.S. Application Data

(60) Provisional application No. 62/102,836, filed on Jan. 13, 2015, provisional application No. 62/138,265, filed on Mar. 25, 2015, provisional application No. 62/075,579, filed on Nov. 5, 2014.

(56) References Cited

U.S. PATENT DOCUMENTS

| | | |
|---|---|---|
| 2002/0013153 A1 | 1/2002 | Wilcock et al. |
| 2012/0115512 A1 | 5/2012 | Grainger et al. |
| 2012/0283718 A1 | 11/2012 | Cosmescu |
| 2012/0316783 A1 | 12/2012 | Brillhart |
| 2013/0050948 A1 | 2/2013 | Kim et al. |
| 2013/0225197 A1 | 8/2013 | McGregor et al. |
| 2014/0220883 A1 | 8/2014 | Emigh et al. |
| 2014/0292636 A1 | 10/2014 | Rosener |
| 2015/0005011 A1 | 1/2015 | Nehrenz et al. |
| 2015/0088745 A1 | 3/2015 | Phillips et al. |
| 2015/0278867 A1 | 10/2015 | Lerman et al. |

OTHER PUBLICATIONS

U.S. Notice of Allowance on U.S. Appl. No. 14/819,023 dated Jun. 7, 2016.
U.S. Office Action on 109418-0109 dated Dec. 11, 2015.
U.S. Office Action on U.S. Appl. No. 14/819,023 dated Apr. 7, 2016.

\* cited by examiner

SYSTEMS, METHODS AND APPARATUS FOR LIGHT ENABLED INDOOR POSITIONING AND REPORTING

CROSS-REFERENCES TO RELATED APPLICATIONS

The present application is a continuation of and claims the benefit of priority under 35 U.S.C. §120 to U.S. patent application Ser. No. 14/819,023, titled "Systems, Methods and Apparatus for Light Enabled Indoor Positioning and Reporting", filed on Aug. 5, 2015, which claims the benefit of priority under 35 U.S.C. §119 to U.S. Provisional Patent Application No. 62/138,265, titled "Systems and Methods for Building Optimization with Indoor Positioning and Reporting", filed on Mar. 25, 2015, U.S. Provisional Patent Application No. 62/102,836, titled "Systems and Methods for Virtual Beaconing with Reporting", filed on Jan. 13, 2015, and U.S. Provisional Patent Application No. 62/075,579, titled "Autonomous Control Beacon", filed on Nov. 5, 2014, each of which are incorporated by reference herein in their entirety.

FIELD OF THE DISCLOSURE

The present application is generally directed towards the use of wireless beacons, wireless sniffing, and lighting as a means of delivering both positioning for mobile devices as well as real-time and predictive feedback of building occupancy, enabling the contextual engagement of users and smarter buildings.

BACKGROUND

Humans spend 90% of our time indoors. However, using existing infrastructure to establish indoor positioning of people (users) may be unreliable or inaccurate.

BRIEF SUMMARY OF THE DISCLOSURE

The systems and methods of the present disclosure described herein address the need for contextually engaging users based on their location, measuring user traffic through a space, such as a building, while providing a maintenance-free beacon solution that does not require setup and yet may be used to deliver accurate indoor positioning to any mobile device.

Indoor positioning can facilitate navigation, analytics, and contextual engagement of users. For instance, in the retail store environment, indoor position information can help shoppers locate items on their shopping lists, and can help stores track their employees and physical assets. These interactions can then be analyzed to generate valuable insight on user traffic—where shoppers go, how they get there, dwell times, who they interact with and so on, all of which can be used for floor plan and workflow optimization. Contextually, location data can be fused with point of sale data and online activity to deliver new experiences to shoppers. They can be engaged directly on their mobile device or looking to the future, by changing the environment around them—for instance, shelves that light up to highlight items of interest to any given shopper. Additionally, data on how users utilize the floor plan of a building or similar structure is incredibly useful for the optimization of building systems, such as lighting and HVAC (heating, ventilation, and air conditioning), resulting in an improvement in user comfort and increased energy savings. User position data may be used to optimize building floor plans based on real-world data and analysis on how users occupy a space over any given time period. Energy savings and improved floor plans result in monetary savings for building owners, operators, and tenants.

The present solution can capture user location with improved granularity in their measurements, is less expensive and easier to deploy, and/or is less intrusive to users. For example, the use of occupancy sensors, including PIR and/or Ultrasonic sensors may be unable to differentiate one user from multiple users. Cameras, such as security cameras, are expensive and intrusive, especially when used in an office setting. Wi-Fi tracking, where wireless access points detect and record user smart phone MAC addresses lack in user position accuracy, especially when installed in locations with numerous partitions, walls, and levels, such as offices, hospitals, universities, and similar venues.

Common with all these technologies is their inability to bring any value or usefulness to the user, rather they are strictly employed for user tracking and/or as an input into a building management system, such as an occupancy sensor for lighting or HVAC. Smart phones, wearable tech devices, apps and digital marketing become seamlessly integrated into our daily lives. The present solutions can deliver indoor location infrastructure using lighting and sensors throughout spaces to deliver this service directly to users while providing user tracking. Localized wireless solutions, such as wireless beacons, are emerging as a solution for indoor positioning. A wireless beacon is a one-way, open wireless broadcast, often using Bluetooth low energy (BLE) that includes some type of data. This broadcast may be detected simultaneously by multiple nearby mobile devices, of which the data is read without the requirement to connect or pair to the wireless beacon. Often the data is configured in the form of a universally unique identifier (UUID), but in all cases at its simplest form, the data is simply broadcast information.

Physical hardware can be deployed to provide wireless beacons. Third-party beacon hardware may include small, battery-operated modules configured with the single task of broadcasting wireless beacon signals. Without special physical placement and setup, the use of wireless beacons for user positioning is largely inaccurate, at best a proximity solution. This is because conventional positioning using beacon broadcasts measures the power present in the received radio signal (referred to as received signal strength indication or RSSI) and compares it to the original broadcasted power level, the power level included in the beacon broadcast. In a real world environment, this technique produces inconsistent readings largely because of physical constraints, such as varying room layouts, varying obstructions (including people), and the orientation of the mobile device at the time of receiving the broadcast. Additionally, when detecting two or more beacon broadcasts, it is often difficult to establish which beacon device is physically closer.

Today's beacon hardware requires a planned installation; with beacon devices often installed near points of interest. A point of interest could be for example a product display in a retail store, such that as the user approaches the display, their mobile device detects the local beacon signal and establishes proximity to the display. A point of interest could be for instance a conference room in an office building. In either case, the mobile device would have been preprogrammed or updated by a remote server to associate the specific data in the beacon broadcast, such as the beacon UUID, with the specific location and therefore react accordingly. In some embodiments, beacon hardware may be installed in known geo positions, and then calibrated to provide more accurate positioning using techniques such as triangulation to establish an approximate user position. In either case, these devices require careful planning and programming for a successful deployment. With batteries, these devices require careful consideration to their operation (e.g. broadcast power and interval) as well as maintenance. Battery life is dependent on the time period of the beacon broadcast, however by reducing the broadcast period in order to save battery life greatly reduces the likeliness of the beacon being reliably detected by a mobile device. As with any device that requires maintenance, today's beacon hardware must also be easily accessible, making these beacons volatile to tampering or vandal. In commercial environments where long-term deployments are desirable, these limitations are significant when deployed at scale, especially considering the millions of batteries to be changed every year.

As a means of monetizing and/or controlling wireless beacons, third-party beacon companies often lock down their beacon broadcasts using encryption and other proprietary techniques. This is seen for instance with Apple's iBeacon, where an app in iOS can only hear beacon UUIDs it knows of in advance. Otherwise, if the UUID is unknown, iOS obfuscates the beacon UUID rendering it useless to other Apps. In other configurations, beacon companies require a paid subscription and an SDK to be installed to third-party apps, the SDK then used to decode the beacon and in many cases provide advertising services. Some beacon companies require advertisers to use their proprietary advertising exchange or interface to deliver advertising and coupons to the mobile device. Others require their own proprietary app to be used for beacon interaction. In all cases, this approach is short sighted as it creates a closed beacon ecosystem built around proprietary hardware and subscribing Apps that are limited to specific functionality. This leads to a physical beacon per App industry focus, where a single indoor location may require multiple beacon devices in order to support multiple Apps, each beacon requiring setup and interacting with a different App, which is both inefficient and largely impractical. Combined with the inaccuracy of using a single beacon to establish position based on RSSI, and the short lifetime of beacon batteries as described, beacons in their current state are limited.

The present solutions provides a maintenance-free beacon solution that does not require setup and yet may be used to deliver accurate indoor positioning to any mobile device through the integration of wireless devices directly into light fixtures and light bulbs, either natively or through the use of an add-on component. The combination of beacons and lighting creates an opportunity to leverage existing lighting infrastructure, providing an unlimited power source for the beacon installed in a tamperproof location. With lighting's ubiquity and even distribution throughout spaces, the ongoing transition to LED lighting from conventional sources provides an opportunity for the deployment of beacons without requiring additional beacon hardware. It also provides the opportunity to implement within the same device wireless sniffing that detects mobile devices such as smart phones and wearable technology through Wi-Fi, cellular, and/or Bluetooth detection or similar.

Beacons may be installed directly inside of the lighting fixture or bulb or attached directly to a light fixture housing. The beacon hardware, referred to as the ACB (advanced control beacon), may be an integrated circuit comprised of a processor and wireless radio on a single chip. Alternatively the ACB may include one or more processors, wireless radios, memory, crystal, antenna, and/or one or more sensors, dimming control inputs, and dimming control outputs as a means of providing feedback to the ACB processor and enabling the ACB processor with the ability to control the lighting intensity and on/off state of the Light Source. In one embodiment, the ACB includes a solar cell that harvests energy directly from the light source to power the ACB.

Each ACB beacon transmits a wireless broadcast containing a method of unique identification, such as a unique identifier that can then be used for mobile positioning. The ACB broadcast may also include Lighting Data, such as energy metering and lifetime monitoring data, and Ambient Data, such as mobile devices detected by sniffing for wireless signals, MAC addresses, and similar information. The wireless broadcast may also include data regarding the power of the wireless broadcast and calibration data. The broadcast regardless of its protocol and format is referred to as the BecoID. To provide security and prevent beacon hijacking and spoofing, some or part of the BecoIDs may change on a defined or random interval, the interval in some cases defined by variables such as lighting run time and/or time of day. The BecoIDs may be calculated by the ACB processor using an algorithm or polynomial equation seeded with a unique number, such as the ACB processor's media access control (MAC) address, a Device ID or similar. One format for broadcasting a BecoID is in the form of a URL (uniform resource locator, used interchangeably in this document and in practice with URI (uniform resource locator) and URN (uniform resource name), the functionality of URL, URI, and URN achieving the same result), the URL comprising a unique identifier that may be combined with Lighting Data and/or Ambient Data as described. Another format for broadcasting the BecoID is in the form of an iBeacon, comprising a UUID, Major, and Minor value, of which the UUID, Major and/or Minor are bits that may change over time for security. The URL, also known as a URI Beacon, and iBeacon protocols described are two examples of Beco ID format, however the format and delivery of BecoIDs may vary widely as described in this document and may be expressed as a BecoID or simply a UUID, both terms used interchangeably.

Each ACB may also include the ability to listen for nearby wireless devices. This may be done by switching the operation mode of its wireless radio from broadcast to receive, where the wireless radio becomes available for connection to nearby devices and/or attempts to connect with nearby devices and/or scans for nearby devices. The use of multiple radios may be employed to detect different wireless signals, these radios each with their own antenna or sharing the same antenna. Upon detecting nearby wireless devices, the ACB may record the event to memory. It may also adjust lighting operation, such as adjusting the on/off state and/or brightness of one or more light fixtures. Such data that is collected by the ACB is collectively referred to as Ambient Data and may be stored in the ACB database for future retrieval, including being broadcast in the ACB wireless beacon as previously described.

Upon detecting one or more BecoIDs, nearby mobile devices may use this detection to trigger an event or record the detection as an event. In one case, the mobile device may simply reference the detected BecoID against a known database in the mobile device memory to determine its proximity, e.g. I hear BecoID 123, BecoID 123 is near a Kitchen, therefore I am near the kitchen). In more advanced variations, the mobile device may issue what is defined in this document as a Location Request, which may be a URL hit, API call, or similar to the Location Engine, the Location Engine being comprised of a collection of one or more remote servers connected through the internet and responsible for managing BecoIDs, metadata, such as ACB physical locations, and in some cases content that may be associated with one or more BecoIDs. The Location Request is done through an Application Programming Interface (API), hitting a URL, or similar means of connecting one or more remote devices to one or more servers. The Location Request may include all BecoIDs detected or a filtered sampling of BecoIDs, for instance submitting only BecoIDs that are detected above a minimum RSSI threshold or for instance the BecoID that is consistently the highest RSSI for a given time period. In a simple form, the Location Engine may simply decode the BecoID and return back to the mobile device information, such as the BecoID's decoded value, metadata etc. In an alternate configuration, upon receiving one or more BecoIDs, the Location Engine decodes each BecoID to a known ACB, typically cataloged by a unique Serial Number, which may be its MAC address, a Device ID, or similar unique identifier. BecoID is used throughout this document to describe a unique identifier broadcast by the ACB, however as noted, as BecoIDs may change with time, in most all cases they point back to a unique Serial Number that is static. In a more advanced configuration, the Location Engine may establish that the combination of BecoIDs correspond to a known Location Identifier, the Location Identifier being a unique number assigned to a physical location comprised of two or more BecoIDs. The Location Identifier may be expressed in as a unique identifier (such as a number) or in the form of a Virtual Beacon ID. A Virtual Beacon ID simply presents the Location Identifier in a format understood by the mobile device. In one example, the Virtual Beacon may be delivered in an iBeacon format, the Location Identifier presented as a UUID with supporting Major/Minor data (per the iBeacon definition, iBeacon being an Apple standard). Upon detecting two or more BecoIDs, if no such Location Identifier exists, the Location Engine may automatically create a new Location Identifier. In a more manual process, BecoIDs and/or Location Identifiers may be checked into the Location Engine database.

Upon receiving a Location Request, the Location Engine may respond to the mobile device. The response may include the decoded value(s) of one or more BecoIDs, a UUID, a Major/Minor, a Location Identifier, metadata, a Virtual Beacon ID, etc. With the Location Engine response, the mobile device is able to deliver contextual information, such as advertisements and coupons. It is also able to interact with the physical space around it by directly communicating with nearby devices, through the Location Engine, or through a third-party system. The delivery of the advertisements may directly integrate with third-party Ad-Servers, such as programmatic Ad-Exchanges, where the mobile device upon requesting an advertisement from the third-party Ad-server includes a unique identifier, such as a UUID, Major/Minor, and/or Virtual Beacon ID in the request, enabling the Ad-Server with user location data. Other information such as a unique identifier on the mobile device, such as an advertising ID may also be used. With the Location Engine response, the mobile device is also able to establish the user's position as it pertains to proximity in physical spaces, absolute position, and/or other nearby users. This adds increased functionality for Apps in the form of automation, for instance automating tasks that are location specific or improving the user experience as it relates to their location. It also provides the opportunity for third parties to learn user schedules as it relates to the operation of their service and/or the delivery of targeted advertising.

In most all variations, the Location Engine may use all available data, whether known at the time of creating a BecoID and/or Location Identifier, or collected and stored over time by maintaining a database Location Requests and associated data, in order to optimize the Location Engine functionality and position accuracy. This data may be supplied directly by the mobile device through the Location Request, by third party data sources, or using a Gateway Device that is at the same physical location as one or more ACBs and configured to collect data from the ACBs that is then connected into the Location Engine. Data may include measured RSSI, mobile device MAC addresses, whether Bluetooth, Bluetooth LE, or WI-FI, nearby Wi-Fi access points, mobile device ID, user IDs and other information about the mobile device, its user, and its environment. This data over time may be used to strengthen the position accuracy of any given BecoID and/or Location Identifier, in part by using additional data points to interpret RSSI measurements, such as by using fingerprinting techniques. BecoIDs may also be dynamically reassigned to new Location Identifiers or shared between one or more Location Identifiers in order to optimize the Location Identifier position accuracy over time.

In addition to providing location services, the Location Engine may also record all Location Request activity, this data then made available for Location Analytics capable of providing feedback to building management systems, such as lighting systems, security, HVAC, demand response, and other systems and/or generating visualizations and reports about the usage of the space. Location Analytics may also be used to visually display key performance indicators, such as total visits, duration of visits, repeat visits, utilization of space and similar information that may be assembled based on connectivity between the mobile device and the Location Engine. Additionally, the Location Engine may use this data to provide real-time, scheduled, or predictive feedback to a third party system. This may be done through an API or connected directly using a local connection to a Building Management System (BMS), where data such as real-time occupancy of a room, may be provided back to the building, for instance directly to a BMS, such as one using BACnet, LonWorks or similar to interface with building systems to provide building services. The Location Engine may also use available data to predict user occupancy, including the arrival or departure of one or more users, enabling the BMS to adjust building services in advance of a predicted event (such as enabling cooling in a specific room several minutes before the arrival of a user).

Additionally, upon receiving a Location Request, the Location Engine may decode data that is embedded by the ACT into the BecoID. This data may include but is not limited to Lighting Data and Ambient Data. Lighting Data includes any and all operational data of the ACB and its host Light Source, including but not limited to energy metering, operating hours, temperature, light intensity, intensity histogram, $CO_2$, and other measurable data points. Ambient Data may include any and all local data about detected nearby devices, including wireless devices, such as mobile devices, computers, displays, and similar. This data may include one or more detected MAC addresses, the MAC being complete, abbreviated, or hashed. It may also include a simple count of detected devices over time, the devices being filtered by transient devices verses static devices, the static devices determined by the ACB to be a constant and not reported. The ACB may also include a database that includes some or all of a hashed MAC address, time stamp, and RSSI level. Lighting Data and Ambient Data is then put into a database and harvested with each Location Request. With the Lighting Data, Lighting Analytics may be performed, including for any given bulb or light fixture its energy consumption over time, operating hours, operating temperature, error codes, and/or any other useful information that may be used to improve the quality and performance of what will soon be billions of LED bulbs and fixtures deployed worldwide. With the Ambient Data, Location Analytics may be improved by capturing not only devices making Location Requests (for instance those with an appropriate App or operating system to do so), but also for those devices that are nearby that include a wireless radio however are not in connection with the Location Engine.

Although generally described as providing a location identifier or information in response to a location request, any type of information associated with ACB device may be retrieved by a location engine or server and used for further processing. Additional information can include, e.g., profile information associated with the ACB device, status information, environmental information, sensor information, etc.

In contrast to building networks today, such as lighting control systems, BACnet and others, the present embodiment does not require integration into building networks because the Lighting Data and Ambient Data is forwarded to the Location Engine with each Location Request using any nearby mobile device, the nearby mobile device providing the Lighting Data and Ambient Data to the Location Engine. In some cases this is done providing the server with the data, for instance an App or the mobile OS hitting a URL that includes this data. In another case its done in exchange for positioning data, including a Beco ID, Location Identifier, Virtual Beacon ID, and/or metadata about the location, where for instance an App or the mobile OS hits the server with for instance a URL or API call and receives a response.

In the case where a dedicated connection to the Location Engine is available, the ACB may also communicate with the Location Engine using existing building infrastructure, such as a location area network (LAN), Wi-Fi network, or similar. In one example, the ACB would include a WI-FI radio to communicate on the LAN. Alternatively, a Gateway Device may be used such that one or more ACBs may communicate directly to a nearby Gateway Device, such as a wireless gateway that includes an Internet connection, such as one through a LAN or wireless connection such as a 4G cellular modem. The communication may be as simple as the Gateway Device detecting the ACB beacon broadcast and forwarding the data to the Location Engine. In one example, the Gateway Device would maintain a continuous scan mode, detecting nearby ACB beacon broadcasts. In another example, the Gateway Device would connect directly to each ACB, for instance polling the ACBs and requesting data. In another example, two or more ACB beacons forming a mesh network that relays messages from one ACB to another and eventually to the Gateway Device. In another case, the Gateway Device could be a mobile device. In all cases, the Gateway Device would be in communication with the Location Engine. This communication may be continuous or on a defined interval.

In some aspects, the present solution is directed to innovative systems and methods of attaching a beacon to a light bulb including functionality, such as rotating UUIDs, collecting lighting data and/or via location requests, the ACB solar module, using a light sensor to perform energy metering, using multiple beacon broadcasts to refine position, adjusting beacon operation based on environmental inputs and available stored energy, coordination with other ACBs through beaconing, methods of power conversion, etc.

In some aspects the present solution is directed to innovative systems and methods of virtual beaconing. One unique technique implemented by the solution is hearing 2 or more beacons and reporting the beacon identifiers to a server that in return issues a virtual beacon. This creates a shared platform that allows many companies to use one collection of beacons as though they were their own proprietary beacons. The use of multiple beacons for reliability and refined positioning, location creation without setup, automatic management of locations, and the ability to virtualize beacons through a lighting platform etc. are further unique functionality and advantages of some aspects of the present solution.

In some aspects, the present solution is directed to innovative systems and methods of building analytics. One technique implemented by the solution is measuring its local environment by detecting nearby wireless mobile devices using one or more wireless radios and then reporting the wireless activity to generate and/or strengthen user location analytics that are used to improve building functionality and space planning. This data may also be used to influence the operation of building systems such as HVAC, lighting, security and others. This data may be used standalone or combined with other data sources, including interaction with mobile devices through Apps, the mobile operating system etc. This data may also be used to directly adjust the lighting intensity of one or more nearby light sources, the detection of a nearby wireless mobile device used as an alternative means of user occupancy detection.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

At least one aspect of the present solution is directed to a device. In some embodiments, the device includes a housing that includes a processor and a wireless radio. The device can include one or more clips that are configured to securely attach the housing adjacent to and a predetermined distance from a portion of a light tube that produces light. The device can include one or more solar cells that are configured to be exposed to the light from the light tube upon the housing being securely attached via the one or more clips adjacent to the portion of the light tube. The device can include a circuit by which power is converted from the one or more solar cells to the processor and the wireless radio via at least one switch. The wireless radio can be configured to broadcast a beacon provided by the processor.

In some embodiments, the one or more clips are one of removable or attachable to the housing. The one or more clips can be configured to attach to a light tube of one of a particular type or diameter. The predetermined distance between the housing and the portion of the light tube that produces light can be a distance by which the light from the light tube provides power at a level to operate the processor and the wireless radio. The device can include a storage component to store energy. In some embodiments, the device can include a power converter to convert a first voltage from the one or more solar cells to a second voltage that operates one or more of the processor, the wireless radio or storage component.

In some embodiments, the beacon provided by the processor includes a string encoded with a key. The beacon can include a uniform resource identifier that identifies a web address followed by data that includes the encoded string.

The beacon can include a universally unique identifier followed by a major and minor value. The beacon can include measured data, sensed data, observed data, or detected data. In some embodiments, the processor is configured to change at least a portion of the beacon to be broadcasted by the wireless radio. The processor can be configured to change at least a portion of the beacon as a function of one of an equation, an algorithm or time. In some embodiments, the device can broadcast the beacon at a predetermined frequency for a defined period of time. The processor can adjust the frequency of the beacon broadcast as a function of the power available from the one or more solar cells.

Another aspect is directed to a system that includes a solar-powered device and a server. The solar-powered device can include a housing containing a processor and a wireless radio. The solar-powered device can include one or more clips configured to securely attach the housing adjacent to a portion of a light tube that produces light. The solar-powered device can include one or more solar cells configured to be exposed to light from the light tube upon the housing being securely attached via the one or more clips adjacent to the portion of the light tube. The processor can be powered via the one or more solar cells and configured to provide a beacon. The beacon can correspond to an identifier associated with the solar-powered device. The wireless radio can be powered via the one or more solar cells and configured to broadcast the beacon. The server can include a database that includes one or more identifiers and one or more keys. The one or more keys can be used to map the beacon to the one or more identifiers. The server can be configured to receive from a second device a request comprising the beacon. The second device can receive the beacon from the broadcast of the beacon from the solar-powered device. The server can be configured to respond to the second device with the identifier from the database.

In some embodiments, the processor is configured to change at least a portion of the beacon comprising a string encoded with a key of the one or more keys. The solar-powered device can be configured to broadcast different encoded strings for the same identifier. In some embodiments, the second device is a mobile device configured to receive the beacon. Responsive to the beacon, an application on the mobile device can transmit to the server the request identifying the beacon. The server can receive from the second device the request including a uniform resource identifier that includes or identifies the beacon. The uniform resource identifier can be an encoded uniform resource locator that is decoded and redirected by the server.

The server can use a key of the one or more keys to decode the beacon and use the decoded beacon to map to the identifier in the database associated with the solar-powered device. The second device can receive within a predetermined time multiple beacons from multiple solar-powered devices. The second device can transmit one or more requests to the server for each of the received beacons. The server can determine a single identifier responsive to receiving the multiple beacons and can transmit to the second device the single identifier.

Yet another aspect is directed to a method. The method can include attaching a device adjacent to and a predetermined distance from a portion of a light tube that produces light. The method can include attaching the device via one or more clips. The device can have a housing that includes a processor and a wireless radio. The method can include the device receiving power via one or more solar cells of the device exposed to light from the light tube. The method can include the device converting, via a switch, power from the one or more solar cells to the processor and the wireless radio. The method can include the wireless radio broadcasting the beacon.

In some embodiments, a server receives a request from a second device. The request can include the beacon received from the broadcast of the beacon from the device. The request can include a uniform resource identifier identifying the beacon. The uniform resource identifier can be an encoded uniform resource locator that is decoded and redirected by a server. The server can transmit, responsive to the request, to the second device an identifier associated with the device.

In some embodiments, the device can broadcast, via the wireless radio, the beacon at a predetermined frequency for a defined period of time. The predetermined frequency can be determined as a function of the energy available from the solar cells. The device can harvest energy from the one or more solar cells to a storage device.

In some embodiments, the method can include attaching the one or more clips to the housing. The one or more clips can be configured to attach to a light tube of one of a particular type or diameter. The predetermined distance can include a distance by which the light from the light tube provides power at a level to operate the processor and the wireless radio.

In some embodiments, the method includes the processor generating the beacon to include a string encoded with a key. The processor can generate the beacon to include a uniform resource identifier that identifies a web address followed by data that includes the encoded string. The processor can change at least a portion of the beacon as a function of one of an equation, an algorithm or time.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
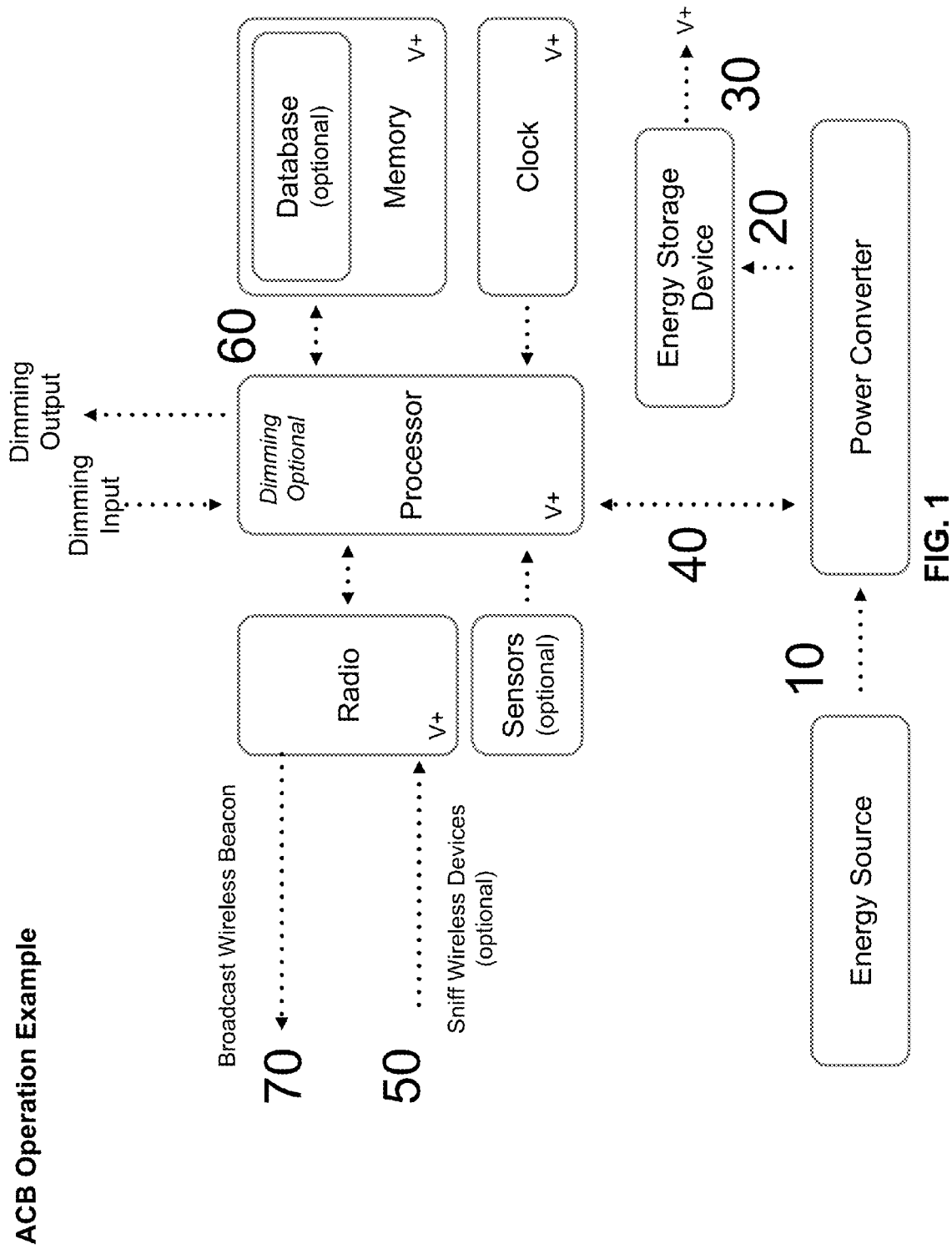
FIG. 1 is a block diagram depicting components of the Advanced Control Beacon, in accordance with an embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present solution is directed to systems, methods, and apparatus for light enabled indoor positioning and reporting. In some embodiments, the present solution includes or uses an advanced control beacon ("ACB"). For example, an ACB (e.g., ACB 1135 illustrated in FIG. 11) can be an electronic device that is installed into or adjacent to one or more light fixtures, light bulbs, light engines, light panels, light housings, light displays, decorative light fixtures, multi-purpose lighting products, or similar such devices, collectively referred to as the Light Source. The ACB can also be installed into or adjacent to any hardware device such as an occupancy sensor, daylight sensor, furniture, kiosk, or similar devices also for purposes of this document referred to as the Light Source. The ACB can include electronic components installed within or adjacent to the Light Source. The Light Source can have any configuration, such as any lighting technology ranging from solid state, organic, or filament (with or without a gas) type sources, whether a Light Emitting Diode (LED), organic LED (OLED), fluorescent, neon, plasma, HID, inductive, incandescent, halogen, or any other source of lumen generation.

The ACB's electronic components can include (or solely include or consist of) an integrated circuit that includes one or more processors (e.g. central processing unit) and a wireless radio on a single chip with supporting components such as an antenna, clock, and memory. The ACB can use a combination of two or more processors, a first processor managing the operation of the ACB and a second processor managing the wireless broadcast and when applicable wireless protocol and stack. The use of two processors can be used to divide up operational tasks, add a layer of security, and/or conserve available energy when operating in a low energy environment, for instance by putting the second wireless radio processor into a low power mode while continuing to operate first processor. In one embodiment, the ACB clock may use a crystal installed to the ACB or may reference the AC line voltage 50 or 60 hertz sine wave if available, either using a direct connection to the AC line voltage or using an antenna or resonator on the ACB to detect the waveform.

The ACB may be installed directly to the same circuit board that contains at least one or more LEDs. In some embodiments, the ACB may be installed to a second circuit board with electronic components such as an LED driver and/or as a second daughter circuit board attached to a first circuit board containing at least one or more LEDs. In another embodiment, the ACB may be a module, whereas the module includes one or more processors, one or more a wireless radios, and supporting components such as an antenna, clock, memory, sensors, and/or a power converter installed to a printed circuit board (PCB) that is then installed into the Light Source.

In one embodiment, the ACB module may be directly soldered and/or wired to a circuit board within the Light Source. In another embodiment, the ACB module may be directly wired to an LED driver and/or wire harness within the Light Source. In another embodiment, the ACB may be in the form of an occupancy sensor module, where the module attaches to the ceiling or wall, with or without a junction box. In another embodiment, the ACB module may include one or more solar cells (e.g., solar power module 1145 illustrated in FIG. 11) to power the ACB and may be attached to one or more LEDs or attached directly above or adjacent to one or more LEDs with the solar cells oriented towards the Light Source. The attachment of the ACB module may be mechanical, adhesive, or use other known attachment techniques. In one embodiment the ACB module is heat staked to the printed circuit board. In another embodiment, the ACB module may be clipped directly to a fluorescent or LED light tube, such as a T8 format, using a mechanical clip, strap, or similar means of attachment (e.g., fastener 1125 illustrated in FIG. 11) that then allows the ACB module to harvest solar energy from the light tube (e.g., light source 1120 illustrated in FIG. 11). In another embodiment, the ACB module may be installed to the lens, housing, or other physical features of the Light Source, using any available means of mechanical or adhesive fastening, including the use of one or more magnets.

The ACB processor(s) may be tasked solely with the purpose of a wireless beacon broadcast, or may be used for multiple operations, such as managing the wireless broadcast, wireless sniffing, and concurrently managing the Light Source, for instance setting the brightness, schedule, and other features to create one or more lighting states. The lighting states may be set using a dimming input or wireless interface or may be set by the ACB based on environmental inputs, predefined rules, and/or a programmed schedule. The ACB may include one or more sensor inputs, the sensors installed as part of the ACB assembly or installed elsewhere on or nearby the Light Source. The ACB may interface with third party control systems and/or Light Sources using a dimming control input or output, such as a 0-10V control voltage, a phase control dimmer such as a TRIAC (triode for alternating current) or SCR (silicon-controlled rectifier) type dimmer, a pulse-width modulated (PWM) signal, a FET (field-effect transistor), relay, solid-state relay, transistor, Ethernet, Power-Over-Ethernet, DMX, RDM, DALI, BacNet, LonWorks, Heart, Serial, Parallel, RS-232, RS-422, RS-485, I2C, SPI, power line communication, and similar or any combination of inputs and outputs, such as PWM used to drive a FET. In some implementations, one or multiple wireless control techniques may be used, including Bluetooth, Bluetooth Low Energy, Wi-Fi, Zig-Bee, ANT, Z-Wave, 6LowPan, Wi-Max, Cellular, 4G, 802.15.4, and similar or any combination of wireless radios, such as a Bluetooth Low Energy and a Zig-Bee radio used on the same ACB.

The ACB may be powered by AC mains voltage, such as 120, 240, 277, 347, or 480V AC. The AC circuit that powers the ACB may also power the Light Source, in which case the ACB may use onboard energy storage to remain powered for some or all of the duration where AC line voltage is not available. The ACB may use one or many types of power converters, including a switching regulator, such as one of a fly-back, buck/boost, hysteretic, SEPIC (single-ended primary-inductor converter), power factor correction circuit, or similar to reduce the AC main to a lower voltage required for logic level components. In some embodiments, the ACB may reduce the AC main to a lower voltage using a passive means, such as by using a full wave bridge rectifier and a series capacitor, resistor or LDO (low-dropout regulator), or by using a transformer, inductor, or other means of electromagnetic voltage reduction or coupling. Other means of powering the ACB include powering it using a power supply, such as that used to drive LEDs. This includes connecting the ACB in series or parallel to the output of an LED driver and drawing current away from the LED source using a current limiting device, such as a resistor, LDO, linear regulator or similar. Wiring the ACB in parallel across one or more LEDs may also do this, the ACB using the voltage drop of the LED to reduce the voltage to for instance 3 volts (a common LED voltage) that may be used to directly power the ACB and therefore require minimal power conversion electronics. Other power conversion techniques include using a buck, boost, buck/boost, or similar switching regulator/converter that includes at least one switch and accepts a wide range of input voltage from the LED driver while providing a regulated voltage to the ACB processor and other electronic components. The regulator may be outfitted with a soft-start or delay in turning on as to not interfere with the normal operation of the LED driver. The on-time duty cycle of the ACB may be adjusted using a switch that connects/disconnects the LED load from the ACB. This allows the ACB to draw current to charge an energy storage device, then disconnect from the LED load until additional current is required. In some embodiments, a capacitor may be placed in parallel with the regulator in order to minimize flicker and other artifacts that may appear in the Light Source while drawing power. In all cases, the power converter may be installed directly to the ACB or ACB module or may be installed elsewhere within the Light Source, for instance directly to an LED driver circuit board or circuit board that contains one or more LEDs.

Another means of powering the ACB is to use energy harvesting from other available power sources, such as lighting control signals (including 0-10 volt control), one or more solar cells, vibration, resonance, temperature changes, ultrasonic waves, radio waves and similar. Energy harvesting offers the advantage of physically small and low cost components and in some cases free energy to power the ACB. Energy may be stored in a storage device or used directly by the ACB processor and supporting components. The storage device may be a capacitor, super capacitor, battery, inductor, transformer or similar. In some cases one or more storage devices of the same or different type may be used. In one embodiment, the function of the storage device is to store energy such that the ACB continues to function when available energy is too little or none at all. This allows the ACB to keep alive critical functions, such as its onboard clock during periods of little available energy. In a similar embodiment, the storage device provides supplemental energy for peak power demands, such as during a wireless transmission. In a similar embodiment, upon loss of power, the storage device keeps the processor operating long enough such that the processor is able to detect the power loss and thereafter save one or more values to non-volatile memory prior to shutting down. This reduces the number of write operations to non-volatile memory that may wear out over time. A second storage device may be used to provide an alternative source of energy, for instance a battery, whereas the battery may be used for operation during periods when there is no input voltage. A diode, switch, or other means of switching automatically the battery in and out of use may be employed. The battery may be switched into the circuit automatically or may be engaged by the processor.

In one embodiment, the ACB includes one or more onboard solar cells (e.g., solar power module 1145 of FIG. 11) that generate a voltage and a current to power the ACB. The solar cell(s) may be oriented to directly harvest energy from the Light Source, for instance in one embodiment being directly positioned above or adjacent to one or more LEDs within the Light Source. The one or more LEDs may be one of white light, red light or infrared, in one embodiment, the Light Source comprising white LEDs for general lighting with one or a small quantity being that of Red or Infrared LEDs installed to power the ACB (and therefore maximizing the solar cell efficiency). In another embodiment, the ACB may be installed directly or adjacently to a fluorescent or LED bulb by means of a clip, snap, strap, magnet, tape, hardware fasteners, gravity, or similar, in this case the ACB being installed within or external to the Light Source. In either case, the ACB may be comprised of a molded housing, the housing including one or more printed circuit boards, the circuit boards containing the ACB electronic components. The printed circuit board(s) may snap or slide into the housing, the housing consisting of five enclosed sides and therefore leaving a sixth surface exposed to allow the solar cell(s) access to the light source. In one embodiment, the printed circuit board includes a first top side and a second bottom side, whereas the first top side includes a processor and wireless radio. These components may be discrete parts or in the form of an off the shelf module, such as a Microchip RN4020 Bluetooth module. The second bottom side includes one or more solar cells. An energy storage device (as earlier defined) and/or a power converter, such as a boost, buck, buck/boost, SEPIC, hysteretic, linear, LDO, resistor, or similar power converter may be installed to the first top or second bottom side. The power converter converts the voltage from the solar cell, a first voltage, to a second voltage that charges the storage device and operates the processor and wireless radio, the first voltage being a different voltage than the second voltage. The power converter may include at least one switch that may be internal or external to the power converter's integrated circuit (IC). The power converter logic may be performed by the ACB processor, the ACB processor using an external switch to regulate current flow with the option of using an analog to digital input and/or an op-amp to sense voltages. In one embodiment, by adjusting the switch duty cycle, the power converter is able to efficiency convert the first voltage to a second voltage. The power converter may include at least one inductor, capacitor, or transformer for storing energy between switching cycles, the inductor for instance charging when the switch is on and discharging when the switch is off. The power converter may use one or more feedback loops or signals in order to adjust its operation depending on the first voltage as measured. In a similar embodiment, the ACB processor may measure the first voltage and/or the second voltage and adjust the operation of the power converter, including enabling, disabling, and/or adjusting the power converter output and/or on-time duty cycle based on measured inputs. In another embodiment, the ACB processor may indicate status of the ACB by toggling the on/off state of an LED indictor, for instance upon initial installation of the ACB, the LED indicator may flash green light to indicate to the user that the ACB processor is harvesting energy as expected.

In another embodiment, voltage may be converted in two or more stages using two or more power converters and/or switches. In a similar embodiment, a first power converter boosts the voltage from the solar cell, a first voltage, to a higher second voltage. The second voltage is stored in a first storage device, such as a capacitor or inductor. A second power converter then reduces the second voltage to a lower third voltage. The third voltage provides voltage to the processor, wireless radio, and other voltage sensitive electronic components such as CMOS and logic level parts. In some embodiments, the third voltage may be stored in a second storage device, such as a capacitor or super capacitor. In operation, the first power converter operates continuously as long as there is voltage available from the solar cell to harvest. In some cases, the first power converter may operate in a burst mode of operation, where the power converter switches between a low quiescent current mode, which is an off state, and then on again in order to maximize energy harvesting. The second power converter may operate continuously, burning off excess power should no load be available or may operate in a disabled state and is only enabled once the first power converter charges the first storage device to a specified level. In one embodiment, the processor measures at least one of the first voltage, second voltage, and/or third voltage. The processor is then able to enable, disable, or adjust the operation, for instance the duty cycle of the first and/or second power converter to optimize efficiency. Upon the discharge of the first storage device to a specified level, the second power converter is then disabled. The power converters may include one or more switches, the switch used to enable or disable current flow into an inductor, transformer, or capacitor, the inductor, transformer or capacitor discharging during periods of switch off time and changing during periods of switch on time. Switches may be internal or external to the power converter integrated circuit. The advantage of this embodiment as described is that very low voltage, such as 0.8V from the solar cell can be efficiently boosted to a higher voltage, such as 15V. At higher voltages, capacitors are able to hold greater amounts of energy since energy=½cv^2 where c is capacitance and v is voltage. This energy is then stepped down to a lower voltage and stored in a super capacitor at for instance 3.3 or 5 volts, which are common working voltages for electronic components.

To maximize light collection onto the solar cell, the ACB housing may be shaped in a way that directs light onto its one or more solar cells. One way this is done is by shaping the ACB housing to follow the contour and shape of the one or more LEDs, Bulbs, and/or Light Source that it attaches to. In one embodiment, the ACB housing may fully surround one or more LEDs such that the majority of the light generated is captured (and therefore not emitted for illumination purposes). In another embodiment, the ACB housing may position the solar cell directly tangent to the Light Source (in the case where it is a light tube format) using interchangeable clips to snap the ACB directly to the Light Source. In another embodiment, the ACB housing may be configured in a half-moon arch shape that follows the contour of a fluorescent or LED bulb of which it is attached. In another embodiment the ACB may include a lens and/or reflector to focus and/or collimate light onto the solar cell. The reflector may be part of the ACB housing, having an aperture larger than that of the solar cell surface and configured to bounce light at least once from a curved surface directly onto the solar cell. The curved surface may be one of parabolic, stepped, square, triangular, or linear, the reflector being a linear shape installed on opposite sides of a rectangular solar cell. The lens would be installed directly above the solar cell and may be constructed from plastic, such as PMMA or polycarbonate, or it may be glass. In a similar embodiment, the solar cell may be encapsulated with a transparent or translucent encapsulate such as an optical grade silicone, where the encapsulate shape collects and directs light onto the solar cell.

In another embodiment, the ACB harvests energy from an industry standard 0-10V control voltage. For example, 0-10V dimming is an analog control signal that is a two wire, approximately 100 microamp current source that sets the intensity level of one or more connected Light Sources. Typically any voltage less than 1 volt sets the lowest light level and greater than 9 volts is the highest light level, with any voltage in between 1 and 9 corresponding to an intensity level, noting that the dimming curve may be linear, logarithmic, pseudo-log, or any other type of curve. In many embodiments, the 0-10V dimming signal is connected to one of an LED driver ballast, or other electronic circuit within the Light Source. In some embodiments, the 0-10V signal may connect to a control circuit board or similar configuration within the Light Source. To effectively harvest energy from the 0-10V source, the ACB is first connected to the 0-10V wires that are provided by the Light Source. The ACB is then able to dim the connected Light Source by setting the 0-10V level while concurrently harvesting energy from the 0-10V current source. To do this, the ACB uses an onboard power converter. In some embodiments, the power converter is a boost converter and takes the 0-10V voltage which is a first voltage and boosts it to a higher voltage, a second voltage, where the second voltage is always higher than the first voltage. In another embodiment, the power converter is a buck/boost converter, where the 0-10V level may be higher or lower than the power converter output. The power converter is modulated on and off by the processor to pull down the 10V current source to the desired intensity level, during which the power converter also harvests current from the 0-10V line. The modulation may be one of a square wave, such as a pules-width modulated signal, a triangle wave, or similar and may be done by directly modulating a switch, transistor, FET, or integrated circuit, for instance adjusting a shutdown (SHDN) pin.

To accurately set the 0-10V level and to eliminate the possibility of flicker, the processor measures the voltage of the 0-10V line and adjusts the on-time duty cycle of the power converter. One way this is done is by modulating the power converter on and off until the target intensity level, which is that of an average voltage on the 0-10V line is set. In some embodiments, a smoothing and/or filtering capacitor may be installed on the 0-10V line to eliminate the potential of creating noise or pulses on the 0-10V line that would lead to flicker in the Light Source.

In a similar 0-10V embodiment as described, the ACB may provide a 10V current source to attach a dimmer, appearing to the dimmer to be a Light Source, LED driver, or Ballast. This offers the advantage where the ACB may override incoming 0-10V levels and/or harvest current from the 0-10V Light Source as previously described while still enabling the ability for a third-party dimmer to control the Light Source. As a means of conserving energy and maximizing energy harvesting, the processor is able to enable or disable the 10V current source that it provides to the dimmer. By enabling the current source, the ACB energizes the 0-10V dimmer in order to take a reading on the 0-10V level requested by the dimmer. To conserve energy storage, the ACB processor may periodically enable the 10V current source to measure the dimming level rather than operate the current source continuously. One way this is done is by generating the 10V current source with an onboard regulator, then taking a measurement using a feedback path into the processor via an analog to digital input, and then disabling the regulator. To ensure that the 0-10V level is consistently monitored, the processor adjusts its measurement duty cycle based on measured dimmer activity and other factors such as time of day and other historical data. For instance, the processor may activate the current source to take a dimming reading every second. Under normal conditions, the dimming level as set by the dimmer remains constant. In the case where the processor reads a change in dimming level from a first measurement to a second measurement, it may increase the current source duty cycle to 10 times a second, assuming that the dimmer intensity level may be changing. By increasing the current source duty cycle, the processor is able to capture the full dimming cycle with a higher level of accuracy by sampling a greater number of dimmer set points. Using dimming smoothing, the processor is able to fill in any missing points. This makes the transition from one measured level to another appear smooth to the user's eye, despite the lack of measured data points. Once the measured dimmer level settles at an established set point and a new intensity level is defined, the processor adjusts the current source duty cycle to a reduced level to conserve energy. By using historical data, such as previous dimming interaction or the presence of users in a space, the processor proactively increases its duty cycle in anticipation of pending changes.

In a similar embodiment, the ACB may be configured to read a dimming input signal, such as a 0-10V level, and then generate a dimming output signal to one or more connected Light Sources. In this scenario, the dimming input may be used to set a maximum ACB dimming output. By defining the maximum ACB output, the dimming input, such as a third-party dimmer or building control system, is able to maintain general control of all connected ACB and their controlled Light Sources, while concurrently enabling the ACB to reduce the output dimming signal to save energy.

Under the condition where the power source is removed or if limited power is available, the ACB processor establishes a brownout period. This would occur for instance when the Light Source is de-energized at the end of a work day or in the case of solar energy harvesting, when the Light Source is at a reduced intensity. The ACB processor may also confirm the brownout using any of its onboard sensors, such as a light or color sensor or solar cell if available. In one embodiment, the ACB processor records its Lighting Data, such as some or all of its operational data such as run-time, energy consumption, and other operational data points of interest, as well as its Ambient Data, such as detected nearby wireless signals such as Wi-Fi, Bluetooth and others, to non-volatile memory prior to shutting down. In another embodiment, the ACB processor may reduce the ACB functionality and/or Light Source functionality in order to conserve onboard energy storage, the ACB entering a low power state, the low power state in some cases being an off state. Reducing functionality may include disabling its wireless radio, reducing the wireless broadcast interval, wireless sniffing interval, and/or power of wireless radio broadcasts, reducing the frequency of sensor measurements, entering one or more processors into a sleep or hibernation mode, and/or similar means of load shedding. The reduction of functionality may be done at the time the input voltage is removed or it may be anticipated by the ACB processor based on historical information, for instance the ACB reducing its wireless broadcast interval (its largest power demand) based on anticipation of reduced intensity of the Light Source using historical data. This may be done through the use of an algorithm where the algorithm may consider one or more of the following: Available Energy (at present), Projected Energy (based on historical usage), User Occupancy (at present), Projected User Occupancy (based on historical usage), Dimmer Input (at present), Projected Dimmer Input (based on historical usage). Available Energy and Projected Energy may be estimated by measuring one or more voltages, for instance measuring the first voltage at the solar cell and a second voltage at one or more storage devices. The ACB processor may also reference temperature as a factor in estimating available energy, taking in account the performance of electronic components and/or the Light Source at any given temperature. In the case where the ACB includes a dimming output, the ACB processor may increase the Light Source intensity in order to increase the available light for the solar cell to harvest and convert into energy, effectively overriding the normal operation of the Light Source as a means of preserving ACB operation. Multiple stages of load shedding are possible, for instance a first stage reducing the wireless beacon broadcast interval from, for example a first state of 10 broadcasts per second (10 Hz) to second state of 1 broadcasts per second (1 Hz) to third off state, the broadcast interval being possible to dynamically adjust based on available power.

To measure its environment, the ACB may include one or more sensors for measuring occupancy/motion, ambient light levels, ambient light color, temperature, humidity, air quality, carbon dioxide, acceleration, vibration, direction, sound, and similar means of measuring the physical world within the Light Source and external to the Light Source. The physical sensors may be physically installed to the ACB or ACB module or may be installed external to the ACB or Light Source and connected using wires, circuit board traces, or wireless technology to the ACB.

User occupancy may be measured using a passive infrared sensor (PIR), active IR sensing, ultrasonic detection using an ultrasonic emitter and detector, microwave detection using a microwave emitter and detector, terahertz detection using a terahertz detector and emitter, camera, microphone, wireless radio, or color sensor. Additionally, active infrared sensing may be used to detect occupancy through the use of an infrared sensor using an infrared emitter and infrared detector using time of flight techniques. Time of flight eliminates the concern of infrared light being absorbed by dark objects and offers the ability for the ACB to detect users even when they remain still. To do this, the ACB uses an infrared receiver to measure infrared levels within its field of view, then briefly illuminates a high power infrared LED and compares levels. Should humans or objects be introduced into the view of the receiver, the receiver is able to either measure the intensity of the reflected infrared minus the measured background, or using time of flight, the receiver measures the phase shift and in some cases the amplitude of the infrared light reflected back to the receiver. By multiplexing two or more IR emitters and/or transmitters additional accuracy may be introduced. Sensing techniques may be combined within a single ACB or Light Source to improve sensing accuracy, for instance combining a PIR sensor and a color sensor.

In some embodiments, occupancy sensing may include detecting (sniffing) wireless signals, such as mobile devices (including mobile devices broadcasting a wireless beacon or connecting to the ACB), nearby Wi-Fi networks, and/or MAC addresses of nearby wireless equipment such as mobile devices and other hardware. In this scenario, the ACB may switch one or more of its wireless radios into a receive mode for a predetermined period, where it may provide an available connection for a nearby wireless device and/or attempt to connect with a nearby wireless device, and/or scan for nearby wireless devices. In the case of Bluetooth, the ACB may alternate its Bluetooth radio between a Classic Bluetooth mode and Bluetooth Low Energy mode of operation, each mode used to detect different device types and in some cases to confirm a single device. In the case where wireless devices appear to be constant, the ACB may decide to generally ignore these specific devices, listening only for transient wireless devices. Additionally, the ACB may measure the wireless signal strength (RSSI) of nearby wireless devices, establishing an RSSI threshold that would establish whether or not a device is nearby. Often this is done by comparing the transmit power of the wireless device to the actual measured power level of the received signal.

In one embodiment, the ACB may use the detection of wireless signals as a means of occupancy detection, enabling one or more Light Sources and/or HVAC systems to turn on and off based on the presence of a detected wireless device. In the case of lighting, the ACB upon detecting the nearby wireless device may gradually increase the intensity of one or more Light Sources, enabling the ACB to operate the Light Source in a reduced power mode during periods of inactivity and therefore saving energy without requiring the complexity of adding a conventional occupancy sensor that requires a direct field of view of the area it is monitoring and therefore dedicated hardware.

In one embodiment, the ACB detects nearby wireless devices by enabling its wireless receiver, identifying wireless devices, storing some or all of the identified wireless device MAC addresses into a database onboard the ACB, and then disabling its wireless receiver to save power. The MAC addresses may be stored complete, hashed, or is assigned a unique identifier to each. MAC addresses may be tagged with a time stamp and/or RSSI value. Each subsequent time the ACB enables its wireless receiver it continues to build the database, in some cases deleting older entries to save memory space. The MAC addresses in some form, whether complete or hashed, and optionally including its time stamp and RSSI value may be then broadcast by the ACB to other nearby devices.

Ambient light levels may be measured by the ACB using a color sensor (of which one or all of the RGB channels of the sensor are used), a photo sensor or a solar cell, collectively referred to as Light Sensor. In any case, a secondary lens or light guide may be placed in front of the Light Sensor to define the sensor's viewing angle, in some cases widening the view, in other cases narrowing the view. In some embodiments, a light guide extension may be installed in order to allow an ACB Light Sensor to be recessed into the Light Source, the light guide extension in some cases extending through the Light Source lens. The light guide extensions may be plastic or glass, in the formation of a single optical light pipe or multiple optical fibers. The purpose of the Light Sensor is to provide feedback to the ACB processor such that the processor is able to perform one or more of the functions as follows.

In one embodiment, the Light Sensor is oriented away from the Light Source and is used to provide feedback to the ACB processor such that the ACB processor automatically adjusts the intensity of the Light Source to regulate the Light Source light intensity to a target intensity level. This technique saves energy by decreasing the Light Source light intensity as natural daylight in a physical location increases and increasing the Light Source light intensity as natural daylight decreases, regulating to but not exceeding the target intensity level. In addition, by measuring all or part of the spectral distribution, the Light Sensor may establish the type of lighting installed within a physical space as well as the Light Source's proximity to a window or skylight. Fluorescent lighting, LED lighting, and daylight for instance generate unique lighting spectrum profiles and include telltale wavelengths that may be detected by the Light Sensor. Upon detecting fluorescent lighting for instance, the ACB processor may implement a 100-hour burn period for a fluorescent Light Source prior to dimming its fluorescent lighting load.

In another embodiment, the Light Sensor is oriented away from the Light Source and functions as a communication input to the ACB processor. This is done by detecting data encoded in a series of high speed pulsed patterns or long term intensity changes generated by other nearby Light Sources, those Light Sources equipped with an ACB or similar lighting controller capable of encoding data into the Light Source light output. In one embodiment, this may be done using pulse-width modulation (PWM), frequency shift keying (FSK), or other means of modulating a light source, including any method commonly used for visual light communication (VLC), often requiring at least one switch, FET, TRIAC, or transistor. Such methods of communication creates a medium to deliver bi-directional communication between Light Sources that is useful for both the setup and long term operation of the Light Sources. For instance, upon installation, two or more Light Sources equipped with ACBs and a Light Sensor may establish that they are physically installed within the same physical location or in fact adjacent to each other. In another embodiment, data is encoded into the Light Source light output using long-term intensity ramps. This allows the ACB to discretely vary the light intensity of the Light Source by small increments over long time periods (e.g. minutes, hours, or days). This enables small data sets to be transferred and in some cases repeated over a defined time period, and therefore eliminating the complicated hardware required for high speed VLC. It also allows multiple Light Sources to communicate simultaneously without collision. Furthermore, it allows the ACB to add intelligent communications to any Light Source that includes a conventional dimming input without requiring factory modifications, for instance the ACB controlling the Light Source using a 0-10V input or using any of the conventional dimming and communication methods previously described. In one embodiment, the ACB processor embeds a binary pattern consisting of 1's and 0's into the Light Source light output by first setting a target intensity, then adjusting the light output above and below the target level, for instance above the target level being assigned a 1 and below being assigned a 0. Establishing a series of 1's or 0's uses timing generated by the ACB clock, such that for instance an intensity level above the target level for a time period of two, equals two consecutive 1's. A checksum may be used as a means of error detection. The change from one intensity level to another may be in the form of a ramp, such as a saw tooth waveform that may include a dwell time once a specified level has been achieved to eliminate the perception of flicker while still maintaining an average target intensity. In some embodiments, messages may be repeated on a defined loop to add reliability to the data stream. To illustrate this technique, as a way of example, the ACB processor sets the Light Source target intensity at 50%. By modulating the light level up to 60% and down to 40%, each with specified dwell times, the ACB processor embeds a series of 1's and 0's that are then read by adjacent ACB processors using Light Sensors installed in nearby Light Sources. In another embodiment, a Light Sensor used as a sole means of detecting occupancy. To do so, an optically clear or mildly translucent segmented lens is placed over one or more Light Sensors configured to measure color and directed at a target monitoring area. This same lens may be optionally shared with a PIR sensor. The lens segments divide incoming ambient light into segments that are focused onto the Light Sensor. The Light Sensor averages the color light from the segments and determines with great accuracy an exact color of the ambient light. The ACB processor reads the Light Sensor's output and sets a background level with a defined tolerance, a background level indicative of normal operation without a user present. When a user enters into view and crosses from one lens segment into another, the light reflected off of the user changes the ambient light color enough such that the ACB processor establishes that motion is detected and responds accordingly. The background level is actively adjusted by the ACB processor and may vary over the course of the day as ambient light color changes, especially in environments with windows. Smart algorithms take long term, historical averages. Looking at long-term averages verses brief changes in ambient light color, the processor is able to filter out false triggers and more accurately detect users. The advantage of using a Light Sensor (color sensor) for detecting motion is it allows the Light Sensor to be used for multiple functions, including measuring the occupancy of a space, color temperature of its light, and light intensity of its environment. One way this is done is through a hybrid lens where the Light Sensor's segmented lens may include a combination of segments as already defined and a collimating lens, Fresnel lens, light pipe or guide, the lens or light pipe directly in front of the sensor and the segmented lens around its perimeter. This would allow the sensor to gain a direct view of the surface in front of it where light level may be measured, while concurrently detecting users as they approach the ACB using the segmented lens.

In another embodiment, the Light Sensor is oriented facing or adjacent to the Light Source. Rather than measure the ambient lighting conditions, the ACB uses the Light Sensor to measure the Light Source's relative intensity and/or color. This may include light solely generated by the Light Source and/or ambient light that is reflected into the Light Source, for instance daylight that is reflected by one or more surfaces onto the Light Source lens or housing. The Light Sensor in this scenario may also be a solar cell, the solar cell powering the ACB and also providing a voltage and a current that are referenced by the ACB processor to achieve a similar result as achieved with a photo sensor or color sensor. In all cases, this enables the ACB processor to monitor and record the Light Source's relative intensity verses time and thereafter calculate both the Light Source's run-time and energy consumption by integrating time over intensity. Energy consumption may be established using an automatic calibration process where the ACB processor monitors the Light Sensor's light levels verses time in order to establish a maximum intensity of the Light Source, from which all other intensity levels and therefore estimated power levels are calculated. The ACB processor may assign a power level to the maximum intensity based on a known light fixture model, preprogramming or it may provide energy consumption measured in relative units, such as providing an average energy consumption as a percentage of the maximum over a defined time period. The energy consumption calculation may use an adjusted light intensity verses power curve in order to factor various efficiency considerations including that of the Light Source, its power electronics and/or LED driver, and sensor variations. The energy consumption calculation may also include a multiple that factors lumen depreciation verses time, often referred to as lumen maintenance.

In another embodiment, the ACB achieves a similar effect by directly measuring power consumed by the Light Source without the use of the Light Sensor, instead using a current sensing resistor, magnetic coil, or other means of measuring current installed directly to the Light Source. The measurement device may be on the input or the output of the LED driver and may be installed to a printed circuit board or a wire harness. The ACB processor may also measure the voltage present at the Light Source input and/or LED driver output, multiplying the Light Source voltage times the measured current to calculate the Light Source power at any given time. In some embodiments, an efficiency multiplier may be used, specifically if the power measurement is made at the LED circuit and/or the output of the LED driver, for instance factoring in LED driver efficiency at various intensity levels in order to improve the accuracy of the measurement.

By monitoring all available inputs over time, the ACB learns about its host Light Source, nearby Light Sources, and its environment. In doing so, the ACB processor creates a learned operating schedule that may be used to set ACB operation and/or generate Lighting Data and/or Ambient Data that is saved to memory. Lighting Data may include the Light Source total run time, average run time, energy consumed, average light intensity, average temperature, peak temperature, and other operational data about the Light Source. It may also include information about where the Light Source is installed, such as the building schedule and environment based on sensor and input measurements, including temperature, occupancy (such as average number of users per day, time of user arrival etc.), light levels, dimming control inputs, and similar. Ambient Data may include environmental information including nearby Wi-Fi networks, MAC addresses of nearby wireless equipment such as mobile devices, nearby Light Sources equipped with ACBs, nearby BecoIDs and their measured RSSI, and other measurable data. Lighting Data and/or Ambient Data may be stored in memory as it is collected in a raw form or may be compressed. It may include a time stamp as it pertains to real-time and/or run-time.

One method of compression is the creation of error codes. This allows the ACB processor to detect one or more conditions based on available inputs and create an error code should predefined conditions, such as rules, be met, the error code being optionally time stamped. An example of this would be an overheat condition, such that rather than save a collection of temperature values, the ACB processor determines that the peak temperature has exceeded a predefined threshold and therefore generates an error code that may then be communicated in the ACB beacon broadcast.

Another method of compression is the creation of profile codes. To generate a profile code, the ACB processor monitors one or more inputs over time to learn an operating schedule. The operating schedule may define operational features, such as run time per day, sensor and radio operational duty cycles, target intensity levels verses time, expected time of user arrival, and similar. This data is then compressed into a profile code that defines ACB operation verses time, for instance on a daily, weekly, or monthly schedule. Profile codes may be combined with real-time sensing and input data and may be dynamically updated by the ACB processor with each real-time event leading to possible changes in the profile code over time. Should a profile code be transferred from a first ACB to a second ACB, the second ACB would mimic the operation of the first ACB, including operational features that were learned by the first ACB over time.

Another method of compression includes recording and then organizing Lighting Data and/or Ambient Data into events, each collection of events including a defined time range or time stamp of which they occurred. In one embodiment, the ACB stores detected MAC addresses that are hashed or abbreviated. In another embodiment, the ACB saves storage space by providing multiple time stamps per a single MAC address, eliminating the need to record the MAC address multiple times.

Figure 11:
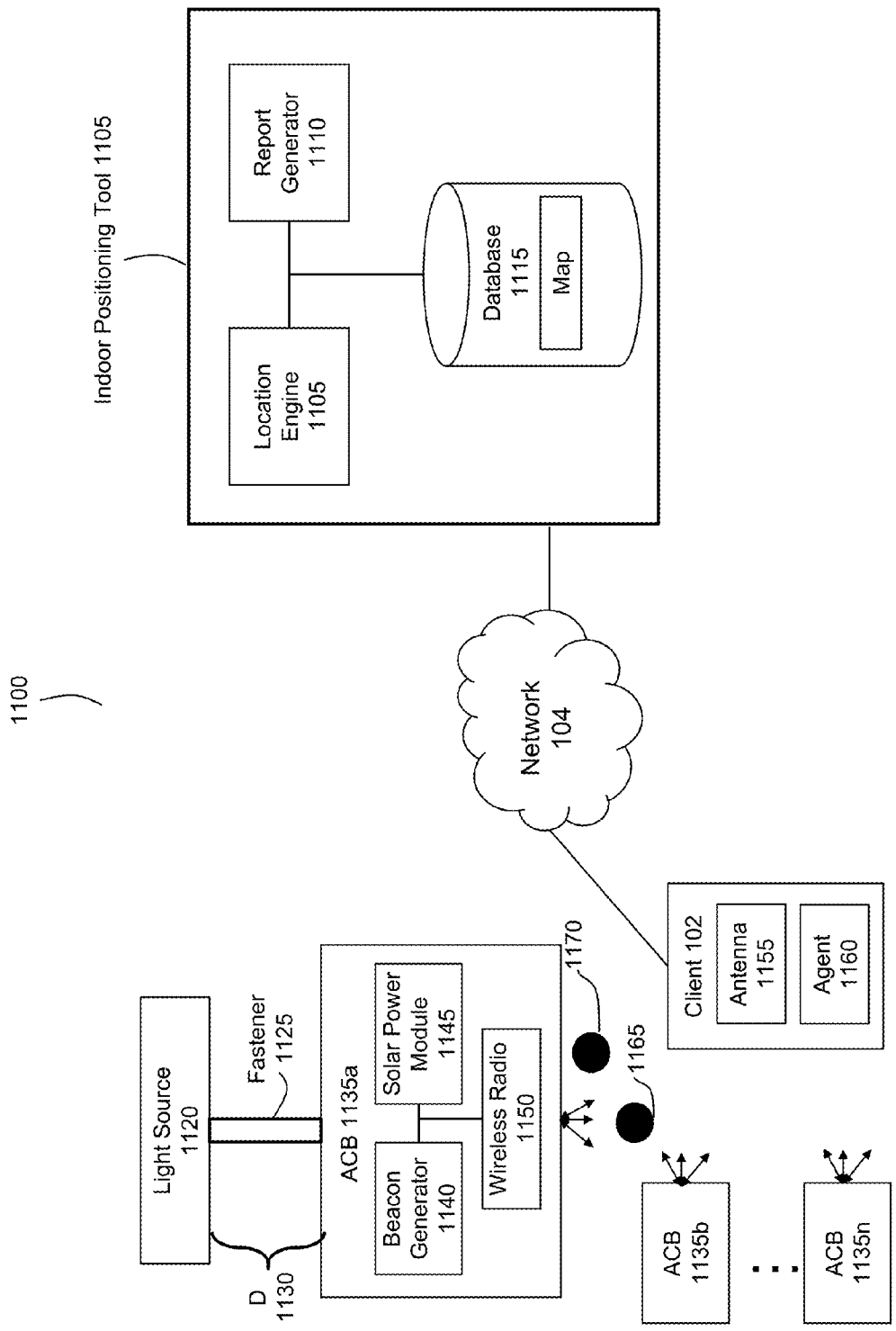
FIG. 11 is a block diagram of a system for indoor light enabled positioning, in accordance with an embodiment.

The ACB communicates with other nearby wireless devices using one or more onboard wireless radio(s) (e.g., wireless radio 1150 in FIG. 11). These wireless devices may include other ACBs, mobile devices, multimedia devices, light bulbs, LED drivers, light fixtures, thermostats, and similar. Mobile devices include a processor, wireless radio, and some type of software/firmware and may be one of a mobile phone, wristband, watch, eyeglasses, earpiece, pin, article of clothing, computer or similar devices. Devices may be configured in a direct connection, point-to-point, star, mesh, or any other type of wireless configuration, including bi-directional combination between the ACB and the wireless devices. The ACB may provide to these devices information, such as Light Data, Ambient Data, occupancy, dimming levels, and temperature information. In some embodiments, these devices may command the AC3B to change state, such as an App adjusting the light intensity, color, scheduling or other operational features of the ACB. Rules may also be created and uploaded to the ACB, where a rule may consist of a conditional statement such as if/then. Devices may include an Internet Protocol (IP) address, including an IPv4 or IPv6 address, with or without a connection to the Internet. In one embodiment, with an available Internet connection (direct connection or using a gateway, such as a mobile device or other dedicated hardware), the ACB may be remote operated, monitored and/or configured using an application on a remote server. The ACB may be configured to report to the server sensor information, such as user occupancy data, UUIDs, IP addresses, Lighting Data, Ambient Data, etc. The ACB may also download from the remote server updates, such as updated operating profiles, rules, stack updates and patches, application updates and patches, and/or one or more UUIDs or UUID seed keys.

In one embodiment, the ACB uses its wireless radio (e.g., wireless radio 1150 illustrated in FIG. 11), such as a Bluetooth Low Energy radio, to broadcast a one-way wireless payload, also known as a Beacon. The ACB can generate the beacon using a beacon generator, such as beacon generator 1140 illustrated in FIG. 11. The Beacon broadcast includes data in the form of a unique identifier, referred to as a UUID or BecoID. The UUID may include ACB identification information, Lighting Data, Ambient Data, a uniform resource locator (URL), operational data, status data, profile codes, error codes, Cartesian coordinates, such as latitude, longitude, and level, and/or broadcast power data, the broadcast power being the power level that the wireless radio is configured to transmit.

Broadcast power may be presented in the UUID as a number with units, for instance ranging from −100 to 10 dBm, as a number on a relative scale, for instance from 1 to 10, as a percentage, or in binary form, the broadcast limited in this case to a high power and low power broadcast state. The Beacon broadcast may be continuous, for instance transmitting 10 times per second (10 Hz) for an extended period or it may be continuous followed by periods of increased, decreased, or no broadcast. The time period of the broadcast (e.g. duty cycle), broadcast data, and/or broadcast power level may be varied and controlled by the processor based on environmental and measured values, such as user occupancy, time of day, energy storage, error code, profile code, Lighting Data, Ambient Data, nearby ACBs, and/or any other variable. The processor may for instance reduce the time period of the Beacon broadcast from 10 broadcasts per second to 1 broadcast per second in order to reduce the ACB power consumption.

The Beacon UUID may be a fixed identifier or may change over time, the character length of the UUID being unrestricted. In one embodiment, the UUID is comprised of 16-bytes, optionally followed by a 2-byte major value and a 2-byte minor value, collectively referred to as an iBeacon. In another embodiment, the UUID comprises a 16-byte unique identifier followed by 4-bytes of Lighting Data and in some cases an optional 1-byte broadcast power level. In another embodiment, the UUID comprises a URL that includes a web address, such as https://www.beco.com, followed by data that may include a unique ID and other data, where the data may include Lighting Data, Ambient Data, an error code, profile code, and/or similar. The web address may be compressed using an encoding scheme in order to maximize the amount of data included in a single wireless payload. In one embodiment, to communicate larger amounts of data than permitted in a single broadcast, data included in the broadcast may change over the course of multiple broadcasts, for instance a first broadcast that includes a Unique ID and Lighting Data, followed by a second broadcast that includes a Unique ID and Ambient Data. In a similar embodiment, data of a similar type too long to fit into a single broadcast may be split into multiple broadcasts, such that a first broadcast includes a Unique ID and Ambient Data followed by a second broadcast that includes a Unique ID and additional Ambient Data. The rotation and frequency of the data type that follows the Unique ID may vary, as may the Unique ID. Many variations in message length and format are possible, the variations being unlimited.

In one embodiment, part or all of the UUID or URL changes as a function of an equation, algorithm, time, events, inputs and/or other factors, referred to as rotating the UUID. Rotating the UUID allows the UUID to be broadcast publicly, but then change in order to prevent Beacon spoofing and/or hijacking. Spoofing and hijacking is done by scanning for and documenting UUIDs (and in some cases their locations), and then using other beacon hardware to mimic the UUID of the Beacon and/or use the Beacon UUID without permission.

In one embodiment the UUID is calculated by the ACB processor (or beacon generator 1140 in FIG. 11) using one of a symmetric-key algorithm, public-key algorithm, polynomial equation, pseudorandom number generator, stream cipher, symmetric seed-key, or other type of algorithm or equation, including any used for encryption. The equation may be seeded with a seed or key that is applied to the ACB at the point of assembly, in the field using an App, or it may use the MAC address of the processor and/or wireless radio. The encryption of the UUID may be done using hardware or software. In the case of hardware, the UUID may be generated using the processor's onboard crypto engine normally reserved for encrypting communication.

In a similar embodiment, the UUID is calculated using a predetermined algorithm or equation that calculates a finite number of UUIDs, such as 100 or 1,000 UUIDs that are then rotated. The equation may be seeded using the ACB processor MAC address or preprogrammed with a unique seed. The UUIDs may be rotated through a defined rotation pattern or a random pattern, the random pattern defined by a random number generator, analog voltage and/or similar signal on the ACB, or similar. The UUIDs may be rotated one of several ways including on a defined time interval, with each power cycle of the ACB, run-time, time of day, and/or any other event driven trigger for rotation.

In the case of rotating the UUID with each ACB power cycle, the ACB may include hysteresis to ensure that a minimum time period transpires between power cycles in order to prevent users from quickly cycling the ACB on and off to measure and record all of the UUIDs in a short time period. This may be managed by operating the processor in a low power mode upon entering a brownout condition where the processor remains alive for at least a predetermined period. Should power return during this period, the UUID would not rotate and therefore would remain the same. For instance, if the ACB loses power, the processor disables the ACB Beacon upon power loss, operates from the energy storage device for the duration of the power loss, and then reactivates the ACB Beacon without rotating the UUID. In another instance, if the ACB loses power long enough for the processor to deplete the energy storage device or exceed a defined time period, the processor disables the ACB Beacon upon power loss, operates from the energy storage device, and shuts down upon expiration of the energy storage device. With the return of power, the processor powers on the ACB Beacon and rotates the UUID. Alternatively, the ACB may track its run-time, and therefore rotating the UUID based on a function of run-time rather than actual time. The techniques as described offers an advantage over the encrypted UUID as the ACB is not required to synchronize the encrypted UUIDs with a remote database, therefore eliminating the need for a real-time clock onboard the ACB and thus allowing the ACB to enter an off-state when power is not available. In some embodiments, by having a finite number of UUIDs per each ACB, UUID database queries are significantly faster, having only to search through hundreds or thousands of records when verifying the identity (such as the MAC address and/or Serial Number) of a single ACB Beacon.

In another embodiment, the ACB broadcasts two or more UUIDs, the UUIDs being rotating or fixed, comprising a first transmission, a second transmission, and in some cases a third, fourth, and so on, the first transmission having a UUID that is different than the second transmission. In one embodiment, the first and second transmissions are both iBeacons with different UUIDs. This enables the ACB to function as two or more iBeacons, each iBeacon assigned to a different App or function. In another embodiment, the first transmission is an iBeacon followed by a second transmission that is not an iBeacon. In another embodiment, the first transmission is a BecoID followed by a second transmission that includes operational information used to coordinate with nearby ACBs and other wireless devices, for instance the second transmission including an intensity level to program the brightness of a nearby Light Source. In this instance, ACBs operate in a state of beacon broadcast followed by a listen state, the ACB listening for nearby beacon broadcasts and responding accordingly.

In another embodiment, the first transmission is broadcasted at a different power level than the second transmission. In one instance, the first transmission UUID is the same as the second transmission UUID except for its specified broadcast power level (included in the UUID broadcast). This creates a scenario where a single identifier may be broadcast and identified at both a high power and a low power mode of operation. In the case where a mobile device uses its wireless radio to listen for Beacons, it may detect only one of the two transmissions when far away and both transmissions when nearby, the low power transmissions unable to travel as great of distance as the high power transmission. For instance, in the case where only the high power first transmission is observed, the mobile device is aware of the nearby ACB, but expecting to also hear the low power second transmission (which it does not), assumes the ACB to be far away. As the mobile device moves closer to the ACB, it detects both the first transmission and the second transmission. While two broadcast states are used in this example, additional power states are possible, such as a mid-power state and so on. This data may also be used to strengthen position accuracy when processed by the Location Engine.

In a similar embodiment, an Internet connected wireless Gateway Device may be used to detect ACB wireless broadcasts. The Gateway Device may include one or more wireless radios, one or more processors, and an Internet connection. The Internet connection may be provided by a LAN, using a cellular modem such as a 4G LTE connection, and/or similar means of connecting to the Internet. As the Gateway Device may be nearby some ACBs but physically distant from others, the ACB may alternate high power and low power wireless transmissions as just described such that the low power transmission may be used for localized positioning for nearby mobile devices, whereas the high power transmission may be heard by the Gateway Device, making the Gateway Device's physical placement less critical. In a similar embodiment, the Gateway Device may be used to detect other wireless signals, such as the Wi-Fi MAC address of nearby wireless devices, enabling the Gateway Device to forward this information along with the ACB wireless data to another device, such as a remote Internet connected server.

In similar embodiment, the first transmission is broadcasted at a different power level than the second transmission, the first transmission including different data than the second transmission, but understood by the receiving device, such as a wireless Gateway Device, remote server, or mobile device to be the same ACB and therefore realize the benefits as just defined.

Mobile devices (e.g., client device 102 in FIG. 11) listen for wireless beacon broadcasts using their wireless radio. This may be done by continuously scanning for beacons or by scanning for beacons on a defined schedule or time period. This may also be done by periodically waking up the App to scan for beacons, for instance scanning in the background of an App installed to a mobile device.

In the case of BecoIDs, mobile devices (e.g., client device 102 illustrated in FIG. 11) are able to use BecoIDs to enable proximity, positioning, Virtual Beaconing, and/or the collection of Lighting Data and/or Ambient Data. In one embodiment, upon detecting two or more BecoIDs, the mobile device initiates a filtering process. BecoIDs may be filtered based on a wide range of inputs available on the mobile device. In one embodiment, the mobile device scans for BecoIDs and records their RSSI value. A single RSSI value may be measured for each BecoID or the mobile device may record multiple BecoID RSSI values, averaging and/or using standard deviation techniques to establish a defined RSSI value for each BecoID, in some cases discarding outlier measurements. In one embodiment, once the mobile device defines an RSSI value for each BecoID detected, it may choose to discard BecoIDs with an average and/or defined RSSI less than a minimum defined RSSI threshold. This threshold may be provided to the App from the Location Engine dynamically or hard coded in advance. In another embodiment, the mobile device may retain all BecoIDs detected, forwarding to the Location Engine all BecoIDs with or without their defined RSSI value (filtered or not filtered). In another embodiment, the mobile device listens for a first BecoID broadcast of a high power and a second BecoID broadcast of a low power, in which case it uses the high/low power scheme (as earlier defined) instead of measuring for RSSI as a means of determining its proximity to ACB Beacons. In another embodiment, the mobile device decodes in the beacon broadcast one or more URLs. In one case, the mobile device hits the URL; the URL providing a location hit that delivers location, Lighting Data, and/or Ambient Data back to the Location Engine using a URL or URI rest end point or similar. In another case, the mobile device modifies the URL prior to hitting it, for instance adding to the URL measured RSSI data, a unique identifier that identifies the mobile device, and/or any other useful information about the location and/or mobile device. This may be done by directly adding these fields to the URL or hitting the URL with a JSON query. In one embodiment, mobile device hits the URL with the highest RSSI, in another embodiment the mobile device displays available URLs to the user who selects a URL to hit, in another embodiment the mobile device hits all available URLs. Upon hitting a URL, in one embodiment the mobile device (e.g., client 102 in FIG. 11) receives a response that includes data, in another embodiment it loads a web page, in another embodiment it loads an App, and similar.

The mobile device upon hearing one or more BecoIDs and optionally filtering the BecoIDs, uses its available Internet connection makes a Location Request to the Location Engine. The Location Engine is a collection of one or more remote servers connected through the Internet that includes at least one database. BecoIDs are communicated to the Location Engine through an API, URL, URI or similar technique (e.g., via agent 1160 executing on client device 102 illustrated in FIG. 11). The API call may be directly from a mobile device or through a third-party server that may be in communication with one or more mobile devices. An API call originating from a mobile device may be done using one or more Apps, for instance a mobile device App having integrated a Software Developer Kit (SDK), hitting a URL, and/or directly from the mobile device's operating system (OS). The API call may be a REST API, may be communicated using JSON, XML, HTML, or a similar means of connecting the Location Engine to a mobile device, application, mobile App, third-party server, or similar. The API may be configured in a client-server architecture, may be read only or read/write, public or private. API authentication may be managed using OAuth, OAuth2, IAA or a similar means where a client ID and password are used to directly log into the API and/or Location Engine or are exchanged for an access token, the access token granting the client access to information based on permissions. The App may also be preconfigured with an API Key. Should no Internet connection be available at the time of detecting the BecoIDs, the mobile device may record the BecoIDs with or without their RSSI values and upon reconnecting to the Internet issue a Location Request.

In addition to forwarding in the Location Request BecoIDs, the mobile device may also include data that is filtered or raw data that includes BecoID RSSI values and/or other wireless signals in addition to the BecoIDs detected. This may include GPS, Wi-Fi access points, other wireless beacons, and/or detected cellular towers/devices. It may also include physical signals, including accelerometer, compass, magnetic field, light, or similar data points. It may also include data about the mobile device, including the mobile device's Advertiser ID, MAC address, user identifiable information, type of Apps installed, mobile device manufacturer, mobile device operating system and version, and other means of identifying a specific mobile device. When using an SDK, the SDK may assign a unique identifier to the App it is installed which also may be communicated to the Location Engine.

The Location Engine includes at least one database that contains information about ACBs. The database may include for any given ACB its MAC address, its serial number, one or more BecoIDs, one or more UUIDs, one or more URLs, its firmware version, date of manufacturer, manufacturer name, its name, its date of first discovery, its date of last connection, Lighting Data (including energy consumed, operating hours, profile codes, error codes, average temperature, maximum temperature), occupancy data, locational coordinates, UUIDs of nearby beacons (with and without RSSI values), BecoIDs of nearby ACBs (with and without RSSI values), Ambient Data, including names and/or MAC addresses of nearby Wi-Fi networks (with and without RSSI values), mobile device information, mobile device Bluetooth MAC addresses (with and without RSSI values), mobile device WI-FI MAC addresses (with or without RSSI) and/or similar data. The location database may also include data from every Location Request, providing a large dataset that includes collections of BecoIDs and their measured RSSI values for any given Location Request. The database may also include location metadata, including the ACB owner contact details, the mailing address of the building or location, the type of building or location, the age of the building or location, the function of the building, location, or specific room installed, the type of light fixture that the ACB is installed, the demographic of people in the building or location, operating hours of the building or location, and similar information that may be collected from third-party sources or manually entered into the ACB database.

Upon receiving the BecoIDs from a Location Request, when a rotating UUID technique is employed, the Location Engine may map each BecoID to a known ACB Serial Number. This is done by checking the BecoID against a pre-determined list of BecoIDs or by decoding the BecoID. In the case of static UUIDs, this step may be omitted. With rotating UUIDs, the BecoIDs are variable but the Serial Number is static and in some cases the same as the ACB's MAC address. Each Serial Number may have tens, hundreds, thousands, or an infinite number of BecoIDs associated with it. Alternatively, the BecoID may include hints in its format that enable the BecoID to be decoded using a time dependent or non-time dependent calculation. In one embodiment, using the ACB MAC address or a predefined seed, the Location Engine calculates all possible BecoIDs for a given ACB using the same algorithm installed to the ACB without connecting to the ACB. The ACB Mac address or seed may be stored in the Location Engine database or using crypto hardware to better secure the seed. The Seed may change over time, calculated separately at the ACB and Location Engine.

When an encrypted UUID technique is employed, there are almost an unlimited possible number of UUIDs, in which case the Location Engine and ACB use real-time clocks in order to calculate the current BecoID in sequence. The Location Engine may accept two or more UUIDs as being valid in order to accommodate the possibility of synchronization issues, including clock drift. BecoIDs may be calculated by the Location Engine in advance or may be calculated as Location Requests are made. In either case, the ACB and the Location Engine calculate the BecoIDs independently without requiring setup or bi-directional communication.

In one embodiment, once decoding the BecoID(s), the Location Engine returns a response using JSON or similar to the mobile device that includes the decoded BecoID values. In one embodiment, the Location Engine receives a BecoID in the form of an encoded Major/Minor string. Once decoded, the Location Engine returns to the mobile device the true Major/Minor values that are fixed and associated with the ACB Serial Number, those values understood by the mobile App or a third-party server.

In a more advanced embodiment, once the Location Engine maps the BecoIDs to Serial Numbers, the Location Engine establishes if the combination of Serial Numbers correspond to a known Location Identifier. The Location Identifier is a unique number assigned to a physical location comprised of two or more Serial Numbers (each unique ACB having one Serial Number). In one embodiment, the Location Identifier is only confirmed upon detecting all of its associated Serial Numbers in the Location Request. In another embodiment, the Location Identifier is verified upon detecting some (but not all) of its associated Serial Numbers in the Location Request, the Location Identifier having the option to assign a probability of certainty that the mobile device position. For example, a Location Identifier may be associated with five Serial Numbers. By the mobile device detecting for instance four of the five Serial Numbers (via BecoIDs), it is with relative certainty that the mobile device is in the correct physical location (with RSSI optionally used to further increase the reliability of the measurement). By detecting only one of the five Serial Numbers, it is with minimal certainty that the mobile device is in the correct physical location. With each ACB being installed to a Light Source, over time, Light Sources may fail, be removed, or/or be installed in alternate locations. Should the Location Engine recognize over time that a Serial Number is consistently not reported, reported in connection with a different, unexpected group of Serial Numbers, or is consistently reported without the other Serial Numbers it is associated with, the Location Engine may choose to reorganize the Serial Number into a different Location Identifier, which may include ignoring it altogether.

In another embodiment, as another means of detecting the physical moving of Light Sources, the ACB or the Light Source that the ACB is installed may include an accelerometer or other means of detecting motion, the ACB processor upon detecting movement issuing an Error Code or similar means of flagging the Location Engine in the next received Location Request (or series of Location Requests). In doing so, the Location Engine may choose to flag the Serial Number and observe it over time to ensure it has not moved and/or update its associated Location Identifier as needed.

Upon receiving a Location Request that includes Serial Numbers that are not associated with a Location Identifier, the Location Engine may create a new Location Identifier. This eliminates the need to manually commission a physical location (e.g. building) once one or more ACBs are installed. Unlike conventional wireless beacons that require setup, Light Sources with onboard ACBs may be installed into physical locations at random without commissioning. Once powered on, BecoIDs are detected by nearby mobile devices that issue one or more Location Requests. Upon establishing that the Serial Numbers received are not assigned to a Location Identifier, the Location Engine creates a new Location Identifier that includes some or all of the Serial Numbers presented with the option to include weighted factors such as RSSI level and other means of defining the Location Identifier. Multiple Location Requests may be recorded before creating a Location Identifier, or a single Location Request may lead to the creation of a Location Identifier. In some embodiments, Serial Numbers associated with Location Identifiers may be reassigned over time as more data is collected with each Location Request. In one embodiment, Serial Numbers may be associated with more than one Location Identifier. In another embodiment, the use of multiple Serial Numbers per Location Identifier may be used for positioning through means of trilateralization, triangulation, centroid math, and/or similar technique. This may include using the RSSI values of multiple Serial Numbers as collected over time to create scaling factors used in the Location Engine to apply a calculated weight to each Serial Number's RSSI as measured in any given Location Request and therefore improve precise positioning. This is possible through the collection and analysis of two or more Location Requests for any given Location Identifier.

In another embodiment, mobile device positioning may include the use of other measured data points as earlier described, including other location data such as GPS as well as other third-party location data. For instance, at the entrance of a building, a mobile device may record its position using GPS and other sources with a high level of certainty prior to entering into a building. Concurrently or shortly thereafter, the mobile device may also detect one or more BecoIDs at the entrance of the building. In this case, the detected BecoIDs (and by design their Serial Numbers) may be calibrated to known fixed positions that then enables the Location Engine to organize Serial Numbers around these fixed points. For instance, in one example, the Location Engine after receiving a Location Request for a first BecoID at a calibrated position, next receives a Location Request for a second BecoID, and therefore associates the second BecoID with the first. In some embodiments, the Location Engine may receive both the first and second BecoID in the same location request, the BecoID with a higher RSSI considered to be closer to the calibrated fixed point than that with the lower RSSI. The Location Engine may also combine this calibration technique with other RSSI techniques earlier discussed. Many variations are possible.

The Location Engine may use third-party data, such as known physical positions of iBeacons, Wi-Fi access points, and other inputs that may then be used to calibrate a location. It may also use hardware onboard the mobile device, such as an accelerometer, compass, and other detectors to approximate distance and direction as the mobile device moves through a location. This data may be provided to the Location Engine with each Location Request or may be input into the Location Engine directly using first hand or third-party sources.

In a similar embodiment, data may be provided to the Location Engine through "check-ins", where a mobile device detects one or more BecoIDs and using an App, laptop, or similar device capable of providing a data input, the user inputs and sends information about their position to the Location Engine. This information may be the location address, level, room type, venue type, etc. In one example, the Location Engine creates one or more Location Identifiers. Sometime later, using a check-in, a user tells the Location Engine that the Location Identifiers are located inside of a Gym. The Gym may be defined by its name, address, level, and other identifiable information. The user standing inside of the Gym does the check-in, the mobile device detecting two or more BecoIDs and issuing a Location Request that may include the user defined inputs. In some embodiments the user may stand within Gym and using a map or satellite image, define their physical location within the venue, the Location Engine then associating the geo position data from the map with the nearby Location Identifiers, Serial Numbers and in some cases their RSSI values. With the check-in data, the Location Engine is then able to assign the received information to the related Location Identifiers and in the future provide this data with each Location Request, for instance upon receiving a Location Request may provide back a Location Identifier along with a descriptor stating "Gym". Check-ins may be provided directly to the Location Engine or may be achieved through third-party systems, such as a third-party App that includes a check-in feature like Facebook.

Once the Location Identifier has been identified and/or created, the Location Engine responds to the requesting mobile device or third-party server with the Location Identifier. The Location Identifier may be provided as a unique number or it may be provided as a unique number plus other supporting data, such as locational coordinates, metadata, and other useful information. While the Serial Numbers associated with any given Location Identifier may be updated over time as earlier described, the Location Identifier is a fixed identifier that may be used by the mobile device or third-party server as a fixed point of reference over time and regardless of the Location Request or mobile device from which it originates. For example, upon entering a physical location, a mobile device detects what appear to be a random collection of BecoIDs, however upon making a Location Request, is provided with a Location Identifier that it recognizes from previous Location Requests. This enables third parties, such as Mobile Developers, Operating System Developers, App Developers, Ad-Exchanges, Ad-Servers, Mobile Carriers, and any other third parties to use repeatable Location Identifiers to improve their business operation. As Location Identifiers are refined over time, Location Identifiers may include Sub-Identifiers, in which case a primary Location Identifier may be learned by the third-party followed by Sub-Identifiers that further refine the location. Sub-Identifiers may be presented in the form of an additional Location Identifier issued to the mobile device and/or may be in the form of the full Location Identifier unique number followed by a second number, such as "-123".

The use of Location Requests, URL hits, and/or Location Identifiers enables the Location Engine to generate Location Analytics. Location Analytics may be used actively, such that the Location Engine may interface directly with building systems to directly or indirectly influence building operation and/or passively, where the Location Engine may provide reporting, insight, and/or analysis on how a building is operated, how the space is used by users, and/or how energy is consumed within the building.

In one embodiment, Location Analytics are based on Location Request activity. In measuring Location Request activity as it relates to Location Identifiers, Location Analytics may be generated that include real-time position of users in a space. This data may then be used to provide feedback to building management systems, such as lighting systems, security, HVAC, demand response, and other systems. For instance, two users enter a conference room in an office building. Their mobile devices initiate a Location Request upon detecting one or more ACBs. Upon receiving the Location Request, Location Analytics through an API makes data available to (or pushes data to) a lighting control system that then brightens the lights in the conference room. In another example, the Location Engine may receive one or more Location Requests from two users nearby the conference room, such that with a level of certainty, the Location Engine may determine that the user path is directed to the conference room and would therefore communicate with a lighting control system to brighten the lights in the conference room prior to arrival of the two users. In another example, the Location Engine may integrate with a third party system, such as a conference room booking system that identifies that a meeting is about to happen at the conference room. The Location Engine detects through Location Requests that one or more of the meeting attendees are nearby the conference room and therefore communicates with a lighting control system to brighten the lights in the conference room. In another example, the Location Engine uses historical Location Request data to predict the use of the conference room and therefore communicates with a lighting controls system to brighten the lights. Many variations are possible and any such combination of the techniques mentioned may be combined to optimize the Location Engine's interaction with such systems. Additionally, the Location Engine may interface with one or more building systems, lighting control systems being used by means of example. Other systems may include HVAC systems, for instance activating heating or cooling prior to occupant arrival or departure, as well as door systems, for instance opening a door in front of a user in motion, and similar.

In another embodiment, the Location Engine may provide Location Analytics and reporting on how the building space is occupied by users. This reporting may be real-time (or near real-time), for instance providing to first responders in an emergency the whereabouts of occupants in a building, or it may be defined as user occupancy over time. This enables insight on how users occupy the building space and may lead to possible improvements in office layout, allocation of square footage, and overall leased space. Location Analytics may be defined graphically or numerically using any type of interface and publishing medium, including a web browser. Examples of how data may be presented include total visits, total unique visits, average duration per visit, space utilization, and similar verses time. Locations may be viewed as a summary with the option of drilling down for additional information, such as the Location Analytics for a specific room in a building. Location Analytics may also utilize floor plans and layouts that are graphically illustrated with color coding, heat map gradients, and other methods for displaying comparative data, for instance a room with high user activity shown in red followed by a room of low user activity shown in blue. Data may be exported from the Location Analytics platform into a variety of formats, including CSV, XLS, HTML, and similar.

In another embodiment, Location Analytics may incorporate other inputs, such as third-party attendance systems, Apps, conference booking software, access control, and similar building systems. For instance, by knowing the job title of any given user making the location request, Location Analytics may be derived that define how users interact with each other, for instance how many engineers interact with sales people, where this is happening, for how long etc. In addition, further conclusions may be drawn by comparing user location over time to the operation of building systems, and therefore the use of energy. This may be done by pulling building data into the Location Analytics platform, using for instance an API, connecting the location engine directly to the building management system (i.e. BACnet), or other similar methods and then comparing such data to user position, with the intent of further optimizing the interaction of the building system relative to actual use data. Other third party data sources may include weather, traffic, user traffic, and other such similar inputs.

In a similar embodiment, Location Analytics may be further improved by the use of Ambient Data. From one or more Location Requests, the Location Engine may decode Ambient Data (as previously defined) that is embedded in the UUID and/or URL. Alternatively, the Location Engine may receive Ambient Data from a network and/or Internet connected device, including a Gateway Device or an Internet connected ACB. The use of Ambient Data enables the Location Engine to account for mobile devices that are not configured to make a Location Request and yet include a wireless radio, such as a Bluetooth or WI-FI radio. This may include wearable devices, such as smart watches, fitness bands, as well as smart phones not configured to connect with the Location Engine. In doing so, Location Analytics may take into account nearby mobile devices and therefore provide a more complete picture user occupancy for any given space. In one example, three users, each with a smart phone enter a conference room. Upon entering, the ACB sniffs for Ambient Data, and thereby detects all three smart phones through their wireless radios. The ACB records the detected smart phones to memory and updates the Ambient Data broadcast in its wireless beacon broadcast. Next, one of the smart phones detects the ACB beacon and initiates a Location Request. Through the Location Request, the Ambient Data is passed on to the Location Engine. Despite only one Location Request, through Ambient Data, the Location Engine establishes the presence of 3 users in the conference room.

In a similar embodiment, Location Analytics may be strengthened by the use of Lighting Data, including the on/off time of any Light Source that may signal the presence of a user and/or building schedule, the Light Source in some cases connected to an occupancy sensor or lighting control system.

Lighting Data may also be used standalone in the form of Lighting Analytics to provide insight into the operation of one or more light sources. From one or more Location Requests, the Location Engine may decode Light Data (as previously defined) that is embedded in the UUID and/or URL. Alternatively, the Location Engine may receive Light Data from an Internet connected device, including a Gateway Device or an Internet connected ACB. Lighting Analytics include for any given bulb or fixture its energy consumption, operating hours, operating temperature, error codes, and/or any other useful information that may be used to improve the quality and performance of Light Sources. For instance, for any given Light Source, the Light Source manufacturer gains visibility to its typical operation in the field. This data may lead to Light Source cost reductions for the light fixture; the data showing for instance that the majority of installations operate the Light Source at a reduced intensity (and therefore eliminating the need to support the current maximum intensity). It may also show that based on typical operating temperatures in the field that the Light Source heat sink may be reduced in size, resulting in a cost savings. The data may also support warranty claims, where the Light Source manufacturer is able to gather real world data from any given Light Source based on its Serial Number and/or MAC address, determining the specific run time, average intensity, temperature, and other information that may assist in a warranty claim situation. The data may support future sales and service opportunities, the data showing for a given installation that installed Light Sources are nearing their end of life, enabling the Light Source manufacturer to engage the Light Source owner at an early stage with a new proposed solution to update their Light Sources. In some embodiments, this data may be used to support a new emerging service called "Light-as-a-Service" or LaaS. Today's LaaS model is based on Light Source manufacturers providing their products at a reduced cost or in some cases at no cost to a building owner, of which the building owner then over time pays the Light Source manufacturer the net energy savings. Using the data provided, the Light Source manufacturer is able to measure the energy consumption of every Light Source in the field and therefore bill the building owner or verify the building owner's report. In a similar embodiment, the building owner may be compensated as third-party companies gain access to their ACB Beacons. In a similar embodiment, a third-party is able to pay for the full or partial operation of an ACB enabled Light Source by paying for the bulb acquisition cost upfront, over time, or based on actual power consumed (as measured by the ACB). For instance, in exchange for access to the ACB Beacon, a third-party is able to compensate the Light Source owner for its operational expenses; a portion of the operational expense, or in some cases its operational expense plus an added fee. By metering the power consumed over a defined period and then multiplying it by the cost of energy, one is able to establish the cost of operating the Light Source. Another embodiment may use crowd funding to pay for the operation of one or more Light Sources. Many variations are possible and there are too many examples to list, the Lighting Data as described having an unlimited number of uses. The Light Source manufacturer is able to access this data through a web user interface or an API. The data may be presented as raw data or in the form of dashboards, reports, charts, graphs, and similar.

In one embodiment, upon receiving a Location Identifier, a mobile device may report back to a third-party server, such as an Ad-Server or Ad-Exchange, the Location Identifier along with a request for an advertisement to display. In its request, the mobile device may include its location as established by the Location Identifier and/or raw data, such as BecoIDs, and/or other data about the user, such as the User ID. In one embodiment, the Ad-Exchange auctions the advertising slot (such as that in a mobile App or mobile web browser), the Ad-Exchange including in its auction the location of the user as learned from the Location Identifier. In this example, by the Ad-Exchange being aware of the user's real-time location, the content as delivered to the user will be more accurate than without this information. In another embodiment, a third-party service such as an Ad- Exchange upon receiving a Location Identifier may choose to deliver a push notification, such as a coupon that shows directly on the user screen. In another embodiment, the third-party server simply records one or more Location Identifiers over time, using the data to establish the mobile device user's schedule in order to improve services, including advertising. In another embodiment, Location Identifiers may be used to provide location services to the user, such as identifying the user's position on an App showing an indoor map. The Location Identifiers may be used to enable navigation or assist the user in locating areas of interest or lost objects or persons. In another instance, the Location Identifiers may be used as a means of navigating for instance a smoky building by first responders, having the ability to navigate but also identify the position of users within the building. In another embodiment, a third-party, such as a social media company, detects that the same (or a nearby) Location Identifier is issued to two or more registered users, either simultaneously (or near simultaneously) or at different times. In doing so, the third-party is able to establish that these users visit the same physical location and therefore share a common interest, are co-workers, and other conclusions that may be drawn over time. In one instance, the third-party can compare the user accounts to see if the users share connections or are "friends". In all instances, by establishing Location Identifiers relative to one or more users over time, the third-party may adjust the way it interacts with the user, for instance by adjusting the type of advertisements displayed, friend recommendations, dating suggestions, and similar means of interaction. In another embodiment, Location Identifiers are used to unlock available content, for instance displaying to a user a virtual messaging board that is only available once the mobile device location is confirmed. The user may also post to the virtual messaging board by being with proximity. This interaction may be used to establish a means of communication between for instance co-workers in an office environment, where physical location is a required element to send and receive messages. This data may also be combined with Location Analytics, Lighting Data, and Ambient Data to establish metrics on how users interact within a space socially, how they use the space, and energy is consumed. Many embodiments are possible.

Location Identifiers may also be issued form of a Virtual Beacon ID. There may be one or more Virtual Beacon IDs associated with each Location Identifier, the Virtual Beacon ID presented to the mobile device on its own or in addition to the Location Identifier, having all of the benefits of a Location Identifier as already described. The Virtual Beacon ID format may be adjusted to meet customer specific requirements. For instance a Location Identifier may be issued to an Apple iPhone in the form of a Virtual Beacon ID in an iBeacon format, the UUID and optional Major/Minor data (per the iBeacon definition) configured to represent that of a specific App or registered iBeacon user.

Virtual Beacon IDs provide the advantage of high reliability and simple integration into mobile devices that are already using some form of wireless beacon, such as iBeacon. In one embodiment, a mobile device detects multiple BecoIDs, issues a Location Request to the Location Engine, and receives back a single iBeacon UUID (with or without major/minor), the iBeacon UUID being the Virtual Beacon ID. Unlike conventional beacon hardware that functions typically as a one beacon, one device (or App) operation, virtualizing multiple BecoIDs as a single iBeacon (or other beacon type) enables a high level of reliability, the Location Engine capable of counteracting failed, moved, or removed ACBs (as earlier discussed). In some embodiments, through the use of multiple ACBs, the Location Engine is able to increase the position accuracy (as earlier discussed) without advanced beacon setup.

The Virtual Beacon ID format is not limited to iBeacon only, rather may also be in the form of AltBeacon, Samsung Beacon, Swirl Beacon, ShopKick Beacon, Gimbal Beacon, or any other the dozens of other open and/or proprietary beacon formats available today, each beacon format including some amount of data in its beacon broadcast, most often configured as a UUID. The Virtual Beacon ID may include a position distance identifier being one of Far, Near, or Immediate. It may also include a probability of location certainty.

In one example, multiple Light Sources containing ACBs (and therefore one or more BecoIDs) are installed into an office building. Concurrently an office productivity company called CompanyX has created a proprietary beacon format and mobile App that is designed to use beacons placed around the office for productivity tracking, conference room scheduling, and other tasks. Instead of installing physical CompanyX beacons that require maintenance and deployment, CompanyX enables its App to listen for BecoIDs, upon hearing two or more BecoIDs, CompanyX's App makes a Location Request, and in return is issued by the Location Engine a Virtual Beacon ID in their proprietary format. Their App, already engineered to listen for their proprietary format, references the Virtual Beacon ID and performs as it would should it have heard an actual CompanyX beacon.

In one embodiment, Virtual Beacon IDs may be mapped to Location Identifiers by manually associating Location Identifiers with Virtual Beacon IDs using a check-in process (as earlier described). For instance, a CompanyX user would enter a conference room and check-in that the room is a Conference Room along with any other important locational information. The user and/or App may also specify a proprietary CompanyX Identifier, this identifier becomes associated with the CompanyX App and the one or more Location Identifiers present in the form of a Virtual Beacon ID. Using Virtual Beacon IDs, Location Identifiers may be virtualized for two or more Apps, for instance, CompanyX upon entering the conference room receiving from the Location Engine a Virtual Beacon ID that is different than the Virtual Beacon ID received by a second company called CompanyY. This creates a shared beacon infrastructure that may be tailored by each App Developer or user as desired while eliminating the need for excess physical hardware.

In another embodiment, companies are able to assign Location Identifiers as Virtual Beacon IDs based on location and/or time slots. In this example, multiple Light Sources containing ACBs are installed into a Stadium. CompanyZ is a major beverage retailer who desires to reach all Stadium visitors using their App for a given event at the Stadium. Using a web interface, API or physical survey of the Stadium, CompanyZ may search for Location Identifiers based on location, venue type, local event, demographic, region, budget, and/or similar target information and/or metadata. CompanyZ may request a time slot on the order of days, hours, weeks, months etc. CompanyZ may then request that one or more Location Identifiers, for instance all Location Identifiers associated with the Stadium location become Virtual Beacon IDs in their CompanyZ proprietary format. This is done not by reprogramming the ACB hardware; rather the Location Engine does it by associating the Location Identifier with a Virtual Beacon ID. When CompanyZ's App makes a Location Request, should the Location Engine establish that any of the specified Location Identifiers associated with the Stadium are detected, the App receives back a Virtual Beacon ID in Company Z's format. The App would then recognize the Virtual Beacon ID and perform a function, for instance issuing an event specific coupon.

In the case of both Company X and Company Z examples, the use of Virtual Beacon IDs enables the ACB Beacon to become an extension of any company's beacon strategy, providing the functionality of an iBeacon or other proprietary beacon at any location where the ACB is installed. This creates a shared infrastructure that may be used by many companies without requiring the companies to redefine their beacon strategy to function with a proprietary third-party beacon.

The Location Engine may rank location Identifiers and Virtual Beacon IDs. In one embodiment, Location Identifiers and Virtual Beacon IDs are ranked in order of most valuable to least valuable. To do this, the Location Engine uses a ranking algorithm that uses variables such as number of Location Requests per a given time period, number of unique Location Requests per a given time period, physical location, proximity to known venues, location accuracy, and other available data. With such ranking data, the use of Location Identifiers and/or Virtual Beacon IDs may be sold to third-party companies on an exclusive or non-exclusive basis based on location and/or time-slots. The sale may be done using a fixed price and/or auction where the open market sets the final sale price, for instance using an English, Dutch, or proxy auction format. Location Identifiers may be made available on an exclusive or non-exclusive basis, in some cases the Location Identifiers being issued only to for example the Company Z App with all other Location Requests denied.

As a means of controlling nearby Light Sources that are equipped with a wireless radio, in some embodiments, the ACB broadcast may include its UUID and an intensity level, the intensity level varying based on the ACBs profile and real time observations. The intensity level may be part of the UUID, may be a major or minor, or may be the complete UUID or some other variation of wireless payload, including a URL.

In one embodiment, the Light Source's wireless radio is set to listen for any ACB wireless broadcast and therefore does not connect to the ACB and is capable of hearing more than one ACB broadcast. In the case of multiple nearby ACBs, to set a light intensity, the Light Source measures the RSSI of each ACB signal received and ranks the ACBs by RSSI, setting its intensity to the lighting level defined by the ACB with an RSSI that is most consistently the highest level. In the case where the ACB UUID changes, for instance in the case of rotating UUIDs, the Light Source continues to follow the ACB with the strongest RSSI. The Light Source also may include a minimum RSSI threshold and therefore ignores RSSI signals that are specified as too low or with too much variation and/or inconsistency. Additionally the Light Source may rank ACBs to follow, in which case should its priority ACB drop out, the Light Source may track a second ACB followed by a third and so on. Received ACB signals may also be averaged by the ACB. In the case for instance where an ACB is directly installed into a light fixture housing to control one or more LED bulbs within the housing, the ACB's RSSI will be very high, indicating with confidence that the ACB is nearby. While RSSI is not ideal for measuring exact distance, proximity within inches is of a transmitting radio is easier to detect compared to distant signals and in the case where a low RSSI is present, the Light Source can assume they are not receiving a strong signal. In some embodiments, the Light Source may include a light or color sensor onboard and using techniques as previously described, further establish proximity of adjacent ACBs. As a means of additional security and to eliminate the possibility of dramatic intensity changes or flicker, the Light Source may include hysteresis. Therefore, once the Light Source learns a signal to follow, even if for brief periods other UUIDs may have a stronger RSSI, the Light Source will continue to follow its learned signal. A signal may be learned based on patterns of its measured RSSI over time. Should the learned signal disappear, the Light Source will remain at its set intensity. Should the learned signal disappear for an extended period, the Light Source will reset to its maximum intensity, for instance at power cycle or may slowly ramp up to its maximum intensity. In the case where the Light Source receives a signal to reduce intensity, the Light Source uses dimming smoothing to adjust the LED intensity. Using dimming smoothing, the Light Source has a first intensity, which is its present intensity, and a second intensity, which is the new target intensity. The Light Source calculates a dimming ramp over a defined time period that gradually adjusts the LED intensity from the first intensity to the second intensity. This allows the ACB to set a new intensity level in its wireless broadcast without requiring the broadcast to include incremental intensity changes or intensity ramps. Instead, the Light Source will recognize the new intensity value through the wireless broadcast, confirm it by listening to subsequent broadcasts, and then begin ramping the intensity to the new set level. The ACB may also include in its wireless broadcast a time interval, for instance stating an intensity and a ramp speed, requiring a fast ramp for instance as a user walks into a room and a slow ramp as light levels are adjusted to regulate for ambient light. As an alternative to dimming smoothing, the Light Source may directly follow the ACB broadcast, the ACB responsible for setting all dimming levels, including intensity ramps and the appropriate ramp time. In either case, the Light Source is not required to connect with or pair to the ACB. This eliminates the need for unique address schemes and commissioning where specific Light Sources are manually pointed to specific ACBs. Referring to the embodiment where the ACB snaps onto an Light Source, in the case for instance of a T8 Fluorescent or LED Tube, the Light Sources may be installed first and the ACB second, even at a later date. At installation, the ACB begins harvesting solar energy from the Light Source and broadcasting intensity levels. The Light Sources read the ACB broadcast and adjust intensity automatically without pairing or setup. This same technique may be used and applied to light switches, dimmers, gateways, sensors or any other type of control or input device.

In the case where Light Sources do not include a wireless radio, a wireless radio may be added to the light fixture through traditional dimming means, such as connecting a wireless radio in the form of a module to the light fixtures dimming input. The dimming input may be a driver, ballast, electronic circuit, or similar. In some embodiments, referring to the 0-10V harvesting techniques described herein, a wireless receiver may be connected directly the light fixture or its LED driver or ballast's 0-10V input where it harvests energy to power the wireless radio and adjusts the light intensity of connected light fixtures using the methods as previously discussed. The wireless receiver functions in a receive mode and listens for broadcasts from the ACB as just described. The wireless receiver then sets the intensity of the connected Light Sources. This solution would be a two-wire solution that both dims and powers the wireless module and offers the opportunity for the ACB to control any third-party lighting device. In another embodiment, a wireless radio may be added to an external relay, switch, TRIAC, SCR, or switch pack, where the switch pack powers the wireless radio. The wireless radio thereafter controls the switch pack by activating and deactivating its output using a switch input. In another embodiment, the wireless radio may be part of a larger lighting control system, where the ACB provides feedback to the lighting control system through a wireless connection that then may be used to trigger real-time or future events.

In addition to transmitting a wireless broadcast, the ACB is able to switch into a listen mode where the ACB is able to listen for similar broadcasts from other devices. The advantage to this embodiment is to simplify setup by reducing the complexities or security concerns of establishing bidirectional communication; rather the ACB is programmed to occasionally listen for broadcasts when it is not broadcasting. In this case, the ACB is able to hear a wireless payload from for instance another ACB, a mobile device, a wireless light switch or similar device, the payload including operational information, such as user preferred light levels. Upon receiving the wireless payload, the ACB is able to adjust light levels in accordance to the user's preferences without directly connecting to the user. In the case of multiple users the ACB is able to average the received data and record the unique identifier of the broadcasting device. For instance if one user requests the lighting to be dimmer and one brighter, the ACB maintains the current brightness (in this case the average). Under these conditions, users within a space using a mobile device application are able to vote for their environmental preferences, including their preferred lighting intensity level and/or lighting color. Preferences may be as simple as specifying a location should be brighter or dimmer, warmer or cooler rather than specifying an exact value. In some embodiments, the same technique may be applied to HVAC systems where users are able to vote for temperature in the form of warmer or cooler. In all cases, user feedback and similar data may be used as an input into Location Analytics as a measure of building health and operation.

In some embodiments, the user's mobile device may periodically or continuously broadcast a customized UUID with or without a major or minor that may contain personal information about the user and their preferences. The UUID is then read by the ACB and similar devices without requiring pairing or a connection to the mobile device and the ACB is able to adjust the environment within a space accordingly. The ACB is capable of placing greater weight on previously recognized UUIDs compared to new UUIDs. In some embodiments, the ACB is able to measure the RSSI and compare it to the transmission power of broadcasted signals. This allows the ACB to place priority to signals that consistently include a higher RSSI indicating a user may be closer to the ACB than another. In another embodiment, the mobile device may be used to broadcast a signal that is heard by the ACB, in which case the ACB performs a light effect. This is useful for instance when an App on the mobile device attempts to gain the user's attention. In one example, a vending machine is outfitted with an ACB and a Light Source. Upon approaching the vending machine, the mobile device broadcasts a signal that is received by the ACB and a lighting effect such as color changing or intensity ramps occur. In some embodiments, the mobile device recognizes the ACB broadcast and triggers a coupon based on user preferences, for instance a coupon for their favorite flavor. In a more advanced system, the mobile device may broadcast specific color or lighting function commands to the ACB. In this case, the ACB would create a lighting effect specific to the nearby user, for instance changing the cooler to cherry light color to correspond with a coupon delivered for cherry soda. Lighting effects may also be created for special events, for instance a red, white, and blue color scheme for the 4th of July. They also may be created based on user demographic, fun color changing schemes and intensity ramps for children and more sophisticated brightening and dimming for adults. Furthermore, the use of the ACB occupancy sensor is able to confirm the delivery of the lighting effect. For instance, the ACB hears the mobile device broadcasts, however does not react until both the RSSI crosses a threshold and the ACB occupancy sensor detects user presence. In another example, an App of a user walking down an aisle of a department store may broadcast a signal that indicates their shopping preference, changing light effect nearby specific products, for instance brightening lighting around products that correspond to a shopping list or changing lighting color. This is also done by the mobile device broadcasting user preferences that are then understood by the ACB resulting in a lighting effect, where the ACB makes the decision on how to display nearby products.

In another embodiment, the mobile device may be used to broadcast configuration and operational information to the ACB. In one example, the wireless broadcast may include a first intensity level and a second intensity level, the first target intensity level specifying a target intensity level for the ACB light sensor to regulate and the second intensity level is the minimum allowed intensity level. This information may be set using an App installed to a mobile device, such as the example shown in FIG. 54. Wireless broadcasts may also be used to set configuration information such as the aggressiveness of dimming ramps for transitions, rules, profile codes, and/or wireless transmit power. Profile codes may be defined by a description, such as Retail profile, where profiles may consist of one or more rules. In a more advanced configuration, rules may also be created. In some embodiments, the mobile device transmits to the ACB at initial setup a first intensity level, a second intensity level, and a transmit power level. In another embodiment, the mobile device transits to the ACB a first intensity level and a transmit power level. In another, the mobile device transmits an activation code to the ACB. The information may be encoded in a special UUID and/or use of major/minor codes or by connecting to the ACB with bi-directional communication or some other wireless method. In some embodiments, the information may be communicated to the ACB photo sensor using light from the mobile device's screen or flash LED.

Referring now to FIG. 1, a block diagram depicting components of the Advanced Control Beacon, in accordance with an embodiment. FIG. 1 illustrates an operational view of the ACB internal functionality. The Energy Source provides energy to the Power Converter at step 10. The Energy Source may be one or more solar cells or may be any power source as described herein. At step 20, the Power Converter converts the Energy Source voltage from a first voltage to a second voltage and stores the Converted Energy in the Energy Storage Device. The Power Converter may be as simple as a switch and an inductor that is controlled by the Processor using a PWM signal. At step 30, additionally, the Power Converter may include two stages, a first stage that boosts the voltage from the Energy Source and a second stage that reduces (or bucks) the now boosted voltage. The Energy Storage Device may be a battery, capacitor, inductor, super capacitor or similar as describe in this document.

There may be more than one Energy Storage device. The Energy Storage Device provides power (V+) to electronic components internal to the ACB. At step 40, the Processor monitors the Power Converter/Energy Source in order to manage the ACB energy budget and/or charging of the Energy Storage Device. This may be done by taking measurements or algorithmically. The Processor is also able to modify the operation of other devices within the ACB, such as the Radio, Sensors, Dimming Control etc. in order to regulate the power consumption of each device and to enter the ACB into a low power mode of operation. At step 50, with power available, in the embodiment shown, the processor adjusts the duty cycle (aka chirp rate) of the Radio's wireless beacon broadcast and optionally the Radio's sniffing for nearby wireless devices, such as MAC addresses of nearby mobile devices. The same Radio may be used for both sniffing and broadcasting and the Processor adjusts the duty cycle of both functions to maintain a power budget while maximizing performance/functionality. At step 60, as the radio detects nearby mobile devices through sniffing, the processor stores the MAC address, RSSI of the detected signal, and a time stamp into the Database that is stored in Memory, this data referred to as Ambient Data, the time stamp established by the Clock. Typically Memory is onboard the same silicone hardware as the Processor, but it can be a separate component. The stored data may be compressed, for instance the MAC being hashed or truncated to save memory space and energy. One function of Ambient Data is to collect data on mobile device traffic that may then be analyzed by a remote server for tasks such as analytics. Another function of Ambient Data may be to directly influence the operation of nearby Light Sources, the processor having a Dimming Output that may connect to one or more Light Sources to adjust their intensity level based on Ambient Data or the ACB's available sensors. A dimming input may also be available as shown. The processor may also use available sensors, including using the Energy Source (such as a solar panel) to detect its environment, for instance determining when the ambient lighting is on or off (for instance by measuring the voltage on the solar cell). Other such data may include a histogram of lighting intensity levels, occupancy data, temperature, and measurable local data. This data is also stored to Memory, referred to as Light Data. To effectively provide location services to nearby mobile devices and to make available the Ambient Data and Light Data recorded, the Processor generates a UUID, Major/Mino and/or URL string that is broadcast by the Radio in the form of a wireless beacon at step 70. The wireless broadcast may include a Unique Identifier, some or part of this number rotating with time and calculated by the Processor, along with the Ambient Data and/or Light Data as described. In some cases, the Ambient Data and Light Data may rotate, some or all of the Ambient Data first broadcast with the Unique Identifier, followed by the Light Data broadcast with the Unique Identifier. The Processor may also vary the power level of the Radio from a first state as a high power broadcast to a second state to a low power broadcast, the technique as earlier described improving location accuracy for mobile devices and the Location Engine management of locations. Upon detecting the Wireless Beacon, nearby devices, like mobile devices may hit the presented URL (or API should a conventional beacon such as an iBeacon be detected), providing back to the Location Engine server(s) the unique identifier and in some cases the Light Data and some or all of the Ambient Data. It also enables the Location Engine to respond back to the mobile device with information, such as decoded Major/Minor values, a decoded UUID, a Virtual Beacon, Location Identifier, metadata etc. Many embodiments are possible, including the use of iBeacon and other beacon formats in addition or in lieu of the URL technique as described.

Figure 2A:
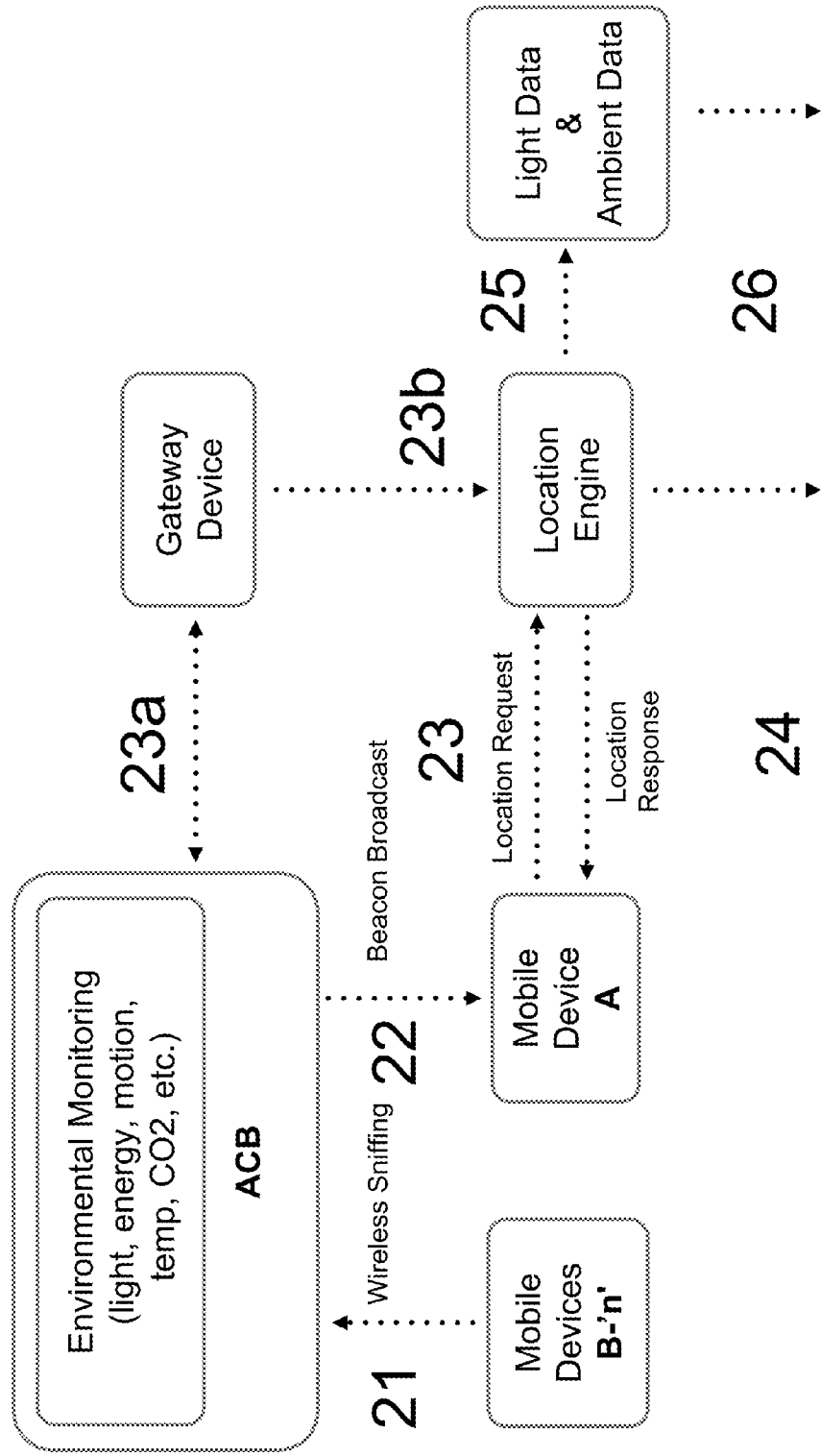
FIGS. 2A-2B are block diagrams depicting a system for the Advanced Control Beacon, in accordance with some embodiments.
Figure 2B:
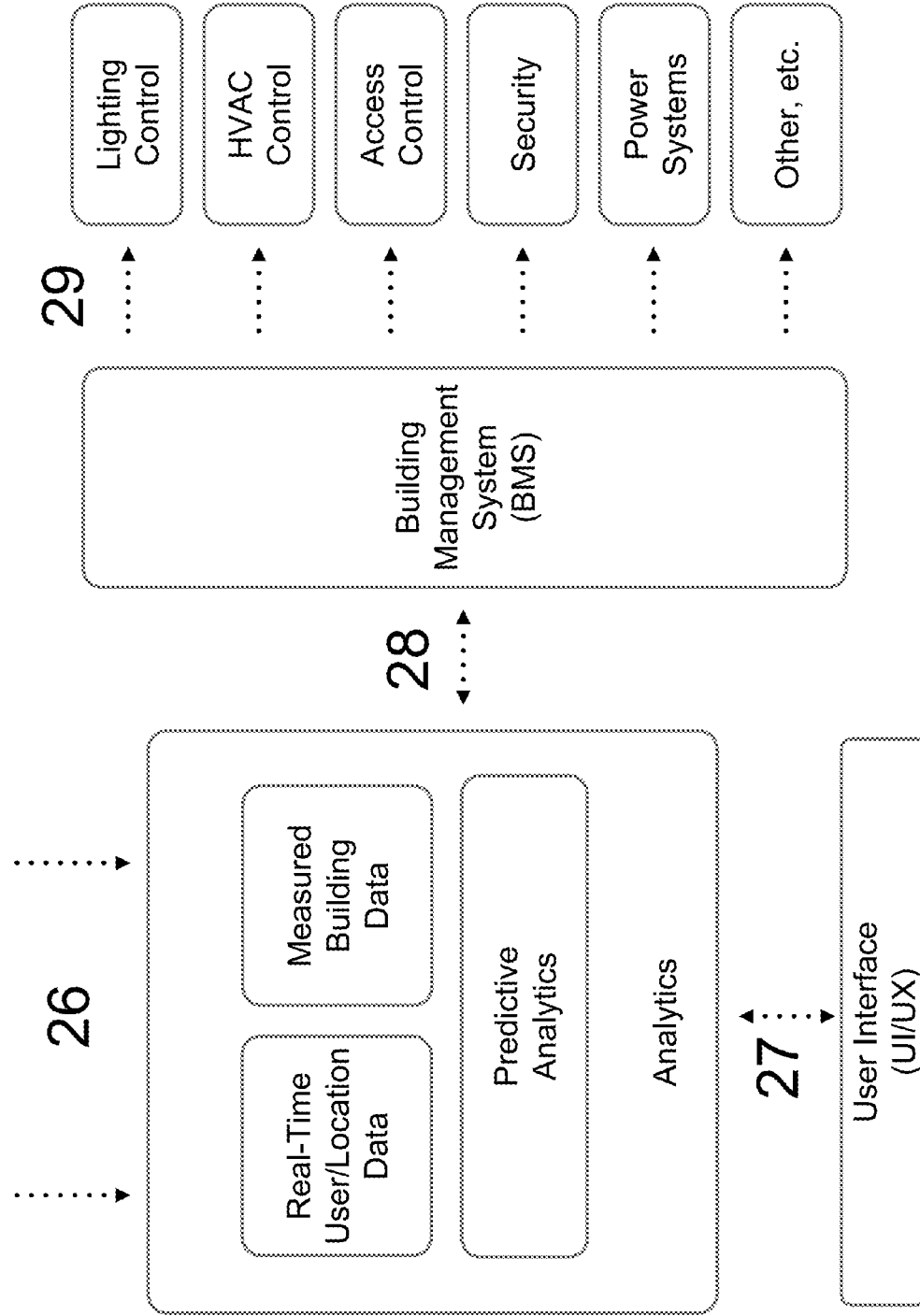

FIGS. 2A-2B are block diagrams depicting a system for the Advanced Control Beacon, in accordance with some embodiments. FIGS. 2A and 2B show a variation of a complete system diagram, noting that components as described may be optional and that the intent is to illustrate a full-featured solution (keeping in mind that it is possible to add other components to the system as shown and that the system as displayed is by way of example). As discussed in FIG. 1, the ACB may detect Ambient Data, such as nearby mobile devices over time using their wireless radios, such as wireless MAC sniffing at step 21, these detected devices defined as Mobile Devices B through 'n' as shown. The ACB may also detect environmental data such as light intensity, light color, lighting energy consumed, motion detected, temperature, carbon dioxide levels and other measurable data points referred to as Light Data. One way the ACB communicates this data is through its beacon broadcast (step 22), from which nearby Mobile Device A is able to communicate Ambient and/or Light Data directly to the Location Engine through a Location Request (step 23). Another way the ACB communicates this data is through a local Gateway Device (step 23*a*), where the Gateway Device may listen for ACB Beacon Broadcasts or may directly connect to the ACB or a network of ACBs in order to get the data. The Gateway Device may be connected to the Internet and in communication with the Location Engine (23*b*). In the case of Mobile Device A, upon issuing the Location Request to the Location Engine, the Location Engine may return back (step 24) a Location Identifier, Virtual Beacon, or in some cases a Web Page, providing Mobile Device A with its location and/or other information. Mobile Device A initiates the Location Request (23) one of several ways discussed herein, the simplest method by decoding and then hitting a URL broadcast by the ACB, the URL including a Unique Identifier along with Ambient Data and/or Light Data. Upon receiving the Location Request, the Location Engine establishes Mobile Device A's location and at the same time extracts the Light Data and/or Ambient Data out of the Mobile Device Location Request (25). The Location Request may include additional information, such as the RSSI of the ACB Broadcast as measured by the mobile device and information specific to the mobile device, like a unique identifier, its IP address, Apps installed and other information. All of this data, including the Location Request, Light Data, and Ambient Data may be stored and analyzed through the Location Engine's Analytics platform. Analytics include Real-Time user location data and building data, user location data and building over time, as well as predictive analytics that may be derived from their analysis. Additionally, other third-party data may be introduced to improve the data accuracy and resolution. Through a User Interface (27), users can log into Analytics (26) using for instance a web browser to view the operational history of a building or space outfitted with ACBs, including how users us a space, how energy is consumed, and lighting health as shown by way of example in FIGS. 3 and 4 (26). The type of data analyzed and displayed is virtually unlimited as is its presentation. In addition to displaying information, the Analytics platform is capable of providing a raw data feed as well as interfacing with Building Management Systems (BMS) (28), for instance providing real-time or predicted data through an API to a BMS that may then alter the operation of one of its many connected systems as shown, resulting in improved building operation, user comfort, and/or energy savings (29). These examples are non-limiting.

Figure 3:
FIGS. 3-4 depict example user interfaces for analytics provided via the Advanced Control Beacon, in accordance with some embodiments.
Figure 4:

FIGS. 3 and 4 depict example user interfaces for analytics provided via the Advanced Control Beacon, in accordance with some embodiments. FIGS. 3 and 4 shows a baseline example of Analytics. In this example a location is defined, followed by a number of Places within the location. Users are able to define a timeframe to view data, the data available from one or more ACBs that are installed in these locations. In one embodiment, one ACB may be used for a single Place. In another each Place may have many ACBs. Accurate user positioning and user traffic may be refined by the Location Engine monitoring the transition of a user from one Place to another. To explore the other fields shown, Lighting Use is defined by measuring the operational on time of the light fixture that for instance a solar powered ACB may be attached to. This may also be simply converted to Energy use. Total Visits show the number of users, which may include both users issuing Location Requests as well as users detected by wireless sniffing and communicated by the ACB through Ambient Data attached to for instance URLs that are hit to generate the Location Request. Average Visit Duration is calculated as Visits vs. time at a specific Place. Space Utilization at its most basic level is calculated as the average number of visitors in a Place divided by the maximum users ever recorded within the same Place. This metric helps facility managers understand how well space is being utilized relative to its maximum potential. Lighting Health offers visibility into the total run time of the local light sources, giving insight as to when lighting may be expected to be changed or how the operation of the light source compares to its warranty period. This is particularly useful when installing the ACB into a long-life light source, such as LED lighting. Other ways to visualize the data includes displaying location floor plans and graphically visualizing one or more metrics on the floor plan, for instance using color gradients. The type of data to be displayed and its visualization is unlimited, the dashboard shown being an incredibly simple example.

Figure 5:
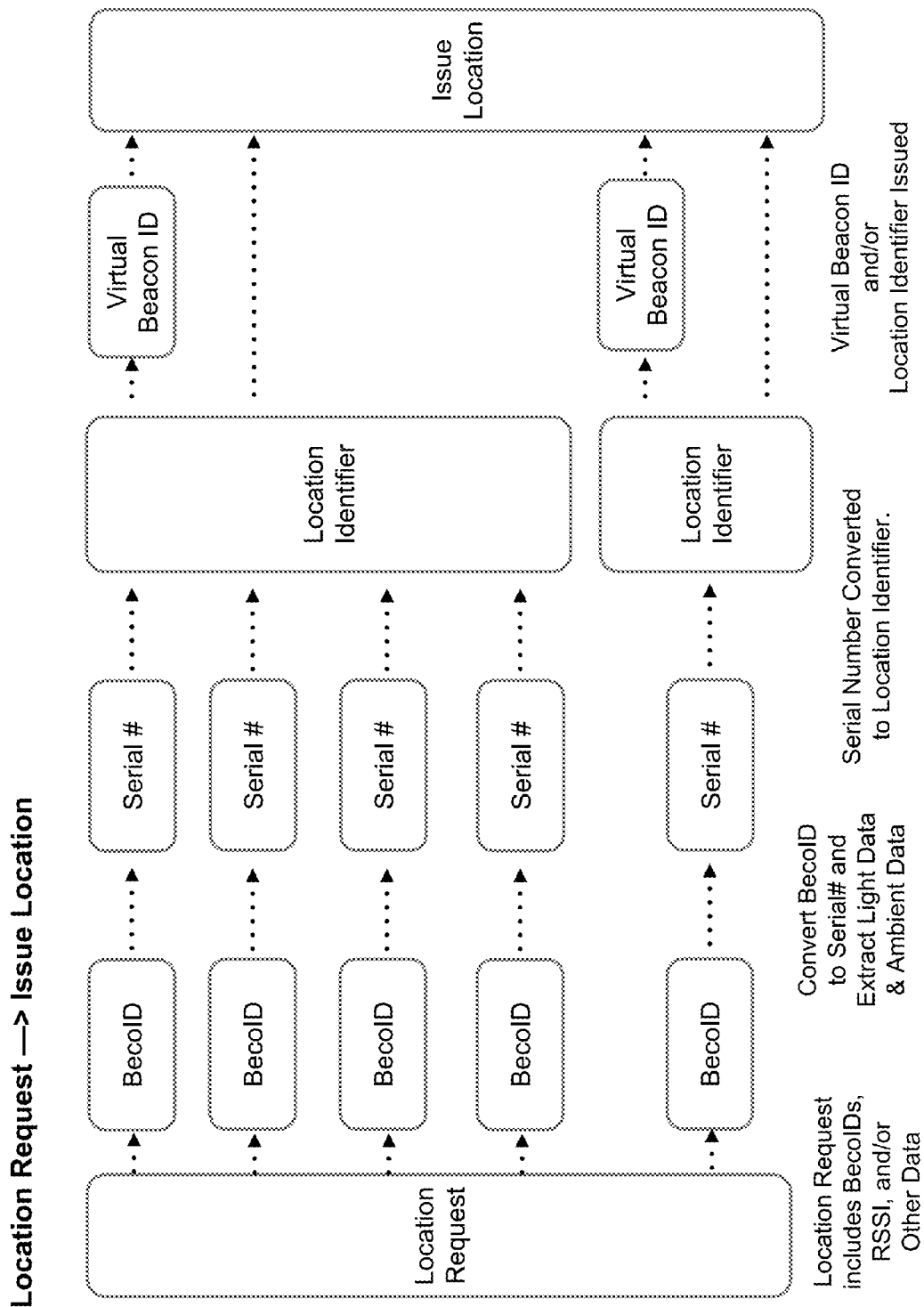
FIG. 5 is a flow diagram depicting a process of analyzing a location request, in accordance with an embodiment.

FIG. 5 is a flow diagram depicting a process of analyzing a location request, in accordance with an embodiment. FIG. 5 shows a location request consisting of 5. BecoIDs. These BecoIDs are converted to Serial Numbers that are then matched with their appropriate Location Identifier. In this example, two Location Identifiers are established based on the BecoIDs submitted. The Location Identifier and a Virtual Beacon ID are issued. In some cases as shown a single Serial Number may be associated with a single Location Identifier, in other cases, as also shown, many Beco IDs may be associated with a Location Identifier. Serial Numbers are simple a fixed ID that represents each ACB in the field, the BecoIDs changing over time. In one embodiment, the order of which the BecoIDs are received over time and their resulting Location Identifiers may be used to help validate accuracy and positioning, for instance, a mobile device moving through a room may be expected to detect all 5 BecoIDs as shown or all 5 Beco IDs as shown in a particular order, indicating movement of the device and adding certainty to the issuance of the Location Identifier.

Figure 6:
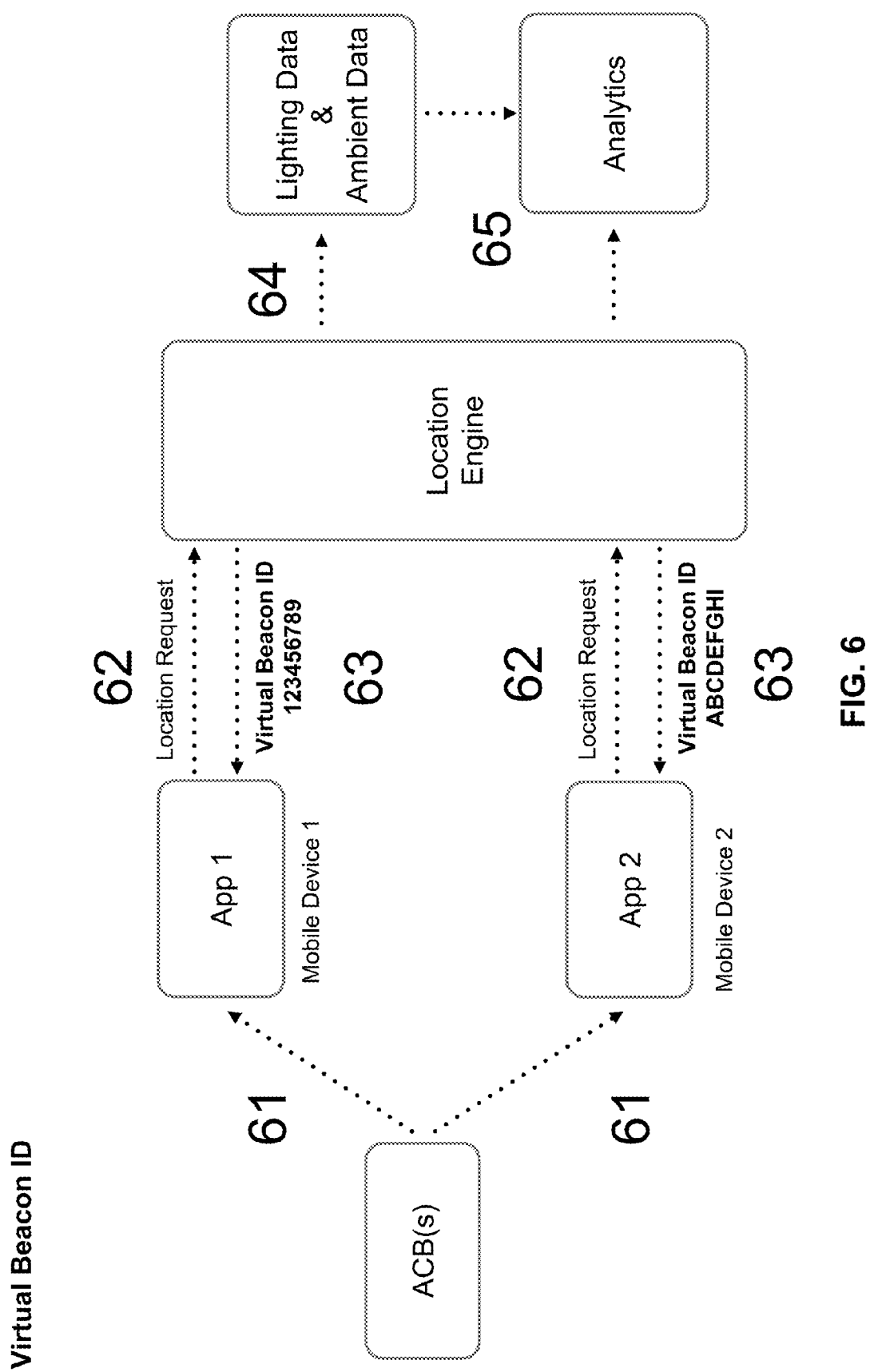
FIG. 6 is a block diagram depicting a process of generating a virtual beacon ID, in accordance with an embodiment.

FIG. 6 is a block diagram depicting a process of generating a virtual beacon ID, in accordance with an embodiment. FIG. 6 shows 2 different mobile devices, each operating a different App that subscribes to our Virtual Beacon ID program. Each mobile device detects one or more BecoIDs broadcast from one or more ACBs, the mobile devices being in the same physical location and therefore the BecoIDs being the same (61). Upon detection, each App issues a Location Request to the Location Engine and receives back a Virtual Beacon ID (62). As shown in the diagram, each Virtual Beacon ID received back is different, showing how a single collection of BecoIDs can be configured to return back any type of identifier depending on the App and the format the App uses, processes or requires (63). In some implementations, Lighting Data and Ambient Data is extracted from the BecoIDs (64), this data combined with a record of Location Requests being useful for Analytics as already described (65).

Figure 7:
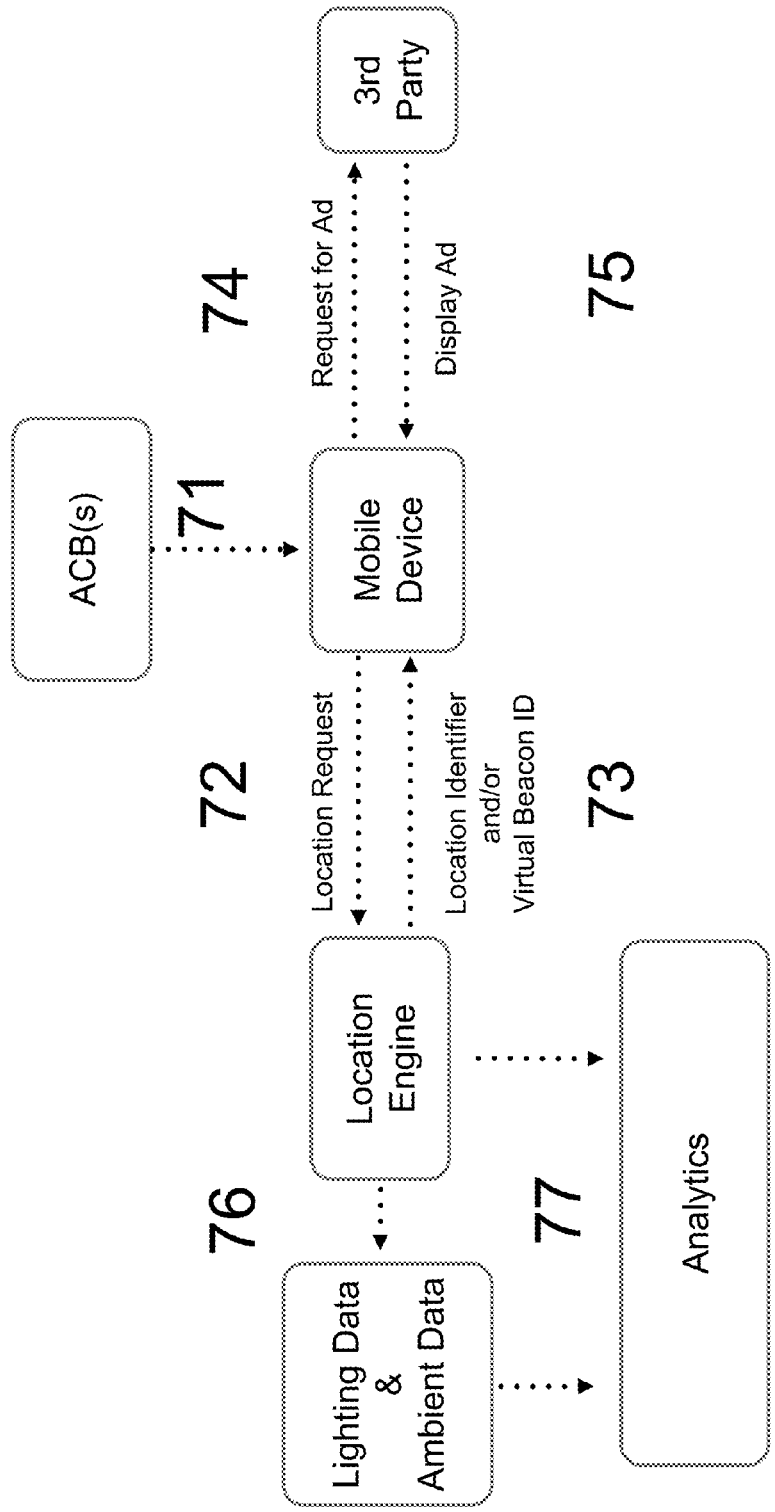
FIG. 7 is a block diagram depicting an interaction between a location engine, a mobile device and a third party system, in accordance with an embodiment.

FIG. 7 is a block diagram depicting an interaction between a location engine, a mobile device and a third party system, in accordance with an embodiment. FIG. 7 shows a first example of how the Location Engine interacts with a Mobile Device and a third party system, in some cases being an Ad-Exchange. As shown, a mobile device detects one or more ACB BecoID broadcasts (71). Upon doing so, the mobile device issues a Location Request to the Location Engine (72). The Location Engine responds with a Location Identifier and/or a Virtual Beacon ID (73). With the location data, the Mobile Device requests an advertisement from the third-party server, including in its request the location data, which may be in the form of the Location Identifier, Virtual Beacon ID, or other descriptive data like locational coordinates or metadata about the location (74). The Third-Party server uses the location data (along with other available data) to display an advertisement tailored to the specific mobile user, the Mobile Device displaying the advertisement (75). In the case of an Ad-Exchange, it may auction the advertisement slot to advertisers and other third parties using real-time bidding and other similar techniques, presenting the advertisement slot with the location data or information about the location. In some implementations, Lighting Data and Ambient Data is extracted from the BecoIDs for Analytics (76, 77).

Figure 8:
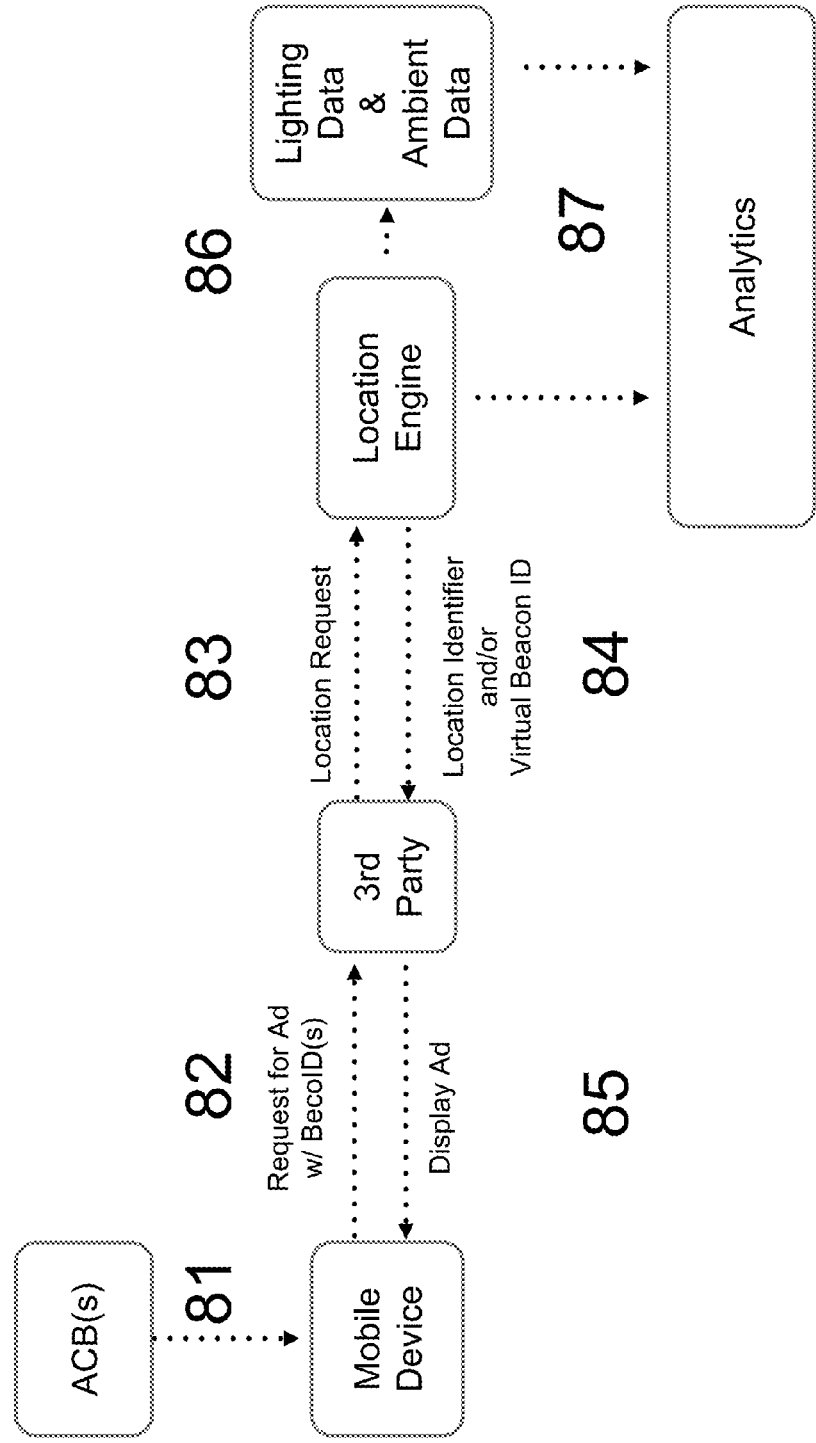
FIG. 8 is a block diagram depicting an interaction between a location engine, a mobile device and a third party system, in accordance with an embodiment.

FIG. 8 is a block diagram depicting an interaction between a location engine, a mobile device and a third party system, in accordance with an embodiment. FIG. 8 shows an embodiment of how the Location Engine interacts with a Mobile Device and a Third-Party System that may be an Ad-Exchange. As shown, a Mobile Device detects one or more ACB BecoID broadcasts (81). Upon doing so, it requests an advertisement from the Third-Party server, including in its request BecoIDs (82). The Third-Party Server issues a Location Request to the Location Engine with the BecoIDs in which case the Location Engine returns a Location Identifier, Virtual Beacon ID, or other descriptive data like locational coordinates or metadata about the location (83). The Third-Party Server uses the location data (along with other available data) to display an advertisement tailored to the specific mobile user, the mobile device displaying the advertisement (84). In the case of an Ad-Exchange, it may auction the advertisement slot to advertisers and other third parties, presenting the advertisement slot with the location data or information about the location (85). In some implementations, Lighting Data and Ambient Data is extracted from the BecoIDs for Analytics (86, 87).

Figure 9:
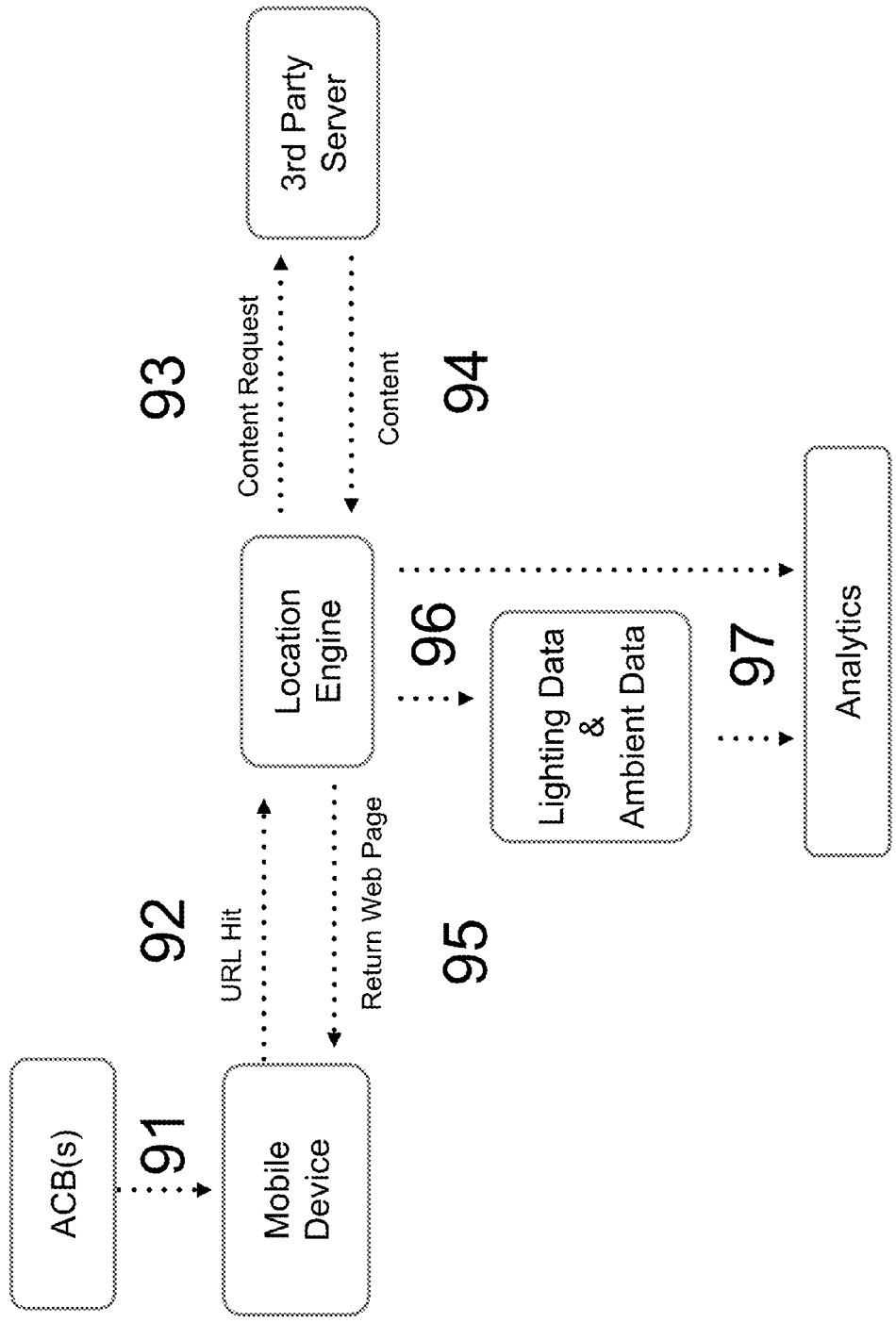
FIG. 9 is a block diagram depicting an interaction between an ACB and a location engine, in accordance with an embodiment.

FIG. 9 is a block diagram depicting an interaction between an ACB and a location engine, in accordance with an embodiment. FIG. 9 shows an embodiment of how an ACB broadcasting a URL may use the Location Engine to return a web page. In this example, the Mobile Device detects one or more BecoIDs from the ACB, the BecoID formatted as a URL (91, 92). The Mobile Device decodes and hits the provided URL, the URL directed to the Location Engine (92, 93). The Location Engine in one embodiment may return a web page and/or Location Identifier and/or Virtual Beacon directly (94, 95). In the embodiment shown, the Location Engine receives the URL hit and responds by requesting content from a Third Party Server (94, 95). This request could be for an advertisement, location relevant data, such as a train schedule, or any other information that is useful relative to the Mobile Device. The Location Engine may also function simply as a cache server by decoding the URL and forwarding the request to the 3$^{rd}$ Party Server to interface directly with the Mobile Device and therefore directing traffic away from the Location Engine (95). As described herein, the Location Engine upon receiving the URL hit is also able to extract Light Data and Ambient Data from the URL hit, this data being useful for Analytics as already described (96, 97).

Figure 10:
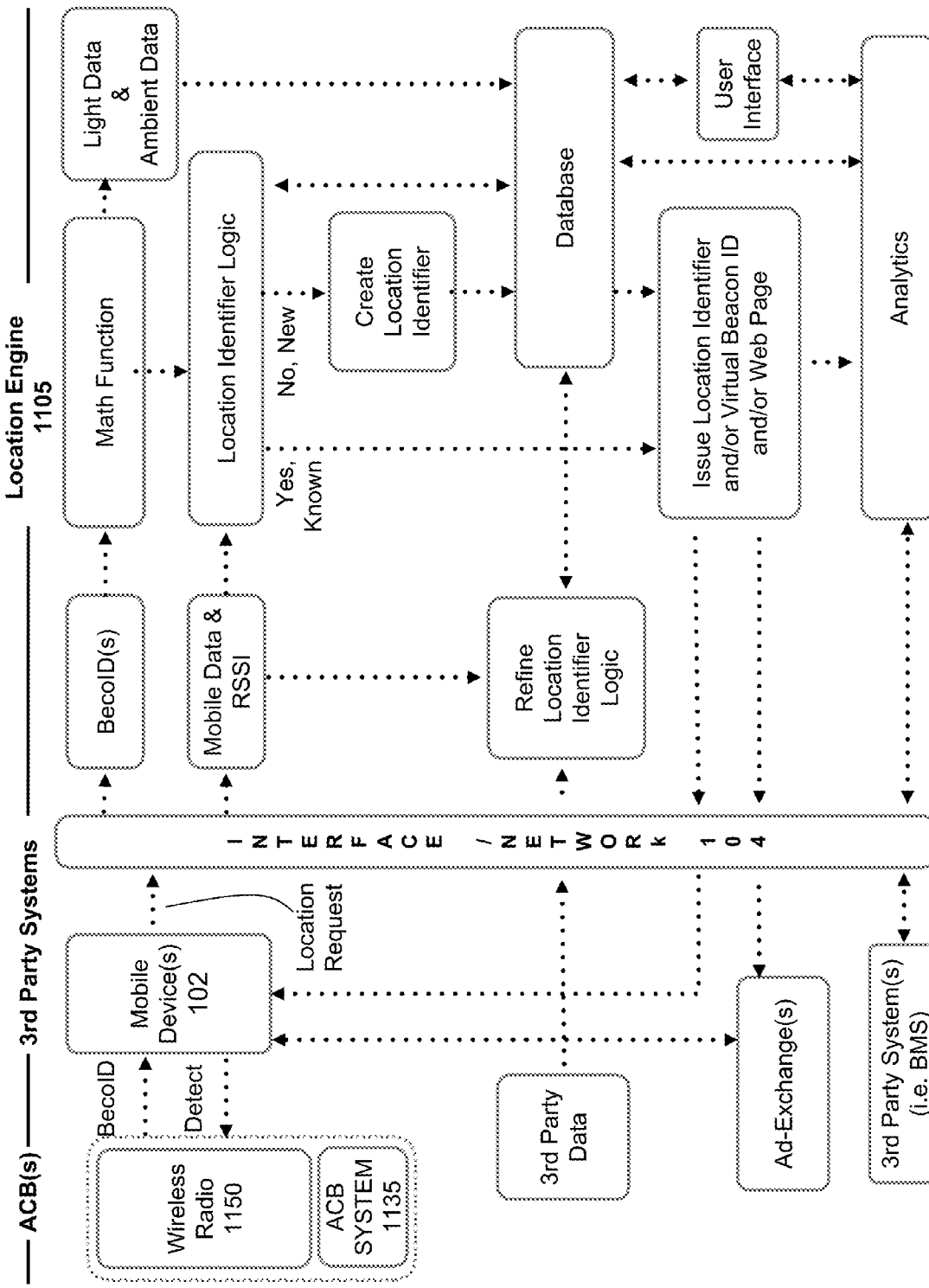
FIG. 10 is a block diagram depicting an interaction between an ACB, 3$^{rd}$ Party system, and location engine, in accordance with an embodiment.

FIG. 10 is a block diagram depicting an interaction between an ACB, 3rd Party system, and location engine, in accordance with an embodiment. FIG. 10 displays an example of how the ACB Beacon, 3rd Party Systems, and the Location Engine interact. There are many possible variations, in which case this diagram should be considered as one of many variations.

In this example, the ACB includes the wireless radio and ACB system that generate and transmit beacons. The 3$^{rd}$ party system includes mobile devices that receive or detect the beacons (e.g., BecoIDs). The mobile device can generate a location request to the location engine 1105 via network 104.

Referring now to FIG. 11, a block diagram depicting a system for light-enabled indoor tracking, positioning, or reporting in accordance with an embodiment is shown. In brief overview, the system 1100 includes one or more advanced control beacons or ACBs 1135a-n (or referred to as ACB 1135). The ACB 1135 may be referred to as a light-enabled positioning device or light-enabled tracking device. The ACB 1135 is coupled, fastened, attached, or other held adjacent to the light source 1120 via a fastener 1125. The distance between a portion of the ACB 1125 and a portion of the light source 1120 may be D 1130. The ACB 1235 can include a beacon ID generator 1140, solar power module 1145, and a wireless radio 1150. A client device 102 can receive a wireless transmission from the ACB 1150. The client 102 can include an antenna 1155 and an agent 1160 executing on the client 102 to process the received wireless transmission and take further actions. The system 1100 can include an indoor positioning tool 1105. The tool 1105 can include a location engine 1105 that receives a beacon identifier or other information from the client 102. The tool 1105 can include a database 1115 with a mapping of beacon identifier to locations. The tool 1105 can include a report generator 1110 that can perform various analysis or processing of information received via client 102 or otherwise obtained to generate report, analytics, or take further actions. The system 1100, ACB 1135, client 102, and tool 1105 can be configured with or include one or more component or functionality illustrated in FIGS. 1, 2A, 2B, 5, 6-10, and 12-17D.

Still referring to FIG. 11, and in further detail, the system 1100 includes an ACB 1135 that is adjacent to a light source 1120. The light source 1120 can include any type of light source, including, e.g., solid state, organic, or filament (with or without a gas) type sources, a Light Emitting Diode (LED), organic LED (OLED), fluorescent, neon, plasma, HID, inductive, incandescent, halogen, or any other source of lumen generation.

The ACB 1135 may be positioned, placed, fixed, or removably fixed adjacent to the light source 1120 via a fastener 1125. The ACB 1135 can be positioned, placed, fixed, or removably fixed adjacent to the light source using the fastener 1125. The fastener 1125 can be mechanically coupled to a housing of the ACB 1135. In some embodiments, the fastener may mechanically couple or attach a portion of the ACB 1135 to a portion of the light source 1120. The fastener 1125 can be configured to be permanently connected to at least one of the housing of the ACB 1135 or the light source 1120.

In some embodiments, the fastener 1125 may position the ACB 1135 adjacent to the light source 1120 without coupling the ACB 1135 to a portion of the light source 1120. For example, the light source 1120 may include a ceiling fixture or wall fixture. The fastener 1120 may attach the ACB 1135 to the ceiling or the wall, rather than the light source 1120. However, the fastener 1120 may attach or position the ACB 1135 a distance D 1130 from the light source 1120 such that the solar power module 1145 of the ACB 1135 can generate sufficient power from the light source 1120 to power the beacon ID generator 1140 and wireless radio 1150.

Figure 13:
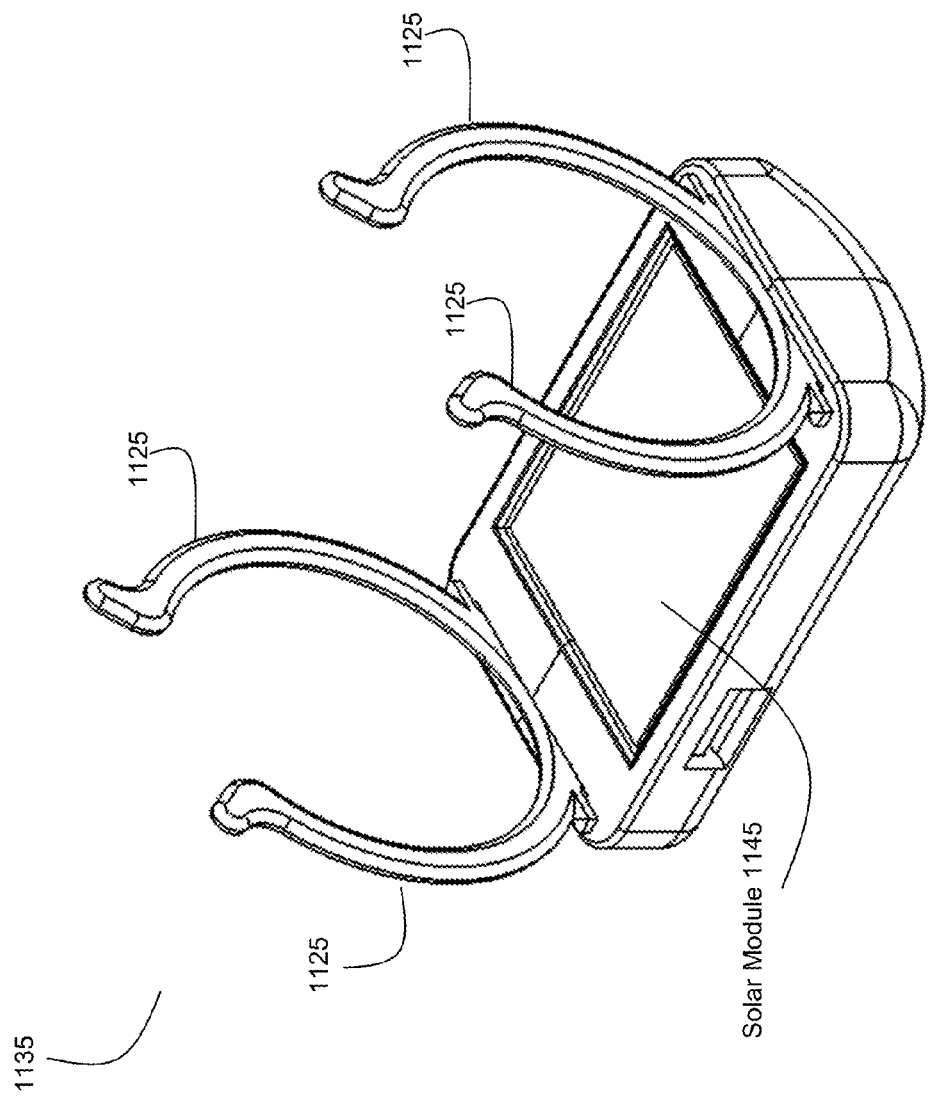
FIG. 13 illustrates an apparatus for indoor light enabled positioning, in accordance with an embodiment.

In some embodiments, the fastener 1125 can include clips. For example, the fastener 1125 can include one or more clips 1305 as illustrated in FIG. 13. The clips can have various dimensions and configurations based on the application. The diameter, shape, or material of the clips may vary based on a dimension of the light source 1120 (e.g., diameter of the tube light), indoor/outdoor setting (e.g., using a weatherproof material such as plastic for outdoor applications). In some embodiments, the fastener 1125 may include a wire, string, hook, sleeve, hook-and-loop fasteners, hook-and-pile fasteners, touch fasteners, etc. In some embodiments, the fastener 1125 can include an adhesive, suction cup, magnet, latch, groove, screws, nut and bolt, or pins.

In some embodiments, a dimension of the fastener 1125 may be adjustable. For example, the fastener 1125 can be extended or contracted in order to vary distance D 1130, or a diameter of the clips. In some embodiments, the fastener 1125 may be malleable, moldable, ductile, or pliable such that it can be re-configured or adjusted to attach to light source 1120 or other fixture without being pre-configured or manufactured.

In some embodiments, the fastener 1125 can be removable. The fastener 1125 can be removable from the housing of the ACB 1135, or from the light source 1120 or other fixture with which the fasten 1125 attaches the ACB 1135. For example, the fastener 1125 may include an attachment mechanism that attaches the fastener to the housing of the ACB 1135. The attachment mechanism may include an adhesive, suction cup, magnet, latch, groove, screws, nut and bolt, pins, etc.

The fastener 1125 positions the ACB 1135 a distance D 1130 from the light source. The distance D 1130 can be a predetermined distance that allows the solar power module 1145 to convert sufficient light output from light source 1120 to electricity in order to power the electronic circuitry of the ACB 1135. In some embodiments, the distance D 1130 can vary based on the light intensity or lumen output of the light source 1120. For example, the distance D 1130 may be greater for a light source that outputs a high lumen amount as compared to a light source that outputs a low lumen amount. The distance D 1130 may further vary based on a heat output of the light source 1120. For example, a halogen lamp with a high lumen output may generate a large amount of heat; thus, distance D 1130 may be determined such that the heat output of the light source 1120 does not adversely impact the ACB 1135 or components thereof. In some examples, the distance D 1130 may be a value in the range of 0.25 inches to 5 inches, or plus or minus 10% thereof.

In some embodiments, the fastener 1125 may be built-in with the light source 1120. For example, the fastener 1125 may be included as part of the light source during manufacturing or assembly of the light source 1120. Thus, the light source 1120 can include a fastener 1125 that is configured to attach the ACB 1135 a distance D 1130 from the light source.

In some embodiments, the system 1100 includes an ACB 1135. The ACB 1135 can include one or more component or functionality illustrated in FIG. 1, 2A, or 10. The ACB 1135 can include a solar power module 1145. The solar power module 1145 can include one or more solar cells. Solar cells, or photovoltaic cells, can include an electrical device that converts the energy of light into electricity via the photovoltaic effect. The solar cells may be photovoltaic irrespective of whether the source is sunlight or an artificial light from the light source.

The solar power module 1145 can further include a circuit configured to convert power from the solar cells and supply the power in an appropriate form for consumption by one or more electronic components of the ACB 1135. The solar power module 1145 can include a power converter that converts a characteristic of power obtained from the solar cells to a second characteristic for use by an electronic component of the ACB 1135. For example, the power convertor can include a voltage transformer that converts a first voltage from the solar cell to a second voltage that operators the beacon ID generator 1140, wireless radio 1150, processor, transmitter, etc.

In some embodiments, the solar power module 1145 can include a power storage component. The power storage component can include a battery, or electrochemical cells that convert stored chemical energy into electrical energy, and vice versa. The battery may be rechargeable via the solar cells. The power store component can include a rechargeable battery, storage battery, secondary cell, or accumulator. The power storage component can include, e.g., lead-acid batteries, nickel-cadmium batteries, lithium-ion batteries, lithium-ion polymer batteries, lithium sulfur batteries, thin film batteries, smart batteries, ultrabattery, potassium-ion battery, sodium-ion battery, quantum battery, etc.

The ACB 1135 can include a beacon generator 1140. The beacon generator 1140 can be configured on one or more processors. In some embodiments, the beacon generator 1140 can include the wireless radio or be configured on the same processor as the wireless radio. The beacon ID generator 1140 can generate a beacon that includes information, such as a numeric identifier, alpha numeric identifier, an identifier comprising binary values, a string, text, phrase, symbols, or other information. The beacon ID generator 1140 can be configured to generate a beacon with a fixed identifier, or an identifier that varies. The beacon ID generator 1140 can be configured to vary the beacon identifier based on a function, using a random generator, based on time, based on a condition or an event. The beacon generator 1145 can generate the BecoID. The beacon generator 1145 can periodically generate beacons, continuously generate beacons, or generate beacons responsive to a condition or event.

In some embodiments, the beacon generator 1140 can generate an encoded beacon. For example, the beacon generator 1145 can generate a beacon that includes a string that is encoded with a key. The string can include any information that can facilitate positioning, reporting, or tracking or providing other functionality. For example, the information can include metadata, measured data, sensed data, detected data, temperature information, humidity information, proximity information, motion sensor information, audio information, video information, pictures, timestamps, status information, operational status information, alerts, location information, etc.

For example, the ACB 1135 can interface with one or more sensors, such as temperature sensors, ambient temperature sensors, proximity sensors, motion sensors, light sensors, microphone, camera, vibration sensor, seismic sensor, etc. The ACB 1135 may receive sensor information and generate a beacon with a string that includes the sensor information.

In some embodiments, the beacon generator 1140 can generate a beacon to include an identifier such as a uniform resource identifier, uniform resource locator, web address, IP address, location information, latitude and longitude coordinates, etc. In some cases, the information can include a universally unique identifier (e.g., beacon UUID) followed by a major and minor value. The Beacon UUID may be a fixed identifier or may change over time, the character length of the UUID being unrestricted. In one embodiment, the UUID is comprised of 16-bytes, optionally followed by a 2-byte major value and a 2-byte minor value, collectively referred to as an iBeacon. In another embodiment, the UUID comprises a 16-byte unique identifier followed by 4-bytes of Lighting Data and in some cases an optional 1-byte broadcast power level. In another embodiment, the UUID comprises a URL that includes a web address, such as https://www.beco.com, followed by data that may include a unique ID and other data, where the data may include Lighting Data, Ambient Data, an error code, profile code, and/or similar. The web address may be compressed using an encoding scheme in order to maximize the amount of data included in a single wireless payload. In one embodiment, to communicate larger amounts of data than permitted in a single broadcast, data included in the broadcast may change over the course of multiple broadcasts, for instance a first broadcast that includes a Unique ID and Lighting Data, followed by a second broadcast that includes a Unique ID and Ambient Data. In a similar embodiment, data of a similar type too long to fit into a single broadcast may be split into multiple broadcasts, such that a first broadcast includes a Unique ID and Ambient Data followed by a second broadcast that includes a Unique ID and additional Ambient Data. The rotation and frequency of the data type that follows the Unique ID may vary, as may the Unique ID. Many variations in message length and format are possible, the variations being unlimited.

The beacon generator 1140 beacon or string can be encrypted. The beacon generator 1140 can use one or more encryption techniques. The encryption technique can include encoding the message or information such that only authorized entities can read the information. The beacon generator 1140 can use a key to encode the information or string in the beacon. The key, or encryption key, can be stored in the ACB 1135 or preconfigured in the ACB. The tool 1105 may include a decryption key that can decrypt the encoded string.

In some cases, the encryption technique can change over time using a crypto engine. Thus, it may be possible to convey the same information using different encryption. For example, a first string can be encoded with a first encryption and broadcast. The first string can later be encoded using a second encryption and re-broadcasted. In another example, the first string can map to a first location. A second string different from the first string may also map to the first location. In this example, the first string and the second string can be broadcast using the same encryption, and the tool 1105 can map both the first and second strings to a same location. Thus, the ACB 1135 can use various encryption or mapping techniques to convey information in a secure manner.

Upon generating the beacon with the information, and/or encrypting the information, the ACB 1135 can broadcast, transmit, or otherwise communicate the beacon. The ACB 1135 can include a wireless radio 1150 to broadcast, transmit, or otherwise communicate or convey the beacon. The wireless radio 1150 can broadcast the generated beacon periodically, continuously or responsive to an event or condition. In some embodiments, the broadcast or transmission can be a wireless transfer of information between two or more points that are not connected by an electrical conductor. The wireless transmission can include radio waves. The wireless radio 1150 may include, e.g., Bluetooth, wifi, infrared, ultrasonic, land mobile radio, wireless USB, etc.

In some embodiments, the wireless radio 1150 can transmit the beacon using Bluetooth technology. Bluetooth may refer to a wireless technology standard for exchanging data over relatively short distances. For example, Bluetooth wireless technology may include short-wavelength UHF radio waves having a frequency between 2.4 to 2.485 GHz. The wireless radio can be configured to use one or more Bluetooth standards, including, e.g., Bluetooth v1.0, v1.1, v1.2, v2.0+EDR, v. 2.1+EDR, v3.0+HS, Bluetooth v4.0, Bluetooth v4.1, Bluetooth v4.2, etc. The wireless radio can be configured with low energy wireless technologies, such as Bluetooth low energy (Bluetooth LE, BLE or Bluetooth smart).

In some embodiments, the wireless radio 1150 can broadcast the beacon using multiple wireless communication technologies and or multiple encryption techniques. In some embodiments, the ACB 1135 can adjust or select a wireless communication technology or encryption technique based on a type of information to be transmitted. For example, if the size of the data is greater, then the ACB 1135 may employ a compression technique or select an encryption that is more efficient to communicate the information. Further, if the data size is large, the wireless radio 1150 may use a wireless protocol that can transfer data faster, such as WiFi. In another example, if the type of information is sensitive, such as location information, operational status information, or personally identifying information, the ACB 1135 can select a more secure encryption technique, such as 256-bit encryption. Thus, in some embodiments, the ACB 1135 can select a wireless communication protocol or encryption technique based on the amount of data or the type of data to be transmitted.

The system 1100 can include a client device 102. The client device 102 can include, e.g., a mobile telecommunications device, wearable device, smartphone, smartwatch, tablet, etc. The client device 102 can include an antenna 1155 that wireless receives or identifies the beacon broadcast via wireless radio 1150. The antenna 1155 can be configured to identify the wireless broadcast.

The client 102 can include an agent 1160 that receives the broadcasted beacon. The agent 1160 can include an application or resource executing on one or more processor of the client 102. The agent 1160 can monitor for the broadcasted beacon. Responsive to receiving, detecting or otherwise identifying the beacon, the agent 1160 can be configured to perform one or more action. For example, the agent 1160 can process or parse the beacon, re-transmit the beacon, provide a notification or indication to a user of the client device 102, store the beacon, generate a location request, query a server, etc.

In some embodiments, the agent 1160 can be configured to re-transmit the received beacon to a server, such as the indoor positioning tool 1105. The agent 1160 may transmit the beacon (or portion thereof, or information thereof) to the tool 1105 via network 104. The agent 1160 can transmit the beacon information in real-time (e.g., responsive to receiving or identifying the beacon), based on a time interval, period, or based on location cell for a certain amount of time or indefinitely. For example, the agent 1160 may periodically transmit beacon information to tool 1105 based on a time interval, such as 60 seconds, 90 seconds, 5 minutes, 10 minutes, 30 minutes, 1 hour or some other time interval that facilitates indoor positioning or tracking. In some embodiments, the time interval, period and duration may be adjusted based on the amount of available energy. The amount of energy may be from the solar cell or a storage device. For example, if the amount of solar energy is low, then the ACB can lower the broadcast frequency so as to conserve energy. The amount of solar energy may be low if the light output of the light source is low. In some cases, if the light source produces a greater light output, then the solar cells can produce more electricity, and the ACB may increase the frequency of the broadcast. In some embodiments, the time interval may be adjusted based on a type of information or indicator associated with the beacon. For example, if the beacon information includes operational status information, then the agent 1160 can be configured to transmit the beacon in real-time (e.g., responsive to receiving the beacon). Operation status information may refer to status information of the ACB 1135, and may indicate that a component of the ACB 1135 is functioning properly, malfunctioning, an error code, alert, etc. In some embodiments, the beacon information may be less time critical, such as historical temperature measurements, in which case the agent 1160 may determine to transmit the beacon information to tool 1105 at a later time as opposed to in real-time. For example, the agent 1160 may transmit the non-time critical information the next time the agent 1160 establishes a communication channel with tool 1105, or in a batch process, or when the client device 102 is connected to a power source, thereby conserving battery usage of the client device 102.

To transmit the beacon information to tool 1105, the agent 1160 can be configured with an IP address or other identifying information of the tool 1105. The agent 1160 may further be configured with authentication information or credentials to establish a communication channel with tool 1105. In some cases, the agent 1160 may modify the beacon information or append data to the beacon information. For example, the agent 1160 can include information that identifies the client 102 or user thereof along with the beacon information, and transmit the beacon information with the additional information to the tool 1105 for further processing.

In some embodiments, the agent 1160 may not be able to decrypt the encrypted string in the beacon. In these embodiments, the agent 1160, rather than modifying the beacon information, can include an additional transmission to the tool 1105 that includes the additional information. The tool 1105 can be configured to associate the additional transmission with the additional information with the transmission of the beacon information based on the temporal proximity of the two transmission or a source of the two transmissions (e.g., source port identified in header information of the packet).

The system 1100 can include an indoor positioning tool 1105. The tool 1105 can include one or more processors or servers. The tool 1105 can include a location engine 1105, report generator 1110 and database 1115. The location engine 1105, report generator 1110, and database 1115 can be configured with one or more component or functionality illustrated in FIGS. 2A, 2B, 3-10, and 17A-17D. For example, the tool 1105 can include backend apps 120. The tool 1105 may operate in cloud 108 as a service.

The location engine 1105 can receive the beacon information. The location engine 1105 can receive one or more data packets that include header and payload data. The location engine 1105 can parse the data packets to identify the payload data and identify the beacon information, including, e.g., a beacon identifier, string or other beacon information. In some embodiments, the location engine 1105 can determine that the beacon information is encrypted. The location engine 1105 can access a database 1115 storing a decryption key to decrypt the encrypted information.

The location engine 1105 may perform a lookup in database 1115 using a value or identifier provided with the beacon information to identify a location. The location may refer to a geographic location, state, city, town, address, latitude longitude, map cell, entity name, location within a store, customized location, electronic location, IP address, URI, web address, data file, application, resource, etc. The database 1115 can include a mapping of BecoIDs to one or more locations. In some cases, multiple identifiers may map to a same location.

In some embodiments, the tool 1105 can receive multiple beacon identifiers from the same client 102. The tool 1105 can receive the multiple beacon identifiers from the same client 102 within a time interval, such as 1 minute, 5 minutes, 10 minutes, 30 minutes, 1 hour, etc. The location engine 1105 may perform a clustering technique to group the multiple beacon identifiers together. In some cases, the multiple beacon identifiers may be from multiple ACBs, such as ACB 1135*a-n*. In some cases, the tool 1105, upon receiving multiple pings from client 102 with multiple beacon identifiers from multiple ACBs 1135*a-n*, may map the multiple beacon identifiers to a same location. For example, while each beacon identifier may in each ping may correspond to a slightly different location, the tool 1105 can cluster the multiple pings together and return a single location, rather than multiple location. The tool 1105 can associate the single location with the time interval in which the multiple pings were received. For example, for a 10 minute time interval, the tool 1105 may map multiple pings associated with multiple beacon identifiers form multiple ACBs 1135*a-n* to a single location.

The single location may correspond to one of the locations that map to one of the identifiers. In some cases, the location engine 1105 can generate a new location or virtual location based on the multiple beacon identifiers corresponding mapped locations within the time interval. The location engine 1105 can generate a virtual beacon that corresponds to the virtual location and store the mapping of the virtual beacon identifier to the virtual location in the database. For example, each beacon identifier may correspond to a different location. The location engine 1105 can identify the various locations by performing a lookup in the database 1115. The location engine 1105, upon identifying the multiple locations, can generate an additional location based on the identified multiple locations. The additional or virtual location may be different from the identified location. The additional or virtual location may be an average or combined location. For example, the location engine 1105 can receive two pings from client device 102 that correspond to two locations of two ACBs 1135*a* and ACB 1135*b*. The location engine 1105 can combine the two locations to identify a third location 1165 that is half-way between the location of ACB 1135*a* and ACB 1135*b*. In some embodiments, the location engine 1105 can apply a weighting to the multiple pings to generate the additional location. The weighting may be a weighted average. For example, if the location engine 1105 receives three pings from client device within a predetermined time interval, and two of the pings are from ACB 1135*a* and one is from ACB 1135B, the location engine may weight the location corresponding to ACB 1135*a* higher, and generate the additional or virtual location closer to ACB 1135*a* as compared to ACB 1135*b*, such as at location 1170. Thus, by using multiple ACBs with multiple beacon identifiers, and combining this information based on a time interval, the location engine 1105 can generate more granular location information. The location engine 1105 can further generate a virtual beacon identifier and map the virtual beacon identifier to the additional location. Thereafter, upon receiving multiple pings corresponding to the multiple beacons from a client device within a time interval, the location engine 1105 can map the multiple pings to the virtual beacon identifier, and perform further processing based on the virtual beacon identifier.

Although generally described as providing a location identifier or information in response to a location request, any type of information associated with ACB device may be retrieved by the location engine 1105 from the database 1115 and used for further processing. Additional information can include, e.g., profile information associated with the ACB 1135*a*, status information, environmental information, sensor information, entity name (e.g., a name of a retail store in which the ACB 1135 is attached; branch code, etc.). This additional information, which may or may not indicate location, can be mapped to the BecoID in the database 115.

For example, the tool 1105 can receive a request that includes a uniform resource identifier that identifies the beacon (or ACB 1135). The uniform resource identifier can be an encoded uniform resource locator, such as a web address, filename and path, executable name or path, or other resource locator. The tool can decode the uniform resource identifier provided with the received request to determine the uniform resource locator. For example, the database may contain a mapping of the uniform resource identifier for the beacon that maps to the URL. The tool can then direct the computing device 102 to the determined uniform resource locator, or other provide the decoded uniform resource locator to the device 102 for further processing. For example, the tool 1105 can provide the URL to the agent executed by the device, and the agent may access the resource via the URL.

The tool 1105 can include a report generator 1110 that can generate reports, such as those illustrated in FIGS. 3 and 4. The report generator 1110 perform various analytics based on the beacon information. In some embodiments, the report generator 1110 can generate a report for display via a user interface, graphical user interface. The report generator 1110 can generate an alert, notification, prompt or other indication. The report generator 1110 convey the report via the network 104 to another entity or system, such as a building management system, advertisement platform, etc. In some embodiments, the report can identify a virtual beacon identifier and corresponding location.

Figure 12:
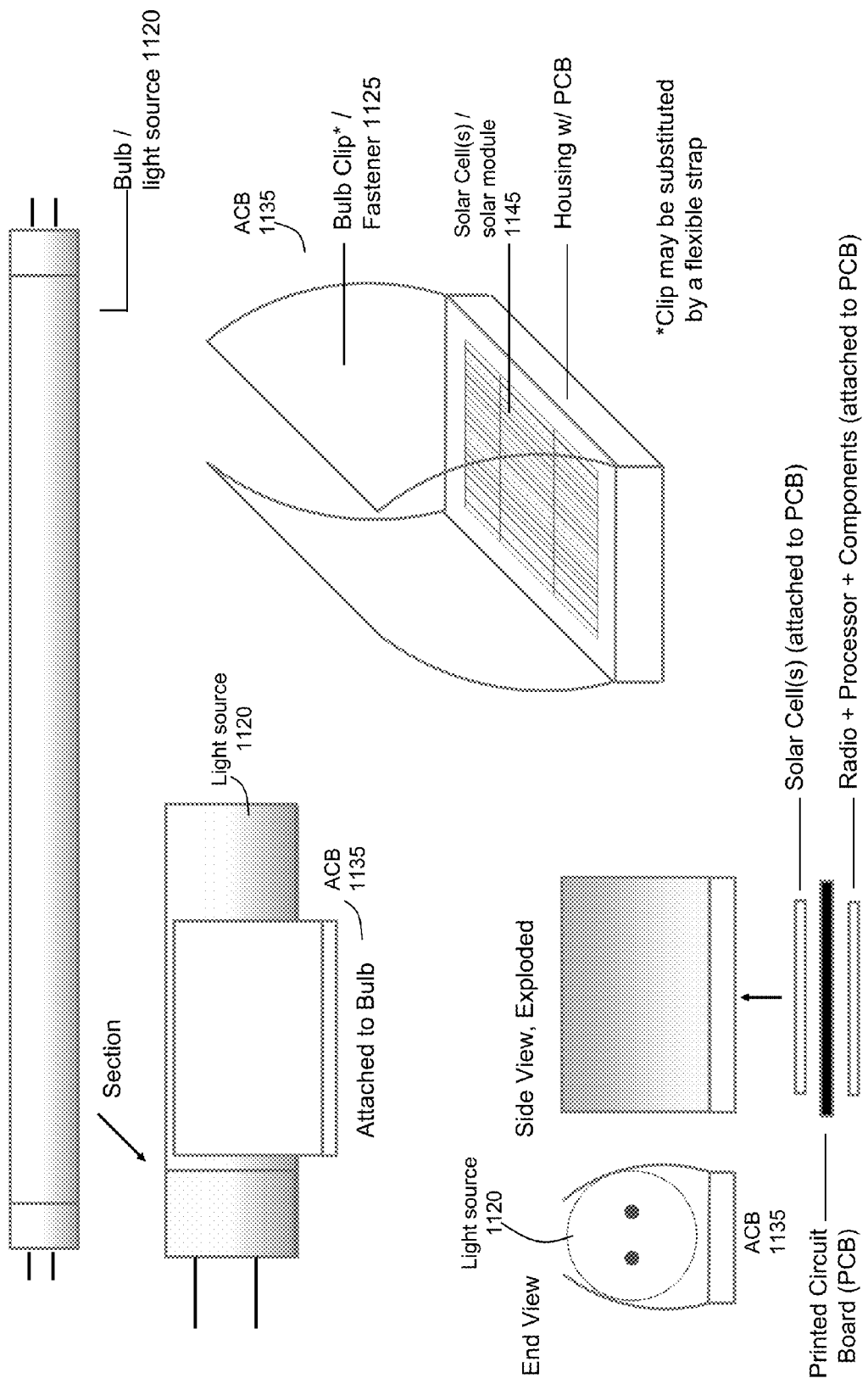
FIG. 12 illustrates an apparatus for indoor light enabled positioning, in accordance with an embodiment.

FIG. 12 illustrates an apparatus for indoor light enabled positioning, in accordance with an embodiment. FIG. 12 shows a variation of on an ACB configured to harvest solar energy from a Light Source as described herein. The apparatus shown is displayed by way of example and is one of many ways to achieve the same result.

The ACB 1135 includes fastener 1125, such as bulb clips or straps or other fasteners. The light source 1120 may include a bulb or tube light. The ACB 1135 can attach to bulb via the fastener 1125. The ACB can include a housing with a printed circuit board. The printed circuit board can be attached to solar cells, radio, processor, components and can be at least partially enclosed by a cover.

FIG. 13 illustrates an apparatus for indoor light enabled positioning, in accordance with an embodiment. The apparatus includes an ACB 1135, with fasteners 1125 and a solar module 1145.

Figure 14:
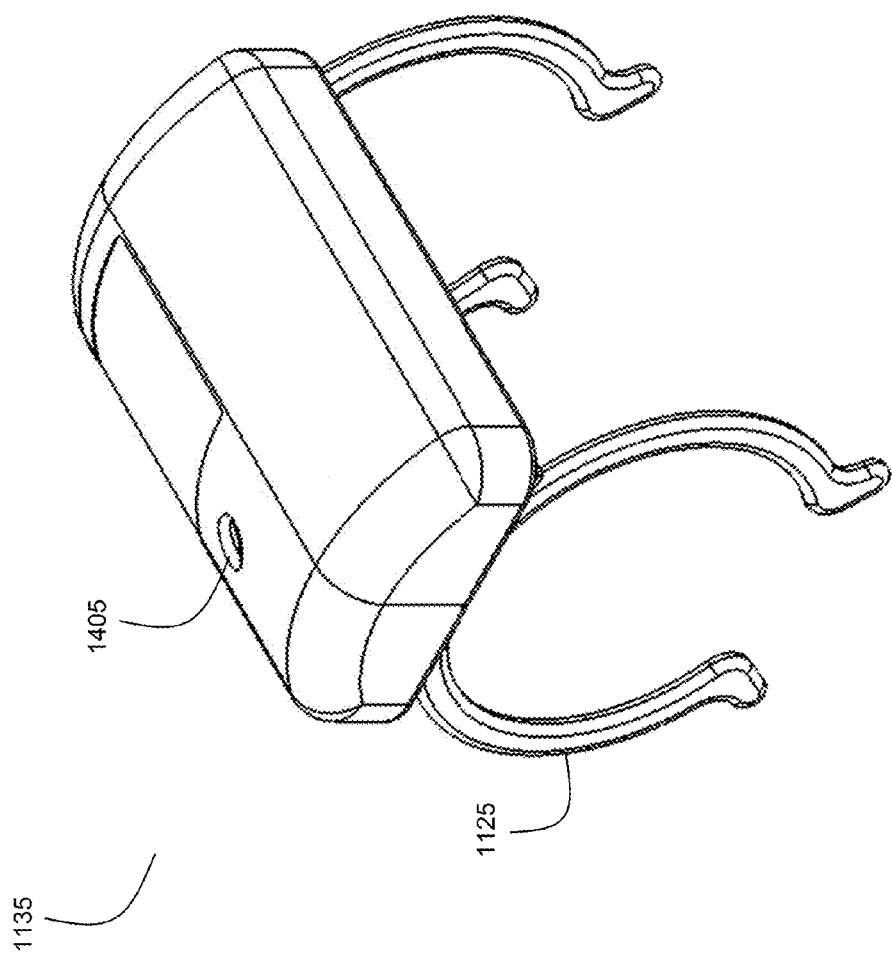
FIG. 14 illustrates an apparatus for indoor light enabled positioning, in accordance with an embodiment.

FIG. 14 illustrates an apparatus for indoor light enabled positioning, in accordance with an embodiment. The apparatus includes an ACB 1135, with fasteners 1125. The ACB 1135 can include an opening for an indicator 1405. The indicator may be an optical indicator such as an LED. The opening 1405 may also be used to facilitate broadcasting the beacon, or provide a button for enabling/disabling the beacon.

Figure 15:
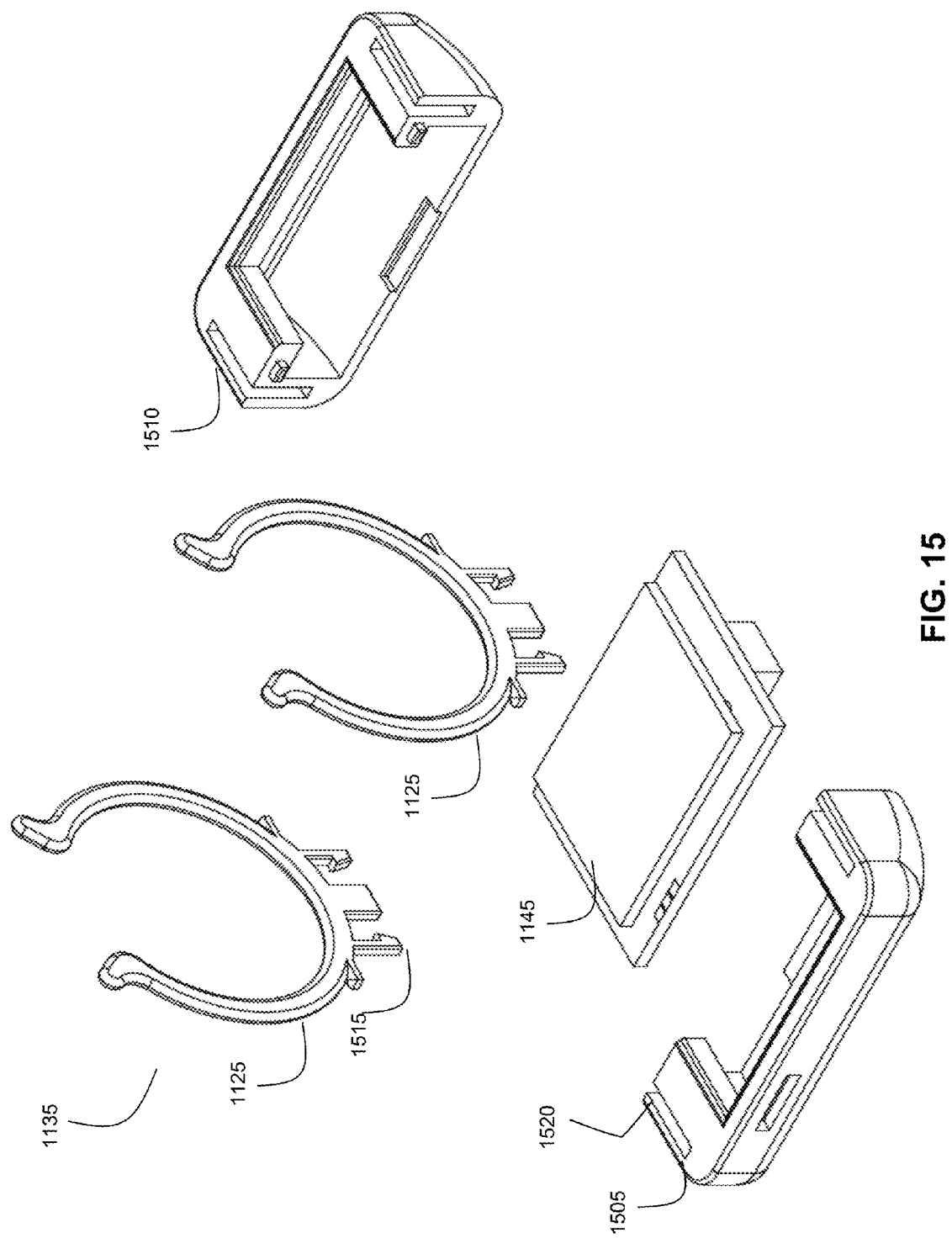
FIG. 15 illustrates an apparatus and components thereof for indoor light enabled positioning, in accordance with an embodiment.

FIG. 15 illustrates an apparatus and components thereof for indoor light enabled positioning, in accordance with an embodiment. The ACB 1135 includes fasteners 1125 and solar module 1145. The ACB 1135 can include a housing 1505 and 1510. The housing 1505 may be a first housing, and the housing 1510 may be a second housing. The first and second housings 1505 and 1510 may be joined together via grooves in the housing. The fasteners 1125 can include an attachment mechanism 1515 and 1520 that attach the fasteners 1125 to the housing 1505 and 1510. The attachment mechanism 1515 and 1520 may be a locking or clipping mechanism. In some embodiments, the attachment mechanism may be removable or fixed.

Figure 16:
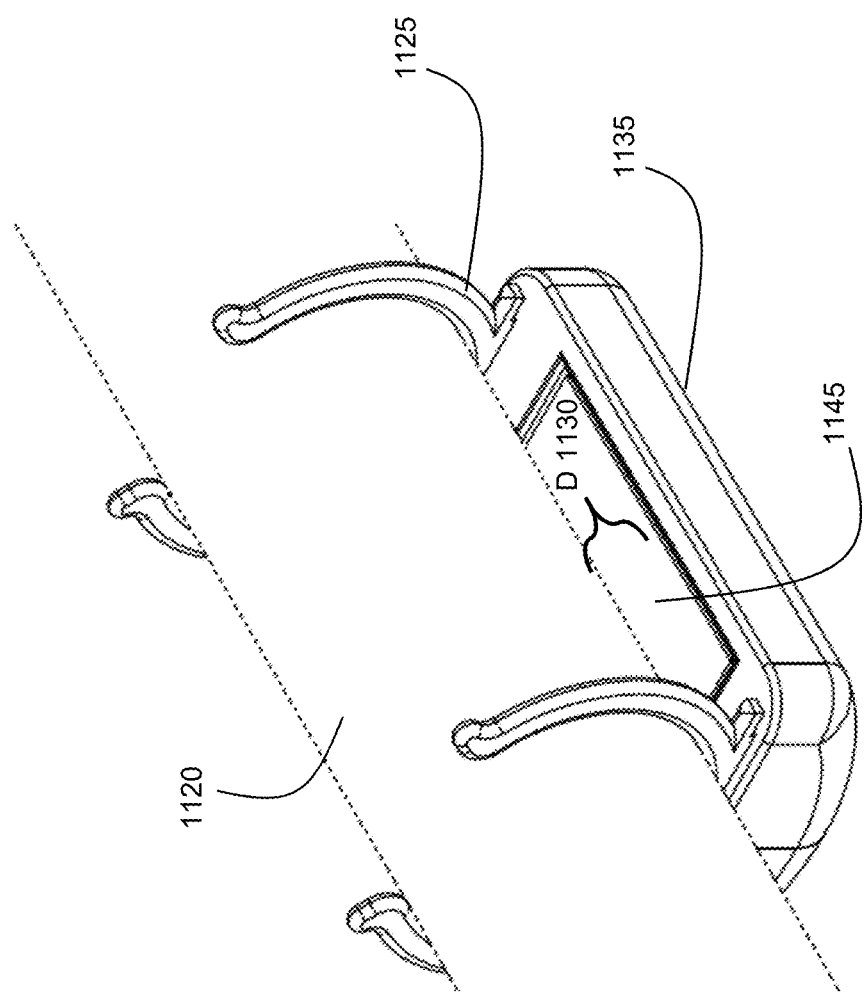
FIG. 16 illustrates an apparatus for indoor light enabled positioning, in accordance with an embodiment.

FIG. 16 illustrates an apparatus for indoor light enabled positioning, in accordance with an embodiment. In this illustration, the ACB 1135 is attached to the light source 1120 via fasteners 1125. The distance D 130 between the solar module 1145 and light source 1120 is such that the solar module 1145 can receive sufficient light to convert the light to electricity to power the electrical components of the ACB 1135.

Figure 17A:
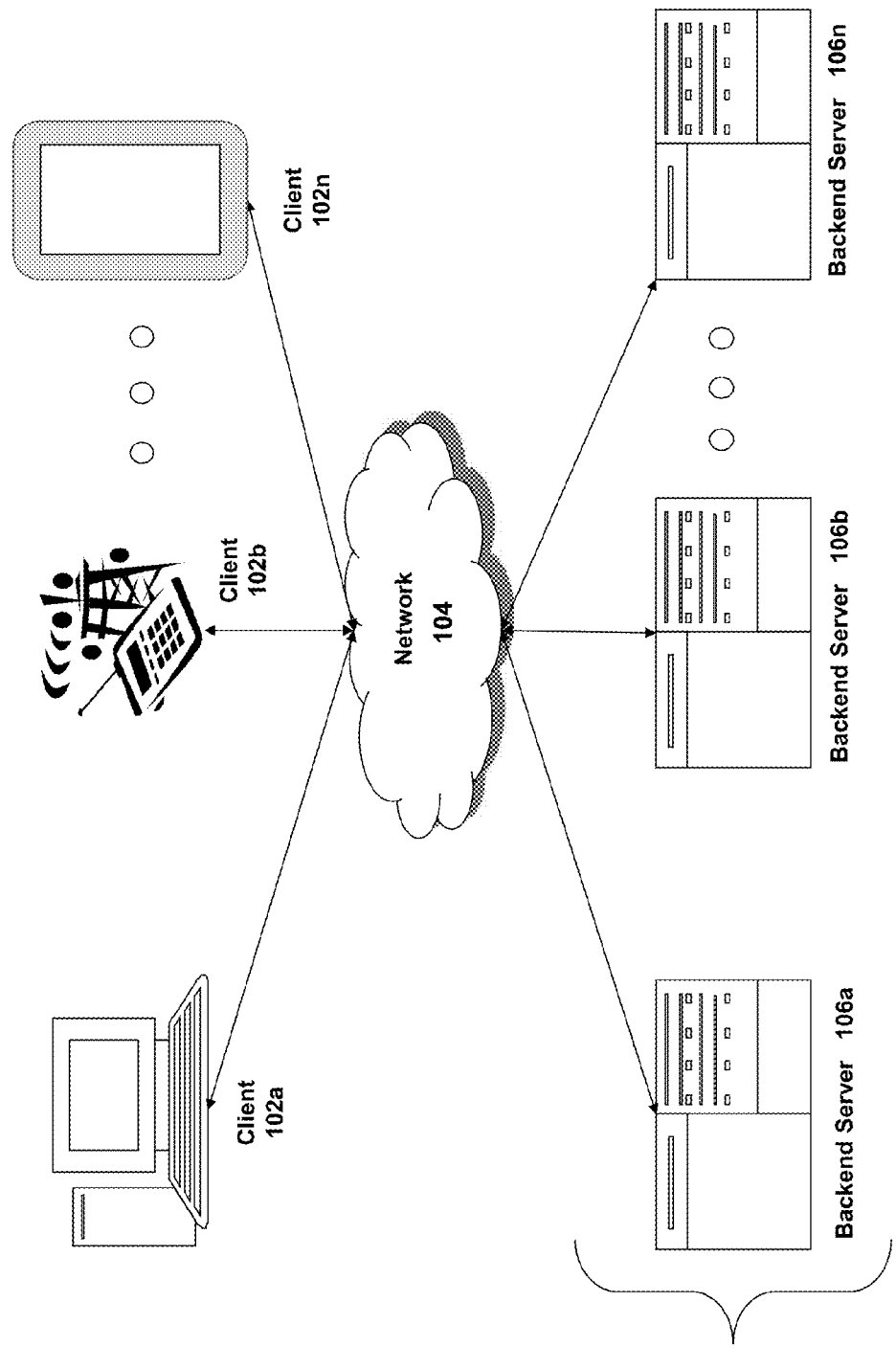
FIG. 17A is a block diagram depicting an embodiment of a network environment comprising client device in communication with server device.

Referring now to FIGS. 17A-17D, network and computing environments for practicing the systems and methods disclosed herein will be described. Referring to FIG. 17A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as backend server(s) 106, backend node 106, or backend remote machine(s) 106) associated with the backend system 105 via one or more networks 104. In some embodiments, a client 102 has the capacity to function as both a client node seeking access to resources provided by a server and as a server providing access to hosted resources for other clients 102a-102n.

Although FIG. 17A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 17E, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a backend server farm 38 or a backend machine farm 38. In another of these embodiments, the servers 106 may be geographically dispersed. In other embodiments, a machine farm 38 may be administered as a single entity. In still other embodiments, the backend machine farm 38 includes a plurality of backend machine farms 38. The servers 106 within each backend machine farm 38 can be heterogeneous—one or more of the servers 106 or backend machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another backend server 106 in the same backend machine farm 38. Thus, the group of servers 106 logically grouped as a backend machine farm 38 may be interconnected using a wide-area network (WAN) connection or a metropolitan-area network (MAN) connection. For example, a backend machine farm 38 may include servers 106 physically located in different continents or different regions of a continent, country, state, city, campus, or room. Data transmission speeds between servers 106 in the backend machine farm 38 can be increased if the servers 106 are connected using a local-area network (LAN) connection or some form of direct connection. In some embodiments, a heterogeneous backend machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the backend machine farm 38 may be de-centralized. For example, one or more servers 106 may comprise components, subsystems and modules to support one or more management services for the backend machine farm 38. In one of these embodiments, one or more servers 106 provide functionality for management of dynamic data, including techniques for handling failover, data replication, and increasing the robustness of the backend machine farm 38. Each backend server 106 may communicate with a persistent store and, in some embodiments, with a dynamic store.

Backend server 106 may be a file server, application server, web server, proxy server, appliance, network appliance, gateway, gateway server, virtualization server, deployment server, SSL VPN server, or firewall. In one embodiment, the backend server 106 may be referred to as a backend remote machine or a backend node.

Figure 17B:
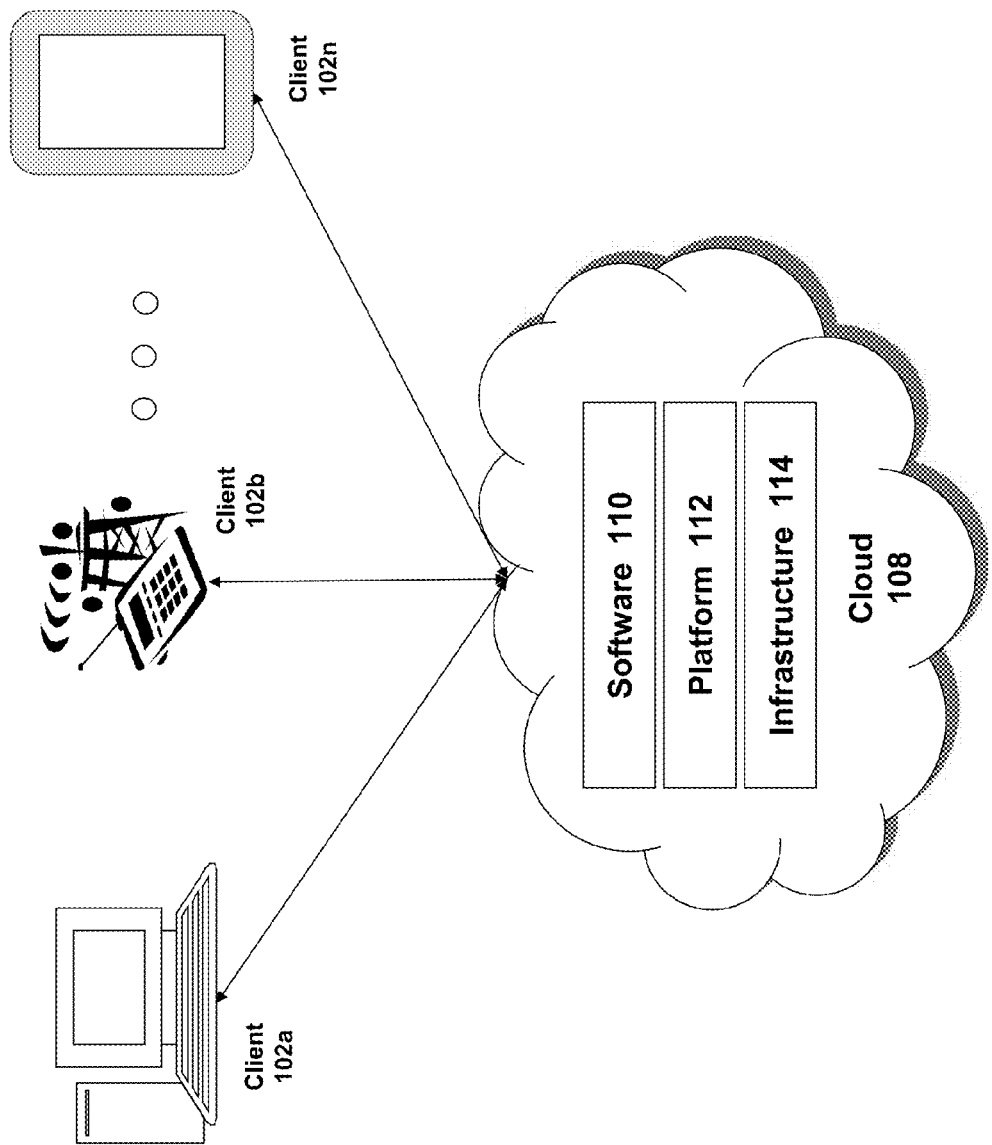
FIG. 17B is a block diagram depicting a cloud computing environment comprising client device in communication with cloud service providers.

Referring to FIG. 17B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or backend server 106 to provide functionality. A zero client may depend on the cloud 108 or other networks 104 or servers 106 to retrieve operating system data for the client device. The cloud 108 may include backend platforms, e.g., servers 106, storage, backend server farms or data centers.

The cloud 108 may be public, private, or hybrid. Public clouds may include public servers 106 that are maintained by third parties to the owners of the application. The servers 106 may be located off-site in remote geographical locations as disclosed above or otherwise. Public clouds may be connected to the servers 106 over a public network. Private clouds may include private servers 106 that are physically maintained by owners of the applications. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 17C:
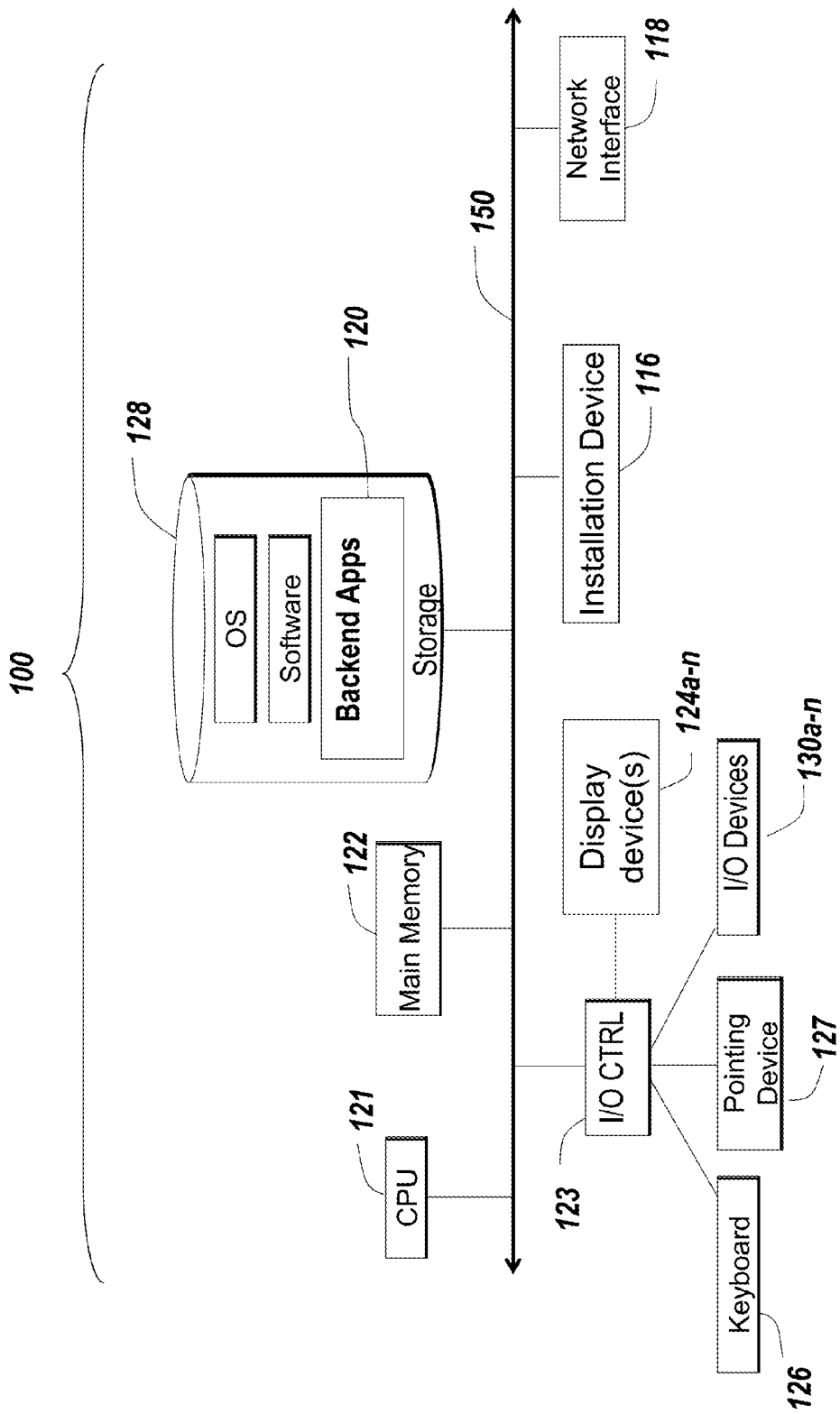
FIGS. 17C and 17D are block diagrams depicting embodiments of computing devices useful in connection with the methods and systems described herein.
Figure 17D:
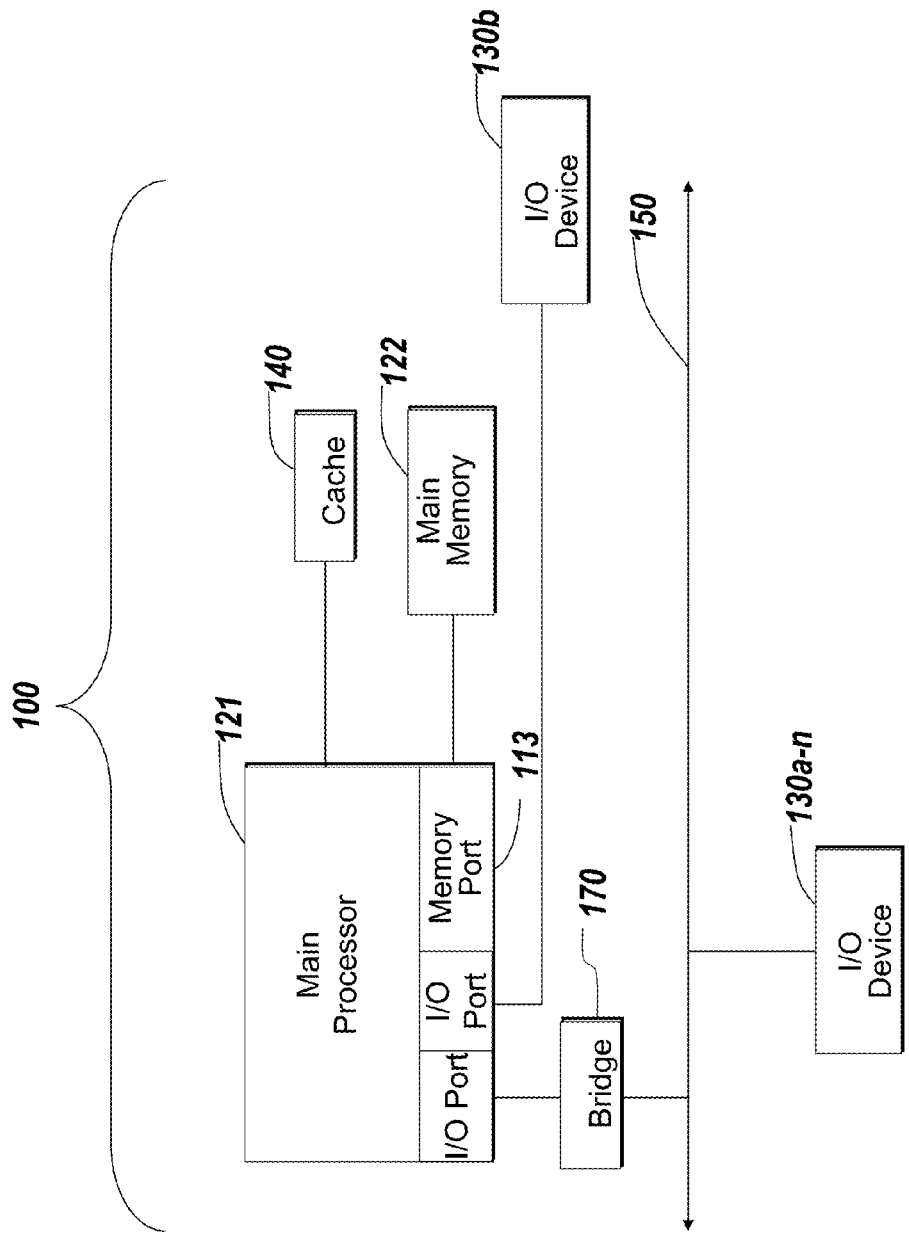

The client 102 and backend server 106 may be deployed as and/or executed on any type and form of computing device, e.g. a computer, network device or appliance capable of communicating on any type and form of network and performing the operations described herein. FIGS. 17C and 17D depict block diagrams of a computing device 100 useful for practicing an embodiment of the client 102 or a backend server 106. As shown in FIGS. 17C and 17D, each computing device 100 includes a central processing unit 121, and a main memory unit 122. As shown in FIG. 17C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, applications 120 or a combination thereof. As shown in FIG. 17D, each computing device 100 may also include additional optional elements, e.g. a memory port 113, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 17C, the processor 121 communicates with main memory 122 via a system bus 150 (described in more detail below). FIG. 17D depicts an embodiment of a computing device 100 in which the processor communicates directly with main memory 122 via a memory port 103. For example, in FIG. 17D the main memory 122 may be DRDRAM.

FIG. 17D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 17D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 17D depicts an embodiment of a computer 100 in which the main processor 121 communicates directly with I/O device 130b or other processors 121' via HYPERTRANSPORT, RAPIDIO, or INFINIBAND communications technology. FIG. 17D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3-D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 17B. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3-D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 17C, the computing device 100 may comprise a storage device 128 (e.g. one or more hard disk drives or redundant arrays of independent disks) for storing an operating system or other related software, and for storing application software programs such as any program related to the software 120 for the server 106, client 102, lighting unit or ACB. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 17C and 17D may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

The systems and method of the various embodiments of the present solution and as described herein may be done a number of ways and one skilled in the art will recognize that the method presented is representative of the spirit of the present solution in such that the execution may vary once implemented.

What is claimed is:

1. A system comprising:
one or more solar cells exposed on a housing of a device;
the housing containing a processor and a wireless radio;
the one or more solar cells oriented towards a light source and configured to be exposed to light from the light source upon the housing positioned a predetermined distance from the light source, the predetermined distance comprising a distance by which a lumen output of the light source allows the one or more solar cells to convert light from the light source to electricity at a level of power to operate the processor and the wireless radio;

wherein the processor is powered via the one or more solar cells and configured to provide a beacon, the beacon encrypting a unique identifier of the solar-powered device; and wherein the wireless radio is powered via the one or more solar cells and configured to broadcast the beacon.

2. The system of claim 1, wherein the device comprises an energy storage device to store energy harvested by the one or more solar cells, the energy storage device configured to provide the level of power to operate the processor and the wireless radio.

3. The system of claim 1, wherein the energy storage device comprises at least one of a capacitor, super capacitor, battery, inductor, transformer, or power storage component.

4. The system of claim 1, wherein the device comprises an energy storage device to store energy harvested by the one or more solar cells, the energy storage device configured to provide the level of power to operate the processor and the wireless radio responsive to a reduction in the lumen output of the light source that prevents the one or more solar cells from converting the light from the light source to electricity at the level of power to operate the processor and the wireless radio.

5. The system of claim 4, wherein the processor engages the energy storage device responsive to the one or more solar cells prevented from converting the light from the light source to electricity at the level of power to operate the processor and the wireless radio.

6. The system of claim 4, wherein the processor switches in the energy storage device responsive to the one or more solar cells prevented from converting the light from the light source to electricity at the level of power to operate the processor and the wireless radio, and the processor switches out the energy storage device responsive to the one or more solar cells converting the light from the light source to electricity at the level of power to operate the processor and the wireless radio.

7. The system of claim 1, wherein the device comprises an onboard clock and an energy storage device to store energy harvested by the one or more solar cells, the energy storage device configured to provide a second level of power less than the level of power to broadcast the wireless beacon, the second level of power configured to power the onboard clock.

8. The system of claim 1, wherein the device comprises an energy storage device to store energy harvested by the one or more solar cells, the energy storage device configured to supplement the electricity provided by the one or more cells to power the wireless radio to generate a wireless transmission responsive to a reduction in the lumen output of the light source that prevents the one or more solar cells from converting the light from the light source to electricity at the level of power to operate the processor and the wireless radio.

9. The system of claim 1, wherein the device comprises one or more super capacitor to store energy harvested by the one or more solar cells, the super capacitor configured to provide power to operate at least one of the processor and the wireless radio responsive to a reduction in the lumen output of the light source that prevents the one or more solar cells from converting the light from the light source to electricity at the level of power to operate the processor and the wireless radio.

10. The system of claim 1, wherein the device comprises non-volatile memory and an energy storage device storing energy to power the processor to detect a power loss and save one or more values to the non-volatile memory prior to the processor shutting down responsive to the power loss.

11. The system of claim 1, comprising:
a server comprising a database comprising one or more unique identifiers and one or more keys, the one or more keys used to map the beacon to the one or more unique identifiers;
wherein the server is configured to receive from a second device a request comprising the beacon, the second device receiving the beacon from the broadcast of the beacon from the solar-powered device; and
wherein the server is configured to respond to the second device with the unique identifier from the database.

12. The system of claim 1, comprising:
a fastener configured to securely attach the device the predetermined distance from the light source, and orient the one or more solar cells towards the light source.

13. The system of claim 12, wherein the fastener is removable or attachable to the housing.

14. A device comprising:
a housing comprising a processor and a wireless radio;
one or more solar cells oriented towards a light source and configured to be exposed to light from the light source upon the housing positioned a predetermined distance from the light source, the predetermined distance comprising a distance by which a lumen output of the light source allows the one or more solar cells to convert light from the light source to electricity at a level of power to operate the processor and the wireless radio;
an energy storage device to store energy harvested by the one or more solar cells, the energy storage device configured to provide the level of power to operate the processor and the wireless radio;
a circuit by which power is converted from the one or more solar cells and the energy storage device to the processor and the wireless radio;
wherein the energy storage device provides at least some of the level of power responsive to a reduction in the level of power converted from the light by the one or more solar cells; and
wherein the wireless radio is configured to broadcast a beacon provided by the processor.

15. The device of claim 14, wherein the processor provides the beacon encrypting a unique identifier of the solar-powered device to prevent unauthorized access to the unique identifier of the solar-powered device.

16. The device of claim 14, wherein the energy storage device comprises at least one of a capacitor, super capacitor, battery, inductor, transformer, or power storage component.

17. The device of claim 14, wherein the beacon further comprises a uniform resource identifier that identifies a web address followed by data that includes an encoded string.

18. The device of claim 14, wherein the beacon comprises measured data.

19. The device of claim 14, wherein the processor is further configured to change at least a portion of the beacon as a function of one of an equation, an algorithm or time.

20. The device of claim 14, wherein the processor adjusts the frequency of the beacon broadcast as a function of the power available from the one or more solar cells and the power available from the energy storage device.

* * * * *